US006542161B1

(12) United States Patent
Koyama et al.

(10) Patent No.: US 6,542,161 B1
(45) Date of Patent: Apr. 1, 2003

(54) CHARACTER DISPLAY APPARATUS, CHARACTER DISPLAY METHOD, AND RECORDING MEDIUM

(75) Inventors: Noriyuki Koyama, Kyoto (JP); Yoshimi Asai, Osaka (JP); Susumu Hasegawa, Chiba (JP); Yuka Yabuuchi, Yamatokoriyama (JP); Satoshi Okada, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/496,261

(22) Filed: Feb. 1, 2000

(30) Foreign Application Priority Data

Feb. 1, 1999 (JP) .......................................... 11-024450
Apr. 20, 1999 (JP) .......................................... 11-112954
Jul. 28, 1999 (JP) .......................................... 11-214429

(51) Int. Cl.[7] ................................................ G09G 5/28

(52) U.S. Cl. ....................... 345/589; 345/613; 345/694; 345/214

(58) Field of Search ................................ 345/589, 593, 345/596, 597, 636, 658, 467, 471, 472.3, 418, 421, 422, 426, 428, 581, 590, 592, 600, 604, 612–614, 617, 618, 501, 522, 531, 547, 549, 204, 205, 690, 694, 695, 698–699, 214, 468; 382/292, 299, 296–297

(56) References Cited

U.S. PATENT DOCUMENTS 5,132,674 A 7/1992 Bottorf
5,796,409 A 8/1998 Hersch et al.
5,821,913 A 10/1998 Mamiya
5,859,633 A 1/1999 Kim
6,002,385 A * 12/1999 Silverbrook ................ 345/100
6,005,635 A 12/1999 Saib et al.
6,072,555 A * 6/2000 Mizutome et al. .......... 349/144
6,081,248 A 6/2000 Hasegawa et al.
6,108,122 A * 8/2000 Ulrich et al. ............... 359/291
6,130,667 A 10/2000 Hasegawa et al.
6,224,448 B1 * 5/2001 Tada et al. .................... 445/24
6,243,070 B1 * 6/2001 Hill et al. ................... 345/607
6,256,004 B1 7/2001 Izumi et al.
6,417,967 B1 * 7/2002 Swanson .................... 359/567

FOREIGN PATENT DOCUMENTS

EP 0 772 144 A2 5/1997
EP 001026659 A2 * 8/2000 ............ G09G/5/28
JP 0 313 329 A2 4/1989
JP 0 435 391 A2 4/1989
JP 0 346 090 A2 12/1989
JP 0 452 796 A2 10/1991
JP 10063249 3/1998
JP 02001100725 A * 4/2001 ............ G09G/5/24
JP 02001184051 A * 7/2001 ............ G09G/5/28
WO 00/21066 4/2000

OTHER PUBLICATIONS

Patent Abstracts of Japan, vol. 1998, No. 12, Oct. 31, 1998, (JP 10 186315).
Patent Abstracts of Japan, vol. 1998, No. 09, Jul. 31, 1998, (JP 10 097215).

* cited by examiner

*Primary Examiner*—Matthew C. Bella
*Assistant Examiner*—Wesner Sajous
(74) *Attorney, Agent, or Firm*—Birch, Stewart, Kolasch & Birch, LLP

(57) ABSTRACT

A character display apparatus of the present invention includes: a display device having a plurality of pixels; and a control section for controlling the display device. Each of the pixels includes a plurality of sub-pixels arranged along a predetermined direction. A corresponding one of a plurality of color elements is pre-assigned to each of the sub-pixels. The control section displays a character on the display device by independently controlling the color elements respectively corresponding to the sub-pixels.

33 Claims, 75 Drawing Sheets

*FIG. 9*

Brightness table 92

| | | Brightness level | | |
|---|---|---|---|---|
| | | R | G | B |
| Color element level | Level 5 | 0 | 0 | 0 |
| | Level 4 | 50 | 50 | 50 |
| | Level 3 | 100 | 100 | 100 |
| | Level 2 | 150 | 150 | 150 |
| | Level 1 | 200 | 200 | 200 |
| | Level 0 | 255 | 255 | 255 |

*FIG. 10*

Brightness table 94

| Color element level | | Brightness level R | Brightness level G | Brightness level B |
|---|---|---|---|---|
| | Level 5 | 0 | 0 | 0 |
| | Level 4 | 40 | 40 | 40 |
| | Level 3 | 90 | 90 | 90 |
| | Level 2 | 160 | 160 | 160 |
| | Level 1 | 210 | 210 | 210 |
| | Level 0 | 255 | 255 | 255 |

FIG. 11

Brightness table 96

| | | Brightness level | | |
|---|---|---|---|---|
| | | R | G | B |
| Color element level | Level 5 | 0 | 0 | 0 |
| | Level 4 | 50 | 50 | 120 |
| | Level 3 | 100 | 100 | 155 |
| | Level 2 | 150 | 150 | 190 |
| | Level 1 | 200 | 200 | 225 |
| | Level 0 | 255 | 255 | 255 |

*FIG. 25*

Correction table 2060

| | | Correction pattern 1 | Correction pattern 2 |
|---|---|---|---|
| Color element level | Sub-pixel 1 | 5 | 4 |
| | Sub-pixel 2 | 2 | 2 |
| | Sub-pixel 3 | 1 | 1 |

*FIG. 26*

Brightness table 2070

| | | Brightness level | | |
|---|---|---|---|---|
| | | R | G | B |
| Color element level | 7 | 0 | 0 | 0 |
| | 6 | 36 | 36 | 36 |
| | 5 | 73 | 73 | 73 |
| | 4 | 109 | 109 | 109 |
| | 3 | 146 | 146 | 146 |
| | 2 | 182 | 182 | 182 |
| | 1 | 219 | 219 | 219 |
| | 0 | 255 | 255 | 255 |

*FIG. 27*

Brightness table 2080

| | | Brightness level | | |
|---|---|---|---|---|
| | | R | G | B |
| Color element level | 7 | 0 | 0 | 0 |
| | 6 | 30 | 30 | 30 |
| | 5 | 65 | 60 | 60 |
| | 4 | 100 | 100 | 100 |
| | 3 | 150 | 150 | 150 |
| | 2 | 185 | 185 | 185 |
| | 1 | 220 | 220 | 220 |
| | 0 | 255 | 255 | 255 |

*FIG. 28*

Brightness table 2090

| | | Brightness level | | |
|---|---|---|---|---|
| | | R | G | B |
| Color element level | 7 | 0 | 0 | 0 |
| | 6 | 36 | 36 | 105 |
| | 5 | 73 | 73 | 130 |
| | 4 | 109 | 109 | 155 |
| | 3 | 146 | 146 | 180 |
| | 2 | 182 | 182 | 205 |
| | 1 | 219 | 219 | 230 |
| | 0 | 255 | 255 | 255 |

```
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
124777777777777777777777777777777777777777777777777777777421
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
```

```
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
```

```
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000125742100000000000000000000000000000
000000000000000000000012577521000000000000000000000000000000
000000000000000000000012575210000000000000000000000000000000
000000000000000000000125752100000000000000000000000000000000
000000000000000000012577521000000000000000000000000000000000
000000000000000001257752100000000000000000000000000000000000
000000000000000125775210000000000000000000000000000000000000
000000000000012577521000000000000000000000000000000000000000
000000000012577521000000000000000000000000000000000000000000
000000125777752100000000000000000000000000000000000000000000
001257777521000000000000000000000000000000000000000000000000
124775210000000000000000000000000000000000000000000000000000
000000000000000000000000000000000000000000000000000000000000
000000000000000000000000000000000000000000000000000000000000
000000000000000000000000000000000000000000000000000000000000
```

```
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000000000000000000000000000000000
000000000000000000000000000000124752100000000000000000000000
000000000000000000000000000000012577521000000000000000000000
000000000000000000000000000000000125775210000000000000000000
000000000000000000000000000000000001257521000000000000000000
000000000000000000000000000000000000125775210000000000000000
000000000000000000000000000000000000001577521000000000000000
000000000000000000000000000000000000000125775210000000000000
000000000000000000000000000000000000000012577521000000000000
000000000000000000000000000000000000000000125775210000000000
000000000000000000000000000000000000000000001257777521000000
000000000000000000000000000000000000000000000000125777752100
000000000000000000000000000000000000000000000000000012577421
000000000000000000000000000000000000000000000000000000000000
000000000000000000000000000000000000000000000000000000000000
000000000000000000000000000000000000000000000000000000000000
```

Correction table 2170

| | | Correction pattern 1 | Correction pattern 2 |
|---|---|---|---|
| Color element level | Weight 1 | 5 | 4 |
| | | 2 | 2 |
| | | 1 | 1 |
| | Weight 2 | 6 | 5 |
| | | 3 | 3 |
| | | 1 | 1 |
| | Weight 3 | 5 | 4 |
| | | 3 | 3 |
| | | 2 | 2 |
| | | 1 | 1 |
| | Weight 4 | 6 | 5 |
| | | 4 | 4 |
| | | 2 | 2 |
| | | 1 | 1 |
| | Weight 5 | 6 | 5 |
| | | 4 | 4 |
| | | 3 | 3 |
| | | 2 | 2 |
| | | 1 | 1 |

*FIG. 37*

Correction table 2180

| | | Correction pattern 1 | Correction pattern 2 |
|---|---|---|---|
| Color element level | ~20 dot | 5 | 4 |
| | | 2 | 2 |
| | | 1 | 1 |
| | 21~32 dot | 6 | 5 |
| | | 4 | 4 |
| | | 2 | 2 |
| | | 1 | 1 |
| | 33~48 dot | 6 | 5 |
| | | 4 | 4 |
| | | 3 | 3 |
| | | 2 | 2 |
| | | 1 | 1 |

*FIG. 40*

Correction table 2210

| 4458 (Character "木") | |
|---|---|
| Stroke #1 | |
| 4,2,1 | 2211 |
| Stroke #2 | |
| 5,4,2,1 | 2212 |
| Stroke #3 | |
| 6,4,2,1 | 2213-1 |
| 6,4,2,1 | 2213-2 |
| 6,4,2,1 | 2213-3 |
| 5,3,1 | 2213-4 |
| Stroke #4 | |
| 6,4,2,1 | 2214-1 |
| 6,4,2,1 | 2214-2 |
| 6,4,2,1 | 2214-3 |
| 5,3,1 | 2214-4 |

FIG. 42

Correction table 2230

| "Hen" radical "木" |
|---|
| Stroke #1 |
| 3,1 |
| Stroke #2 |
| 4,2,1 |
| Stroke #3 |
| 3,1 |
| 3,1 |
| 5,2,1 |
| 6,3,1 |
| Stroke #4 |
| 3,1 |
| 4,1 |
| 5,2,1 |

*FIG. 44*

Correction table 2250

| | | Correction pattern 1 | Correction pattern 2 |
|---|---|---|---|
| Color element level | 1∼6 stroke | 6 | 5 |
| | | 4 | 4 |
| | | 3 | 3 |
| | | 2 | 2 |
| | | 1 | 1 |
| | 7∼14 stroke | 6 | 5 |
| | | 4 | 4 |
| | | 2 | 2 |
| | | 1 | 1 |
| | 15 stroke ∼ | 5 | 4 |
| | | 2 | 2 |
| | | 1 | 1 |

FIG. 45

Correction table 2260

| | | Correction pattern |
|---|---|---|
| Color element level | 0° | 3 |
| | | 2 |
| | ~30° | 6 |
| | | 3 |
| | | 2 |
| | | 1 |
| | ~45° | 5 |
| | | 3 |
| | | 2 |
| | ~60° | 6 |
| | | 3 |
| | | 1 |
| | ~90° | 4 |
| | | 2 |
| | | 1 |

*FIG. 46*

Correction table 2270

| Normal | | Special | |
|---|---|---|---|
| Correction pattern 1 | Correction pattern 2 | Correction pattern 1 | Correction pattern 2 |
| 5 | 4 | 5 | 4 |
| 2 | 2 | 2 | 2 |
| 1 | 1 | | |

| | | | |
|---|---|---|---|
| 4458(Character "木") | | | |
| Stroke #1 | | 1 | |
| 2 | Reverse | Upper | 1 |
| (0,6) | | | |
| Stroke #2 | | 1 | |
| 1 | Forward | Right | 1 |
| (6,6) | | | |
| Stroke #3 | | 1 | |
| 1 | Forward | Right | 3 |
| (6,6) | | | |
| (6,6) | | | |
| (6,6) | | | |
| Stroke #4 | | 1 | |
| 5 | Reverse | Left | 2 |
| (6,6,6) | | | |
| (6,6) | | | |

Starting point

End point

```
00000000000000000000000000000000000000000000000000000000000
00000000000000000000000000000070000000000000000000000000000
00000000000000000000000000000077000000000000000000000000000
00000000000000000000000000000000070000000000000000000000000
00000000000000000000000000000000007700000000000000000000000
00000000000000000000000000000000000077000000000000000000000
00000000000000000000000000000000000000770000000000000000000
00000000000000000000000000000000000000007700000000000000000
00000000000000000000000000000000000000000077000000000000000
00000000000000000000000000000000000000000000770000000000000
00000000000000000000000000000000000000000000007770000000000
00000000000000000000000000000000000000000000000077770000000
00000000000000000000000000000000000000000000000000000770000
00000000000000000000000000000000000000000000000000000000000
```

```
00000000000000000000000000000000000000000000000000000000000
00000000000000000000000000000070000000000000000000000000000
00000000000000000000000000000077000000000000000000000000000
00000000000000000000000000000000070000000000000000000000000
00000000000000000000000000000000000770000000000000000000000
00000000000000000000000000000000000077000000000000000000000
00000000000000000000000000000000000000770000000000000000000
00000000000000000000000000000000000000007700000000000000000
00000000000000000000000000000000000000000077000000000000000
00000000000000000000000000000000000000000000770000000000000
00000000000000000000000000000000000000000000007770000000000
00000000000000000000000000000000000000000000000667777000000
00000000000000000000000000000000000000000000000000666770000
00000000000000000000000000000000000000000000000000000000000
```

```
00000000000000000000000000000000000000000000000000000000000
00000000000000000000000000012475210000000000000000000000000
00000000000000000000000000001257752100000000000000000000000
00000000000000000000000000000012575210000000000000000000000
00000000000000000000000000000000125775210000000000000000000
00000000000000000000000000000000001257752100000000000000000
00000000000000000000000000000000000012577521000000000000000
00000000000000000000000000000000000000125775210000000000000
00000000000000000000000000000000000000001257752100000000000
00000000000000000000000000000000000000000012577521000000000
00000000000000000000000000000000000000000000125777521000000
00000000000000000000000000000000000000000000012566777521000
00000000000000000000000000000000000000000000000125666774210
00000000000000000000000000000000000000000000000000000000000
```

| Character size | Attribute table number |
|---|---|
| ~20 dot | Attribute table #1 |
| 21~32 dot | Attribute table #2 |
| 33~48 dot | Attribute table #3 |

Attribute table #1

| Character code | |
|---|---|
| Stroke number | Number of pattern sets |
| Pattern set | |
| Pattern set | |
| Stroke number | Number of pattern sets |
| Pattern set | |
| Pattern set | |

Attribute table #2

| Character code | |
|---|---|
| Stroke number | Number of pattern sets |
| Pattern set | |
| Pattern set | |
| Stroke number | Number of pattern sets |
| Pattern set | |
| Pattern set | |

Attribute table #3

| Character code | |
|---|---|
| Stroke number | Number of pattern sets |
| Pattern set | |
| Pattern set | |
| Stroke number | Number of pattern sets |
| Pattern set | |
| Pattern set | |

*FIG. 56*

Attribute table #1

| 4458 (Character "木") | | | |
|---|---|---|---|
| Stroke #1 | | 1 | |
| 2 | Reverse | Upper | 1 |
| (0,6) | | | |
| Stroke #2 | | 1 | |
| 1 | Forward | Right | 1 |
| (6,6) | | | |
| Stroke #3 | | 1 | |
| 1 | Forward | Right | 3 |
| (6,6) | | | |
| (6,6) | | | |
| (6,6) | | | |
| Stroke #4 | | 1 | |
| 5 | Reverse | Left | 2 |
| (6,6,6) | | | |
| (6,6) | | | |

Attribute table #2

| 4458 (Character "木") | | | |
|---|---|---|---|
| Stroke #1 | | 1 | |
| 2 | Reverse | Upper | 1 |
| (0,0,6,6) | | | |
| Stroke #2 | | 1 | |
| 1 | Forward | Right | 1 |
| (6,6) | | | |
| Stroke #3 | | 1 | |
| 1 | Forward | Right | 7 |
| (6,6) | | | |
| (6,6) | | | |
| (6,6,6) | | | |
| (6,6) | | | |
| (6,6) | | | |
| (6) | | | |
| (6) | | | |
| Stroke #4 | | 1 | |
| 5 | Reverse | Left | 6 |
| (6,6,6,6) | | | |
| (6,6) | | | |
| (6,6) | | | |
| (6) | | | |
| (6) | | | |
| (6) | | | |

Attribute table #3

| 4458 (Character "木") | | | |
|---|---|---|---|
| Stroke #1 | | 1 | |
| 2 | Reverse | Upper | 1 |
| (0,0,5,6,5) | | | |
| Stroke #2 | | 1 | |
| 1 | Forward | Right | 1 |
| (6,6,6) | | | |
| Stroke #3 | | 1 | |
| 1 | Forward | Right | 10 |
| (6,6) | | | |
| (6,6) | | | |
| (6,6,6) | | | |
| (6,6,6) | | | |
| (6,6,6) | | | |
| (6,6) | | | |
| (6,6) | | | |
| (6,6) | | | |
| (6,6) | | | |
| (6) | | | |
| Stroke #4 | | 1 | |
| 5 | Reverse | Left | 8 |
| (6,6,6,6,6) | | | |
| (6,6,6,6) | | | |
| (6,6,6,6) | | | |
| (6,6,6) | | | |
| (6,6) | | | |
| (6,6) | | | |
| (6) | | | |
| (6) | | | |

```
000000000000000000000000000000000000000000000124742100000000000000000000000000000000000000000000
000000000000000000000000000000000000000000000124742100000000000000000000000000000000000000000000
000000000000000000000000000000000000000000000124742100000000000000000000000000000000000000000000
000000000000000000000000000000000000000000000124742100000000000000000000000000000000000000000000
000000000000000000000000000000000000000000000124742100000000000000000000000000000000000000000000
000000000000000000000000000000000000000000000124742100000000000000000000000000000000000000000000
000000000000000000000000000000000000000000000124742100000000000000000000000000000000000000000000
000000000000000000000000000000000000000000000124742100000000000000000000000000000000000000000000
124777777777777777777777777777777777777777777777777777777777777777777777777777777777777777777421
000000000000000000000000000000000000000001257524745775210000000000000000000000000000000000000000
000000000000000000000000000000000000000125775224742257752100000000000000000000000000000000000000
000000000000000000000000000000000000001257521124742112575210000000000000000000000000000000000000
000000000000000000000000000000000000012575210124742101257752100000000000000000000000000000000000
000000000000000000000000000000000001257752100124742100012575210000000000000000000000000000000000
000000000000000000000000000000000125775210000124742100001257752100000000000000000000000000000000
000000000000000000000000000000001257752100000124742100000125775210000000000000000000000000000000
000000000000000000000000000000125775210000000124742100000001257752100000000000000000000000000000
000000000000000000000000000012577521000000000124742100000000012577521000000000000000000000000000
000000000000000000000000012577752100000000000124742100000000000125775210000000000000000000000000
000000000000000000000000125775210000000000000124742100000000000001257775210000000000000000000000
000000000000000000000012577521000000000000000124742100000000000000012577521000000000000000000000
000000000000000001257752100000000000000000000124742100000000000000000001257775210000000000000000
000000000000000125775210000000000000000000000124742100000000000000000000001257775210000000000000
000000000001257777521000000000000000000000000124742100000000000000000000000001257777521000000000
000000012577777521000000000000000000000000000124742100000000000000000000000000000125777521000000
000125777775210000000000000000000000000000000124742100000000000000000000000000000000125777752100
124777521000000000000000000000000000000000000124742100000000000000000000000000000000000012577421
000000000000000000000000000000000000000000000124742100000000000000000000000000000000000000000000
000000000000000000000000000000000000000000000124742100000000000000000000000000000000000000000000
000000000000000000000000000000000000000000000124742100000000000000000000000000000000000000000000
000000000000000000000000000000000000000000000124742100000000000000000000000000000000000000000000
000000000000000000000000000000000000000000000124742100000000000000000000000000000000000000000000
```

```
0000000000000000000000000000000000000000000001247664210000000000000000000000000000000000000000000
0000000000000000000000000000000000000000000001247421000000000000000000000000000000000000000000000
0000000000000000000000000000000000000000000001247421000000000000000000000000000000000000000000000
0000000000000000000000000000000000000000000001247421000000000000000000000000000000000000000000000
0000000000000000000000000000000000000000000001247421000000000000000000000000000000000000000000000
0000000000000000000000000000000000000000000001247421000000000000000000000000000000000000000000000
0000000000000000000000000000000000000000000001247421000000000000000000000000000000000000000000000
0000000000000000000000000000000000000000000001247421000000000000000000000000000000000000012464210
1247777777777777777777777777777777777777777777777777777777777777777777777777777777777777777777421
0000000000000000000000000000000000000000012576647457752100000000000000000000000000000000000000000
0000000000000000000000000000000000000001257766547422577521000000000000000000000000000000000000000
0000000000000000000000000000000000000012576652247421125752100000000000000000000000000000000000000
0000000000000000000000000000000000000125752101247421012577521000000000000000000000000000000000000
0000000000000000000000000000000000012577521001247421000125752100000000000000000000000000000000000
0000000000000000000000000000000001257752100001247421000012577521000000000000000000000000000000000
0000000000000000000000000000000125775210000001247421000000125775210000000000000000000000000000000
0000000000000000000000000000012577521000000001247421000000001257752100000000000000000000000000000
0000000000000000000000000001257752100000000001247421000000000012577521000000000000000000000000000
0000000000000000000000000125777521000000000001247421000000000000125775210000000000000000000000000
0000000000000000000000001257752100000000000001247421000000000000012577752100000000000000000000000
0000000000000000000000125775210000000000000001247421000000000000000125775210000000000000000000000
0000000000000000000012577521000000000000000001247421000000000000000001257775210000000000000000000
0000000000000000001257752100000000000000000001247421000000000000000000001257775210000000000000000
0000000000000012577775210000000000000000000001247421000000000000000000000125777752100000000000000
0000000125777775210000000000000000000000000001247421000000000000000000000000000000125777521000000
0001257777752100000000000000000000000000000001247421000000000000000000000000000000012566777752100
1247775210000000000000000000000000000000000001247421000000000000000000000000000000000012566677421
0000000000000000000000000000000000000000000001247421000000000000000000000000000000000000000000000
0000000000000000000000000000000000000000000001247421000000000000000000000000000000000000000000000
0000000000000000000000000000000000000000000001247421000000000000000000000000000000000000000000000
0000000000000000000000000000000000000000000001247421000000000000000000000000000000000000000000000
0000000000000000000000000000000000000000000001247421000000000000000000000000000000000000000000000
```

```
0000000000000000000000000000000000000000000000000000001247421000000000000000000000000000000000000000000000000000
0000000000000000000000000000000000000000000000000000001247421000000000000000000000000000000000000000000000000000
0000000000000000000000000000000000000000000000000000001247421000000000000000000000000000000000000000000000000000
0000000000000000000000000000000000000000000000000000001247421000000000000000000000000000000000000000000000000000
0000000000000000000000000000000000000000000000000000001247421000000000000000000000000000000000000000000000000000
0000000000000000000000000000000000000000000000000000001247421000000000000000000000000000000000000000000000000000
0000000000000000000000000000000000000000000000000000001247421000000000000000000000000000000000000000000000000000
0000000000000000000000000000000000000000000000000000001247421000000000000000000000000000000000000000000000000000
0000000000000000000000000000000000000000000000000000001247421000000000000000000000000000000000000000000000000000
0000000000000000000000000000000000000000000000000000001247421000000000000000000000000000000000000000000000000000
1247777777777777777777777777777777777777777777777777777777777777777777777777777777777777777777777777777777777421
0000000000000000000000000000000000000000000000000125752247457752100000000000000000000000000000000000000000000000
0000000000000000000000000000000000000000000000012577521247422575210000000000000000000000000000000000000000000000
0000000000000000000000000000000000000000000000125752101247421257752100000000000000000000000000000000000000000000
0000000000000000000000000000000000000000000012577521001247421012575210000000000000000000000000000000000000000000
0000000000000000000000000000000000000000000125752100001247421001257521000000000000000000000000000000000000000000
0000000000000000000000000000000000000000012577521000001247421000125775210000000000000000000000000000000000000000
0000000000000000000000000000000000000001257752100000001247421000001257752100000000000000000000000000000000000000
0000000000000000000000000000000000000125775210000000001247421000000012577521000000000000000000000000000000000000
0000000000000000000000000000000000012577521000000000001247421000000000125775210000000000000000000000000000000000
0000000000000000000000000000000001257752100000000000001247421000000000001257752100000000000000000000000000000000
0000000000000000000000000000000125775210000000000000001247421000000000000012577521000000000000000000000000000000
0000000000000000000000000000012577521000000000000000001247421000000000000000125775210000000000000000000000000000
0000000000000000000000000000125775210000000000000000001247421000000000000000001257752100000000000000000000000000
0000000000000000000000000012577521000000000000000000001247421000000000000000000012577521000000000000000000000000
0000000000000000000000001257775210000000000000000000001247421000000000000000000000125777521000000000000000000000
0000000000000000000000125777521000000000000000000000001247421000000000000000000000001257775210000000000000000000
0000000000000000000125775210000000000000000000000000001247421000000000000000000000000012577521000000000000000000
0000000000000000012577752100000000000000000000000000001247421000000000000000000000000000125777521000000000000000
0000000000000001257775210000000000000000000000000000001247421000000000000000000000000000001257775210000000000000
0000000000001257775210000000000000000000000000000000001247421000000000000000000000000000000012577775210000000000
0000000001257777521000000000000000000000000000000000001247421000000000000000000000000000000000125777521000000000
0000001257775210000000000000000000000000000000000000001247421000000000000000000000000000000000001257775210000000
0001257775210000000000000000000000000000000000000000001247421000000000000000000000000000000000000012577775210000
0124775210000000000000000000000000000000000000000000001247421000000000000000000000000000000000000000000125774210
0000000000000000000000000000000000000000000000000000001247421000000000000000000000000000000000000000000000000000
0000000000000000000000000000000000000000000000000000001247421000000000000000000000000000000000000000000000000000
0000000000000000000000000000000000000000000000000000001247421000000000000000000000000000000000000000000000000000
0000000000000000000000000000000000000000000000000000001247421000000000000000000000000000000000000000000000000000
0000000000000000000000000000000000000000000000000000001247421000000000000000000000000000000000000000000000000000
0000000000000000000000000000000000000000000000000000001247421000000000000000000000000000000000000000000000000000
```

```
000000000000000000000000000000000000000000000000000000000124766642100000000000000000000000000000000000000000000000000000
000000000000000000000000000000000000000000000000000000000124742100000000000000000000000000000000000000000000000000000000
000000000000000000000000000000000000000000000000000000000124742100000000000000000000000000000000000000000000000000000000
000000000000000000000000000000000000000000000000000000000124742100000000000000000000000000000000000000000000000000000000
000000000000000000000000000000000000000000000000000000000124742100000000000000000000000000000000000000000000000000000000
000000000000000000000000000000000000000000000000000000000124742100000000000000000000000000000000000000000000000000000000
000000000000000000000000000000000000000000000000000000000124742100000000000000000000000000000000000000000000000000000000
000000000000000000000000000000000000000000000000000000000124742100000000000000000000000000000000000000000000000000000000
000000000000000000000000000000000000000000000000000000000124742100000000000000000000000000000000000000000000000000000000
000000000000000000000000000000000000000000000000000000000124742100000000000000000000000000000000000000000000124565421000
124777777777777777777777777777777777777777777777777777777777777777777777777777777777777777777777777777777777777777777421
000000000000000000000000000000000000000000000000000012576654745775210000000000000000000000000000000000000000000000000000
000000000000000000000000000000000000000000000000001257766524742257521000000000000000000000000000000000000000000000000000
000000000000000000000000000000000000000000000000012576665224742125775210000000000000000000000000000000000000000000000000
000000000000000000000000000000000000000000000001257766652124742101257521000000000000000000000000000000000000000000000000
000000000000000000000000000000000000000000000012576665210124742100125752100000000000000000000000000000000000000000000000
000000000000000000000000000000000000000000001257766521000124742100012577521000000000000000000000000000000000000000000000
000000000000000000000000000000000000000000125776652100000124742100000125775210000000000000000000000000000000000000000000
000000000000000000000000000000000000000001257765210000000124742100000001257752100000000000000000000000000000000000000000
000000000000000000000000000000000000000012577521000000000124742100000000012577521000000000000000000000000000000000000000
000000000000000000000000000000000000001257752100000000000124742100000000000125775210000000000000000000000000000000000000
000000000000000000000000000000000000125775210000000000000124742100000000000001257752100000000000000000000000000000000000
000000000000000000000000000000000125775210000000000000000124742100000000000000012577521000000000000000000000000000000000
000000000000000000000000000000125775210000000000000000000124742100000000000000000012577521000000000000000000000000000000
000000000000000000000000000125777521000000000000000000000124742100000000000000000000125777521000000000000000000000000000
000000000000000000000000125777521000000000000000000000000124742100000000000000000000000125777521000000000000000000000000
000000000000000000000125775210000000000000000000000000000124742100000000000000000000000000125677521000000000000000000000
000000000000000000125777521000000000000000000000000000000124742100000000000000000000000000001256777521000000000000000000
000000000000000125777521000000000000000000000000000000000124742100000000000000000000000000000012566777521000000000000000
000000000000125777521000000000000000000000000000000000000124742100000000000000000000000000000000125667777521000000000000
0000000001257777521000000000000000000000000000000000000001247421000000000000000000000000000000000001256667775210000000000
000000125777521000000000000000000000000000000000000000000124742100000000000000000000000000000000000012566667775210000000
000125777521000000000000000000000000000000000000000000000124742100000000000000000000000000000000000000012566667777521000
012477521000000000000000000000000000000000000000000000000124742100000000000000000000000000000000000000000012566666774210
000000000000000000000000000000000000000000000000000000000124742100000000000000000000000000000000000000000000000000000000
000000000000000000000000000000000000000000000000000000000124742100000000000000000000000000000000000000000000000000000000
000000000000000000000000000000000000000000000000000000000124742100000000000000000000000000000000000000000000000000000000
000000000000000000000000000000000000000000000000000000000124742100000000000000000000000000000000000000000000000000000000
000000000000000000000000000000000000000000000000000000000124742100000000000000000000000000000000000000000000000000000000
000000000000000000000000000000000000000000000000000000000124742100000000000000000000000000000000000000000000000000000000
```

```
0000000000000000000000000000000000000000000000000000000000000000000000124766421000000000000000000000000000000000000000000000000000000000000000000000
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000012464210
124777777777777777777777777777777777777777777777777777777777777777777777777777777777777777777777777777777777777777777777777777777777777777777777421
0000000000000000000000000000000000000000000000000000000000000000012576654745775210000000000000000000000000000000000000000000000000000000000000000000
0000000000000000000000000000000000000000000000000000000000000001257766524742257521000000000000000000000000000000000000000000000000000000000000000000
0000000000000000000000000000000000000000000000000000000000000012576652124742125775210000000000000000000000000000000000000000000000000000000000000000
0000000000000000000000000000000000000000000000000000000000001257752100124742101257521000000000000000000000000000000000000000000000000000000000000000
0000000000000000000000000000000000000000000000000000000000012575210000124742100125752100000000000000000000000000000000000000000000000000000000000000
0000000000000000000000000000000000000000000000000000000001257752100000124742100012577521000000000000000000000000000000000000000000000000000000000000
0000000000000000000000000000000000000000000000000000001257752100000000124742100000012577521000000000000000000000000000000000000000000000000000000000
0000000000000000000000000000000000000000000000000012577521000000000000124742100000000001257752100000000000000000000000000000000000000000000000000000
0000000000000000000000000000000000000000000000012577521000000000000000124742100000000000001257752100000000000000000000000000000000000000000000000000
0000000000000000000000000000000000000000000012577521000000000000000000124742100000000000000001257752100000000000000000000000000000000000000000000000
0000000000000000000000000000000000000000125775210000000000000000000000124742100000000000000000001257752100000000000000000000000000000000000000000000
0000000000000000000000000000000000000125775210000000000000000000000000124742100000000000000000000000125775210000000000000000000000000000000000000000
0000000000000000000000000000000000125775210000000000000000000000000000124742100000000000000000000000000012577521000000000000000000000000000000000000
0000000000000000000000000000001257775210000000000000000000000000000000124742100000000000000000000000000000125777521000000000000000000000000000000000
0000000000000000000000000001257775210000000000000000000000000000000000124742100000000000000000000000000000000125775210000000000000000000000000000000
0000000000000000000000001257752100000000000000000000000000000000000000124742100000000000000000000000000000000000012577752100000000000000000000000000
0000000000000000000012577752100000000000000000000000000000000000000000124742100000000000000000000000000000000000000012577752100000000000000000000000
0000000000000000012577752100000000000000000000000000000000000000000000124742100000000000000000000000000000000000000000012577752100000000000000000000
0000000000000012577752100000000000000000000000000000000000000000000000124742100000000000000000000000000000000000000000000012577775210000000000000000
0000000000125777752100000000000000000000000000000000000000000000000000124742100000000000000000000000000000000000000000000000012577752100000000000000
0000000125777521000000000000000000000000000000000000000000000000000000124742100000000000000000000000000000000000000000000000000012577752100000000000
0001257775210000000000000000000000000000000000000000000000000000000000124742100000000000000000000000000000000000000000000000000000012566777752100000
0124775210000000000000000000000000000000000000000000000000000000000000124742100000000000000000000000000000000000000000000000000000000125666774210
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000000000000
0000000000000000000000000000000000000000000000000000000000000000000000124742100000000000000000000000000000000000000000000000000000000000000000000000
```

```
00000000000000000000000000000247420000000000000000000000000000
00000000000000000000000000000247420000000000000000000000000000
00000000000000000000000000000247420000000000000000000000000000
00000000000000000000000000000247420000000000000000000000000000
00000000000000000000000000000247420000000000000000000000000000
00000000000000000000000000000247420000000000000000000000000000
00000000000000000000000000000247420000000000000000000000000000
00000000000000000000000000000247420000000000000000000000000000
00000000000000000000000000000247420000000000000000000000000000
00000000000000000000000000000247420000000000000000000000000000
```

```
00000000000000000000000000001257521000000000000000000000000000
00000000000000000000000000001257521000000000000000000000000000
00000000000000000000000000001257521000000000000000000000000000
00000000000000000000000000001257521000000000000000000000000000
00000000000000000000000000001257521000000000000000000000000000
00000000000000000000000000001257521000000000000000000000000000
00000000000000000000000000001257521000000000000000000000000000
00000000000000000000000000001257521000000000000000000000000000
00000000000000000000000000001257521000000000000000000000000000
00000000000000000000000000001257521000000000000000000000000000
00000000000000000000000000001257521000000000000000000000000000
```

```
00000000000000000000000000002357532000000000000000000000000000
00000000000000000000000000002357532000000000000000000000000000
00000000000000000000000000002357532000000000000000000000000000
00000000000000000000000000002357532000000000000000000000000000
00000000000000000000000000002357532000000000000000000000000000
00000000000000000000000000002357532000000000000000000000000000
00000000000000000000000000002357532000000000000000000000000000
00000000000000000000000000002357532000000000000000000000000000
00000000000000000000000000002357532000000000000000000000000000
```

```
000000000000000000000000000124575421000000000000000000000000000
000000000000000000000000000124575421000000000000000000000000000
000000000000000000000000000124575421000000000000000000000000000
000000000000000000000000000124575421000000000000000000000000000
000000000000000000000000000124575421000000000000000000000000000
000000000000000000000000000124575421000000000000000000000000000
000000000000000000000000000124575421000000000000000000000000000
000000000000000000000000000124575421000000000000000000000000000
000000000000000000000000000124575421000000000000000000000000000
000000000000000000000000000124575421000000000000000000000000000
```

```
0000000000000000000000000000000000000000000000000000000000000000
0000000000000000000000000000000000000000000000000000000000000000
1247777777777777777777777777777777777777777777777777777777777421
0000000000000000000000000000000000000000000000000000000000000000
0000000000000000000000000000000000000000000000000000000000000000
```

```
0000000000000000000000000000000000000000000000000000000000000000
0123333333333333333333333333333333333333333333333333333333333210
1247777777777777777777777777777777777777777777777777777777777421
0000000000000000000000000000000000000000000000000000000000000000
0000000000000000000000000000000000000000000000000000000000000000
```

```
0000000000000000000000000000000000000000000000000000000000000000
0000000000000000000000000000000000000000000000000000000000000000
1247777777777777777777777777777777777777777777777777777777777421
0123333333333333333333333333333333333333333333333333333333333210
0000000000000000000000000000000000000000000000000000000000000000
```

```
0000000000000000000000000000000000000000000000000000000000000000
0123333333333333333333333333333333333333333333333333333333333210
1247777777777777777777777777777777777777777777777777777777777421
0123333333333333333333333333333333333333333333333333333333333210
0000000000000000000000000000000000000000000000000000000000000000
```

| ("Hen" radical "魚") |
|---|
| Stroke #1 |
| 7 |
| 7 |
| Stroke #2 |
| 7 |
| Stroke #3 |
| 7 |
| 7 |
| Stroke #4 |
| 7 |
| Stroke #5 |
| 7 |
| Stroke #6 |
| 7 |
| Stroke #7 |
| 7 |
| Stroke #8 |
| 6 |
| Stroke #9 |
| 6 |
| Stroke #10 |
| 6 |
| 7 |
| Stroke #11 |
| 6 |
| 6 |
| Stroke #12 |
| 5 |
| 5 |
| Stroke #13 |
| 5 |
| 5 |

| | | |
|---|---|---|
| "Hen" radical "魚" | | |
| 13 | | |
| 1 | 3 | 1 |
| (33, 255) | | |
| (23, 220) | | |
| (0, 191) | | |
| 2 | 2 | 0 |
| (28, 234) | | |
| (80, 234) | | |
| 3 | 3 | 1 |
| (80, 234) | | |
| (73, 212) | | |
| (62, 191) | | |
| 4 | 2 | 0 |
| (20, 190) | | |
| (83, 190) | | |
| 5 | 2 | 0 |
| (83, 190) | | |
| (83, 77) | | |
| 6 | 2 | 0 |
| (83, 77) | | |
| (20, 77) | | |
| 7 | 2 | 0 |
| (20, 77) | | |
| (20, 190) | | |
| 8 | 2 | 0 |
| (52, 186) | | |
| (52, 78) | | |
| 9 | 2 | 0 |
| (20, 135) | | |
| (83, 135) | | |
| 10 | 3 | 1 |
| (18, 59) | | |
| (14, 30) | | |
| (5, 2) | | |
| 11 | 3 | 1 |
| (81, 58) | | |
| (88, 30) | | |
| (92, 2) | | |
| 12 | 3 | 1 |
| (59, 55) | | |
| (63, 30) | | |
| (66, 3) | | |
| 13 | 3 | 1 |
| (36, 53) | | |
| (39, 28) | | |
| (41, 3) | | |

| |
|---|
| 4458(Character"木") |
| Stroke #1 |
| 7 |
| Stroke #2 |
| 7 |
| Stroke #3 |
| 7 |
| 7 |
| 6 |
| 5 |
| Stroke #4 |
| 7 |
| 7 |
| 7 |
| 7 |

```
000000000000000000000000000000700000000000000000000000000000
000000000000000000000000000000700000000000000000000000000000
000000000000000000000000000000700000000000000000000000000000
000000000000000000000000000000700000000000000000000000000000
000000000000000000000000000000700000000000000000000000000000
000777777777777777777777777777777777777777777777777777777000
000000000000000000000000077000707700000000000000000000000000
000000000000000000000000700000700070000000000000000000000000
000000000000000000000007000000700007700000000000000000000000
000000000000000000000770000000700000077000000000000000000000
000000000000000000077000000000700000000770000000000000000000
000000000000000007700000000000700000000007700000000000000000
000000000000000770000000000000700000000000077000000000000000
000000000000066000000000000000700000000000000770000000000000
000000000006660000000000000000700000000000000007770000000000
000000555500000000000000000000700000000000000000000777700000
000055000000000000000000000000700000000000000000000000770000
000000000000000000000000000000700000000000000000000000000000
000000000000000000000000000000700000000000000000000000000000
000000000000000000000000000000700000000000000000000000000000
```

```
000000000000000000000000000124742100000000000000000000000000
000000000000000000000000000124742100000000000000000000000000
000000000000000000000000000124742100000000000000000000000000
000000000000000000000000000124742100000000000000000000000000
000000000000000000000000000124742100000000000000000000000000
124777777777777777777777777777777777777777777777777777777421
000000000000000000000012577524757752100000000000000000000000
000000000000000000000125752124742575210000000000000000000000
000000000000000000001257521124742257752100000000000000000000
000000000000000000125775210124742112577521000000000000000000
000000000000000012577521000124742100125775210000000000000000
000000000000001257752100000124742100001257752100000000000000
000000000000125775210000000124742100000012577521000000000000
000000000012566521000000000124742100000000125775210000000000
000000001256665210000000000124742100000000001257775210000000
000125555555210000000000000124742100000000000001257777521000
012455521000000000000000000124742100000000000000000125774210
000000000000000000000000000124742100000000000000000000000000
000000000000000000000000000124742100000000000000000000000000
000000000000000000000000000124742100000000000000000000000000
```

CHARACTER DISPLAY APPARATUS, CHARACTER DISPLAY METHOD, AND RECORDING MEDIUM

BACKGROUND OF THE INVENTION

1. Field of the Invention

The present invention relates to a character display apparatus and a character display method capable of displaying a character with a high definition using a color display device, and a recording medium for use with such apparatus and method.

2. Description of the Related Art

For example, a conventional technique for displaying a character on a display apparatus uses a dot font which is based on two binary values corresponding to black and white. In this conventional technique, the outline and inside of each character stroke is displayed in black and the remaining space is displayed in white.

As an improvement to the conventional dot font-based technique, another conventional technique (e.g., Japanese Laid-Open Publication No. 8-255254) uses a gray-scale font. In this conventional technique, a gray-scale area is provided around each black area.

FIG. 1 illustrates an outline of an ideal oblique line 102 which can be output on an output plane 100 by using an output device with a very high resolution. Such an oblique line may be used as a part of a character.

FIG. 2 illustrates the oblique line 102 of FIG. 1 being displayed on a 6×12-pixel display plane 200 using the conventional dot font. Referring to FIG. 2, each hatched box represents a pixel displayed in black and each open box represents a pixel displayed in white.

In FIG. 2, the oblique line 102 of FIG. 1 is displayed as a combination of four line segments, resulting in a substantial degree of jaggedness. Therefore, the shape (a part of a character) illustrated in FIG. 2 cannot be viewed by a human eye as a smooth oblique line. Thus, a character displayed with the conventional dot font cannot be seen by a human eye as a well-defined character because jaggedness occurs along oblique lines or curves of the character. Particularly, when a character is displayed with a small number of dots, a greater degree of jaggedness is observed.

FIG. 3 illustrates the oblique line 102 of FIG. 1 being displayed on a 6×12-pixel display plane 300 using the conventional gray-scale font. Referring to FIG. 3, each level 3 box represents a pixel displayed in black, each level 2 box represents a pixel displayed in dark gray, each level 1 box represents a pixel displayed in light gray, and each level 0 box represents a pixel displayed in white.

Where each color element is controlled with, for example, 256 gray-scale levels, a black corresponding to level 3 is displayed by setting the brightness (R, G, B) of a color element (corresponding to one pixel of a color liquid crystal display apparatus) to (0, 0, 0). Similarly, dark gray corresponding to level 2 is expressed by (R, G, B)=(80, 80, 80), light gray corresponding to level 1 is expressed by (R, G, B)=(160, 160, 160), and white corresponding to level 0 is expressed by (R, G, B)=(255, 255, 255).

The shape (a part of a character) of FIG. 3 appears to have been improved in terms of jaggedness from that of FIG. 2. This is because a gray correction is performed on a dot by dot basis. However, the conventional technique using the gray-scale font has the following problems: the dot-by-dot correction is limited with a low resolution; and the outline of the character or the character itself may be blurred, or the blackness of the character may be non-uniform, because a gray color is used in and around a part of the outline of the character.

SUMMARY OF THE INVENTION

According to one aspect of this invention, a character display apparatus includes: a display device having a plurality of pixels; and a control section for controlling the display device. Each of the pixels includes a plurality of sub-pixels arranged along a predetermined direction. A corresponding one of a plurality of color elements is preassigned to each of the sub-pixels. The control section displays a character on the display device by independently controlling the color elements respectively corresponding to the sub-pixels.

In one embodiment of the invention, an intensity of each of the color elements is represented stepwise through a plurality of color element levels. Each of the sub-pixels has one of the color element levels. The control section sets a color element level of at least one particular sub-pixel corresponding to a basic portion of a character to be displayed on the display device to a predetermined color element level, and sets a color element level of at least one other sub-pixel adjacent to the at least one particular sub-pixel corresponding to the basic portion of the character to a color element level other than the predetermined color element level.

In one embodiment of the invention, the control section defines the basic portion of the character to be displayed on the display device based on an outline of a scaled character.

In one embodiment of the invention, the control section defines the basic portion of the character to be displayed on the display device based on skeleton data which represents a skeleton shape of the character.

In one embodiment of the invention, the control section scales the skeleton data according to a size of the character to be displayed on the display device, an d adjusts a line width of the character after defining the basic portion of the character based on the scaled skeleton data.

In one embodiment of the invention, the control section sets the color element level of the at least one other sub-pixel adjacent to the at least one particular sub-pixel corresponding to the basic portion of the character to the color element level other than the predetermined color element level based on at least one correction pattern.

In one embodiment of the invention, the control section adjusts a line width of the character to be displayed on the display device by selectively using one of the at least one correction pattern.

In one embodiment of the invention, the at least one correction pattern is provided in advance according to a size of the character to be displayed on the display device.

In one embodiment of the invention, the at least one correction pattern is provided in advance so as to correspond to the skeleton data.

In one embodiment of the invention, the at least one correction pattern is provided for each Chinese character radical.

In one embodiment of the invention, the at least one correction pattern is provided in advance according to the number of strokes of the skeleton data.

In one embodiment of the invention, the at least one correction pattern is provided in advance according to an inclination angle of a stroke of the skeleton data.

In one embodiment of the invention, the at least one correction pattern is provided in advance according to a distance between two portions of the basic portion of the character.

In one embodiment of the invention, where an arrangement of the at least one particular sub-pixel corresponding to the basic portion of the character forms a particular pattern, the control section corrects the color element level of the at least one particular sub-pixel corresponding to the basic portion of the character so as to divide the basic portion of the character into at least two portions.

In one embodiment of the invention, the skeleton data includes stroke information associated with each stroke. The control section sets the color element level of the at least one sub-pixel to the color element level other than the predetermined color element level according to a shape of the stroke.

In one embodiment of the invention, the skeleton data includes stroke information associated with each stroke. The control section sets the color element level of the at least one sub-pixel to the color element level other than the predetermined color element level based on a typeface attribute table which defines a feature of the typeface of the character in association with the stroke information.

In one embodiment of the invention, a plurality of typeface attribute tables are provided which define the feature of the typeface of the character in association with the stroke information. The control section sets the color element level of the at least one sub-pixel to the color element level other than the predetermined color element level based on one of the typeface attribute tables which is selectively used according to a size of the character.

In one embodiment of the invention, the control section sets a color element level of at least one sub-pixel adjacent in the predetermined direction to the at least one particular sub-pixel corresponding to the basic portion of the character to a color element level other than the predetermined color element level.

In one embodiment of the invention, the control section sets a color element level of at least one sub-pixel adjacent in a direction perpendicular to the predetermined direction to the at least one particular sub-pixel corresponding to the basic portion of the character to a color element level other than the predetermined color element level.

In one embodiment of the invention, the control section adjusts a line width of the character to be displayed on the display device by controlling the number of sub-pixels corresponding to the basic portion of the character.

In one embodiment of the invention, the control section adjusts a line width of the character to be displayed on the display device by controlling a color element level of a sub-pixel adjacent to the at least one particular sub-pixel corresponding to the basic portion of the character.

In one embodiment of the invention, the control section renders a feature of a typeface of the character to be displayed on the display device by controlling a color element level of a sub-pixel adjacent to the at least one particular sub-pixel corresponding to the basic portion of the character.

In one embodiment of the invention, the control section sets the color element level of one or more of the at least one particular sub-pixel corresponding to the basic portion of the character to be displayed on the display device to a color element level other than the maximum color element level.

In one embodiment of the invention, the control section sets the color element level of the at least one particular sub-pixel corresponding to the basic portion of the character based on a basic portion table.

In one embodiment of the invention, the control section sets the color element level of the at least one sub-pixel arranged in the vicinity of the at least one particular sub-pixel based on predetermined color element level information which is used to determine the color element level of the at least one sub-pixel arranged in the vicinity of the at least one particular sub-pixel corresponding to the basic portion of the character to be displayed on the display device.

In one embodiment of the invention, the character to be displayed on the display device has a color that is an achromatic color.

In one embodiment of the invention, the control section variably adjusts an interval between characters by performing a sub-pixel by sub-pixel control on a position of the character to be displayed on the display device.

In one embodiment of the invention, the control section converts the color element level of the sub-pixel to a brightness level based on a predetermined brightness table which defines a relationship between the color element level of the sub-pixel and the brightness level of the sub-pixel.

In one embodiment of the invention, the brightness table is prepared so as to be suitable for a display characteristic of the display device.

In one embodiment of the invention, the control section displays a character while rotating the sub-pixel arrangement by 90 degrees.

In one embodiment of the invention, the display device is a liquid crystal display device.

In one embodiment of the invention, the liquid crystal display device is a stripe-type liquid crystal display device.

According to another aspect of this invention, a character display method for displaying a character on a display device having a plurality of pixels is provided. Each of the pixels includes a plurality of sub-pixels arranged along a predetermined direction. A corresponding one of a plurality of color elements is pre-assigned to each of the sub-pixels. The method includes the step of displaying a character on the display device by independently controlling the color elements respectively corresponding to the sub-pixels.

According to still another aspect of this invention, a recording medium which can be read by an information display apparatus is provided. The apparatus includes a display device having a plurality of pixels and a controlling section for controlling the display device. Each of the pixels includes a plurality of sub-pixels arranged along a predetermined direction. A corresponding one of a plurality of color elements is pre-assigned to each of the sub-pixels. The recording medium has recorded thereon a program for instructing the control section to perform an operation of displaying a character on the display device by independently controlling the color elements respectively corresponding to the sub-pixels.

The function of the present invention will now be described.

According to the present invention, a plurality of color elements respectively corresponding to a plurality of sub-pixels are independently controlled. Therefore, it is possible to perform a sub-pixel by sub-pixel control which is finer than the conventional pixel by pixel control. Moreover, by appropriately controlling the color element of a sub-pixel in the vicinity of a sub-pixel corresponding to the basic portion of the character, colors of the character other than black can be made less conspicuous to a human eye. As a result, not only the outline of the character but also the character itself can be displayed with a high definition on a display device.

Moreover, according to the present invention, the basic portion of a character is defined based on skeleton data which represents the skeleton shape of a character. The color element level of a sub-pixel corresponding to the basic portion of the character is set to a predetermined color element level. Based on at least one correction pattern (or "transition pattern"), the color element level of a sub-pixel adjacent to the sub-pixel corresponding to the basic portion of the character is set to a color element level other than the predetermined color element level. By independently controlling the color element levels of sub-pixels in this manner, it is possible to perform a sub-pixel by sub-pixel control which is finer than the conventional pixel by pixel control. As a result, it is possible to virtually increase the resolution of a character. Moreover, by appropriately controlling the color element level of a sub-pixel adjacent to a sub-pixel corresponding to the basic portion of the character, colors of the character other than black can be made less conspicuous to a human eye. As a result, not only the outline of the character but also the character itself can be displayed with a high definition on a display device.

Furthermore, according to the present invention, the color element level of at least one particular sub-pixel corresponding to the basic portion of a character to be displayed on the display device is set to a predetermined color element level, while at least one of sub-pixels which is adjacent to the particular sub-pixel in a direction perpendicular to the sub-pixel arrangement direction is set to have a color element level other than the predetermined color element level. By independently controlling the color element levels of sub-pixels in this manner, it is possible to perform a sub-pixel by sub-pixel control which is finer than the conventional pixel by pixel control. As a result, it is possible to virtually increase the resolution of a character. Moreover, by appropriately controlling the color element level of a sub-pixel adjacent to a sub-pixel corresponding to the basic portion of the character, colors of the character other than black can be made less conspicuous to a human eye. As a result, not only the outline of the character but also the character itself can be displayed with a high definition on a display device.

Thus, the invention described herein makes possible the advantages of: (1) providing a character display apparatus capable of displaying a character with a high definition using a color display device; (2) providing a character display method capable of displaying a character with a high definition using a color display device; and (3) a recording medium for use with such apparatus and method.

These and other advantages of the present invention will become apparent to those skilled in the art upon reading and understanding the following detailed description with reference to the accompanying figures.

BRIEF DESCRIPTION OF THE DRAWINGS

FIG. 9 illustrates a brightness table 92 which defines the relationship between the color element level of a sub-pixel and the brightness level of the sub-pixel;

FIG. 10 illustrates another brightness table 94 which defines the relationship between the color element level of a sub-pixel and the brightness level of the sub-pixel:

FIG. 11 illustrates still another brightness table 96 which defines the relationship between the color element level of a sub-pixel and the brightness level of the sub-pixel;

FIG. 25 illustrates a structure of a correction table 2060;

FIG. 26 illustrates a structure of a brightness table 2070;

FIG. 27 illustrates a structure of a brightness table 2080;

FIG. 28 illustrates a structure of a brightness table 2090;

FIG. 33A illustrates a sub-pixel color element level arrangement for stroke #1 of the Chinese character "木";

FIG. 33B illustrates a sub-pixel color element level arrangement for stroke #2 of the Chinese character "木";

FIG. 33C illustrates a sub-pixel color element level arrangement for stroke #3 of the Chinese character "木";

FIG. 33D illustrates a sub-pixel color element level arrangement for stroke #4 of the Chinese character "木";

FIG. 36 illustrates a structure of a correction table 2170;

FIG. 37 illustrates a structure of a correction table 2180;

FIG. 40 illustrates a structure of a correction table 2210;

FIG. 42 illustrates a structure of a correction table 2230;

FIG. 44 illustrates a structure of a correction table 2250;

FIG. 45 illustrates a structure of a correction table 2260;

FIG. 46 illustrates a structure of a correction table 2270;

FIG. 49 illustrates a typeface attribute table 3600 corresponding to the Chinese character "木";

FIGS. 50A to 50C illustrate an exemplary arrangement of an auxiliary pattern and a correction pattern for a vertical stroke;

FIGS. 51A to 51C illustrate an exemplary arrangement of an auxiliary pattern and a correction pattern for a horizontal stroke;

FIGS. 52A to 52C illustrate an exemplary arrangement of an auxiliary pattern and a correction pattern for stroke #1 of the Chinese character "木";

FIGS. 53A to 53C illustrate an exemplary arrangement of an auxiliary pattern and a correction pattern for stroke #4 of the Chinese character "木";

FIG. 54A illustrates an exemplary arrangement of an auxiliary pattern and a correction pattern for the vertical stroke and the horizontal stroke of the Chinese character "木";

FIG. 54B illustrates an example where auxiliary patterns and correction patterns are arranged for strokes #1–#4 of the Chinese character "木" based on a typeface attribute table.

FIG. 55 illustrates a structure of the typeface attribute table 42*f* which is used in the case where one of a plurality of typeface attribute tables is selectively used according to the selected character size;

FIG. 56 illustrates a structure of each of typeface attribute tables #1–#3 for the Chinese character "木";

FIG. 57A illustrates the color element levels set for the respective sub-pixels in the case where the Chinese character "木" is displayed in a size of 32 dots×32 dots;

FIG. 57B illustrates an example where the feature of the typeface of the Chinese character "木" is added to the 32×32-dot Chinese character "木" shown in FIG. 57A by using the typeface attribute table #2;

FIG. 57C illustrates an example where the feature of the typeface of the Chinese character "木" is added to the 32×32-dot Chinese character "木" shown in FIG. 57A by using the typeface attribute table #1;

FIG. 58A illustrates the color element levels set for the respective sub-pixels in the case where the Chinese character "木" is displayed in a size of 40 dots×40 dots;

FIG. 58B illustrates an example where the feature of the typeface of the Chinese character "木" is added to the 40×40-dot Chinese character "木" shown in FIG. 58A by using the typeface attribute table #3;

FIG. 58C illustrates an example where the feature of the typeface of the Chinese character "木" is added to the 40×40-dot Chinese character "木" shown in FIG. 58A by using the typeface attribute table #1;

FIGS. 59A to 59D illustrate an exemplary method for smoothly adjusting the width of a vertical line (basic portion) of a character by placing various correction patterns along the respective sides of the basic portion of the character;

FIGS. 60A to 60D illustrate an exemplary method for smoothly adjusting the width of a horizontal line (basic portion) of a character by placing various correction patterns along the respective sides of the basic portion of the character;

FIGS. 61A to 61C illustrate an exemplary method for smoothly adjusting the width of a horizontal line (basic portion) of a character by adjusting the color element level of each sub-pixel along the upper side of the basic portion of the character;

FIG. 63 illustrates a structure of skeleton data 3800 representing the skeleton shape of the "hen" radical of the Chinese character "魚";

FIG. 65A illustrates an example where the color element level of each sub-pixel of the basic portion corresponding to the "hen" radical of the Chinese character "魚" is set to level 7, with correction patterns being placed along the left side and the right side of the basic portion;

FIG. 65B illustrates an example where the color element level of a part of the basic portion corresponding to the "hen" radical of the Chinese character "魚" is set to level 5 or level 6 based on the basic portion table 3700;

FIG. 66 illustrates a structure of a basic portion table 3900 corresponding to the Chinese character "木";

FIG. 67A illustrates an example where the color element level of a part of the basic portion corresponding to the Chinese character "木" is set to level 5 or level 6 based on the basic portion table 3900; and FIG. 67B illustrates an example where a correction pattern (4, 2, 1) or (5, 2, 1) is placed on the left side and the right side of the basic portion of the character.

DESCRIPTION OF THE PREFERRED EMBODIMENTS

First, the character display principle of the present invention will be described. The character display principle is commonly used in all embodiments to be described below.

Figure 4:
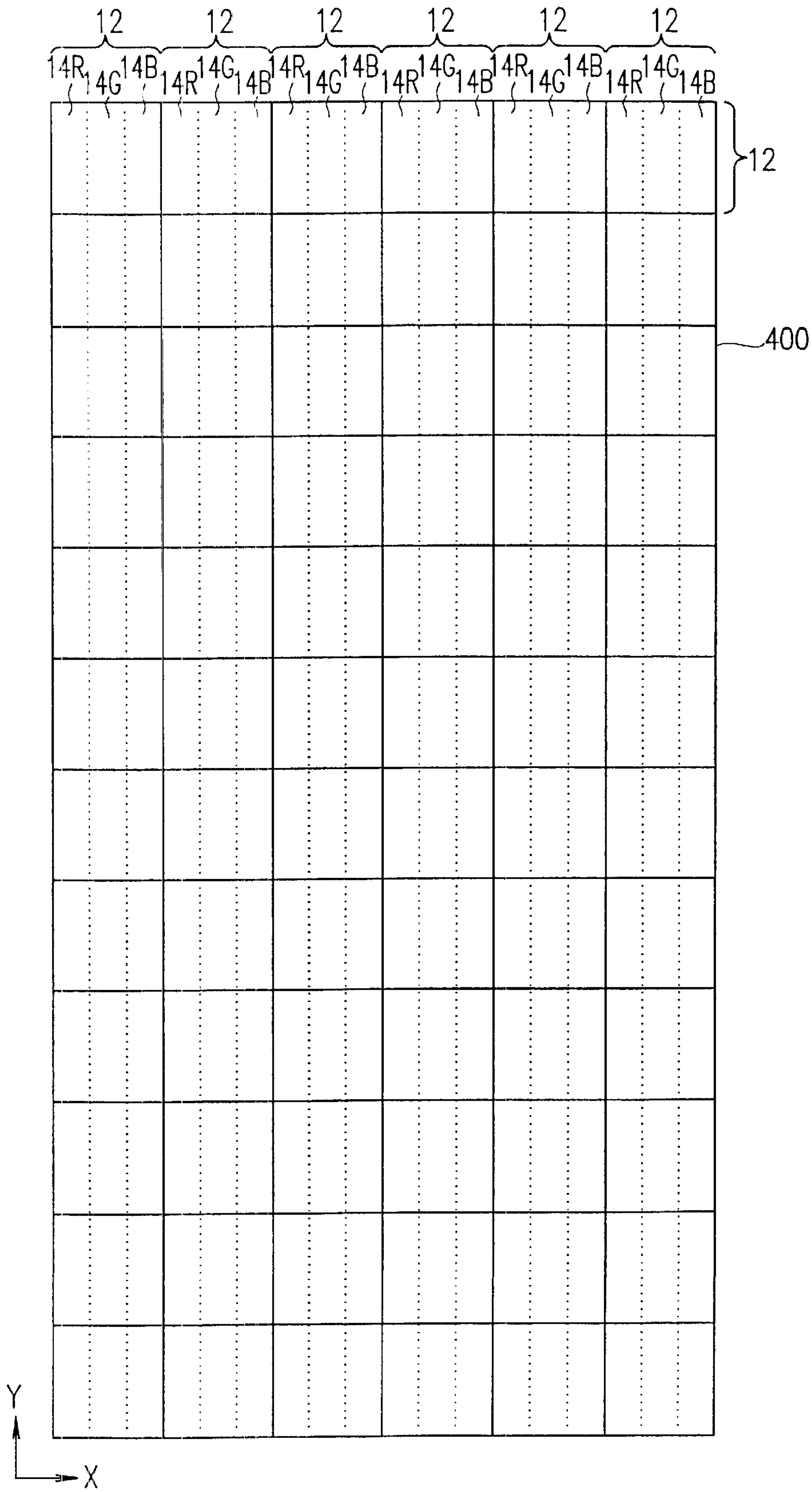
FIG. 4 schematically illustrates a display plane 400 of a display device 10 (FIGS. 15A to 15E) which can be used with a character display apparatus la of the present invention.

FIG. 4 schematically illustrates a display plane 400 of a display device 10 which can be used with the character display apparatus of the present invention. The display device 10 includes a plurality of pixels 12 which are arranged along the X and Y directions. Each of the pixels 12 includes a plurality of sub-pixels which are arranged along the X direction. In the example illustrated in FIG. 4, each pixel 12 includes three sub-pixels 14R, 14G and 14B.

The sub-pixel 14R is pre-assigned to a color element R so as to output color R (red). The sub-pixel 14G is pre-assigned to a color element G so as to output color G (green). The sub-pixel 14B is pre-assigned to a color element B so as to output color B (blue).

The brightness of each of the sub-pixels 14R, 14G and 14B is represented by a value ranging from 0 to 255, for example. When each of the sub-pixels 14R, 14G and 14B may independently take a value ranging from 0 to 255, it is possible to display about 16,700,000 (=256×256×256) different colors.

When a character is displayed with a conventional dot font or gray-scale font as described above, each dot of the character is associated with one pixel of the display apparatus. On the contrary, each dot of a character to be displayed on the display device 10 is associated with one of the sub-pixels 14R, 14G and 14B included in the pixel 12. Thus, even when using a conventional display device, the resolution of the display device can be virtually increased threefold. As a result, parts of a character such as oblique lines or curves can be displayed smooth, thereby significantly improving the character display quality.

However, when simply changing the unit of character display from pixels to sub-pixels, the displayed character will not be observed by a human eye to be black, but rather color stripes (color noise) will be observed. This is because the sub-pixels 14R, 14G and 14B aligned along the X direction are pre-assigned to different color elements, respectively. In order to prevent the displayed character from being observed by a human eye to be non-black, the present invention appropriately controls the color element level of a sub-pixel adjacent to a sub-pixel corresponding to the basic portion of the character. In this way, colors of the character other than black can be made less conspicuous to a human eye.

Thus, the present invention independently controls the color elements (R, G, B) which respectively correspond to the sub-pixels 14R, 14G and 14B included in one pixel 12, while appropriately controlling the color element level of a sub-pixel adjacent to a sub-pixel corresponding to the basic portion of the character. In this way, not only the outline of the character but also the character itself can be displayed in a virtual black color with a high definition. The term "virtual black color" as used herein refers to a color which is not black in a chromatically strict sense but which can be observed by a human eye to be black.

The present invention is not limited to those applications where a black character is displayed. Rather, the display principle of the present invention can be used to display a character in an achromatic color. For example, when the display principle of the present invention is used to display a character in a gray color, effects similar to those described above can be obtained. When displaying a gray character, the relationship between the color element level and the brightness level as defined in a brightness table 92 of FIG. 9 can be changed so that color element levels 5–0 correspond to a range of brightness levels from 0 to 127.

Figure 1:
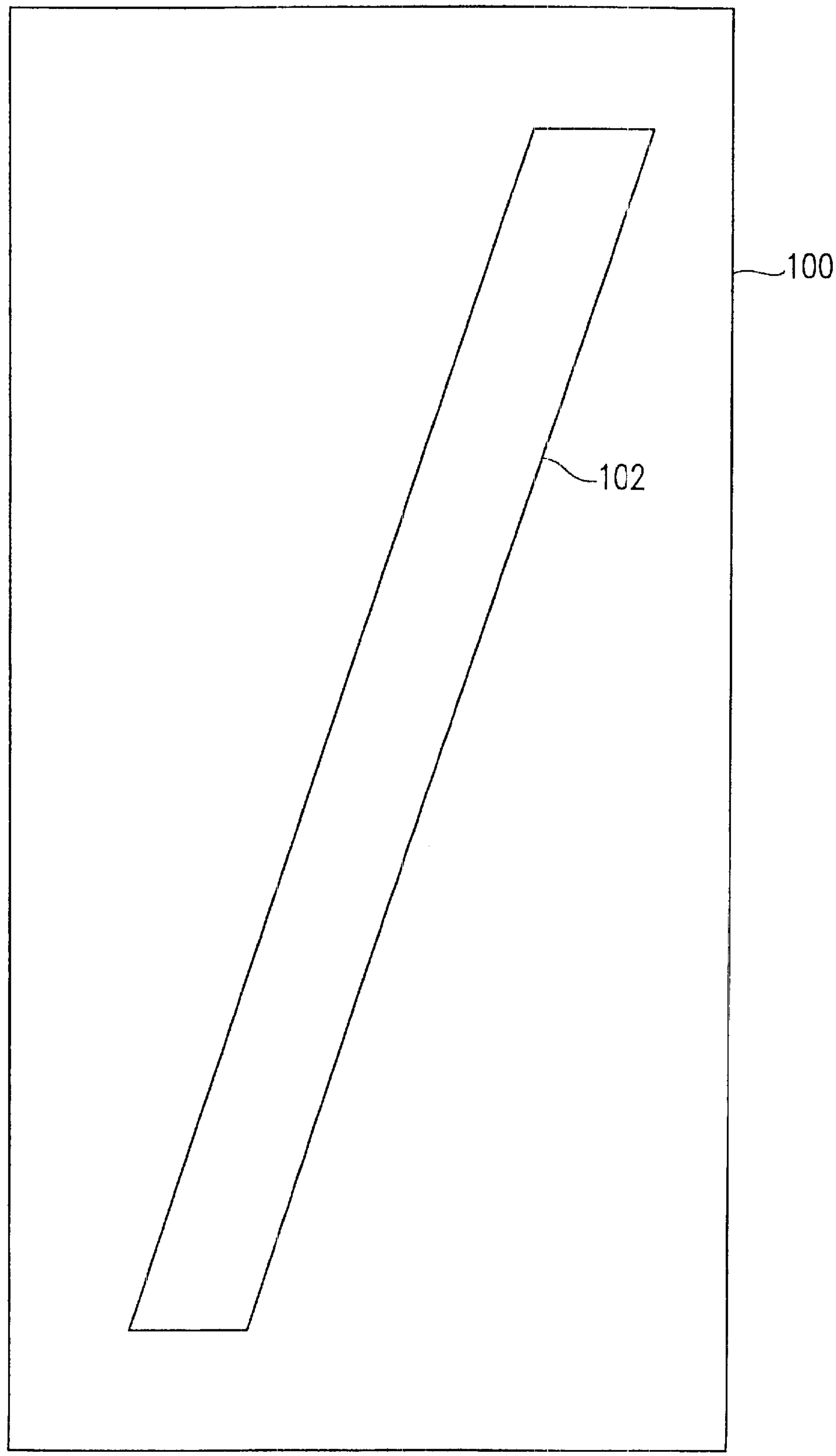
FIG. 1 illustrates an outline of an ideal oblique line 102.
Figure 2:
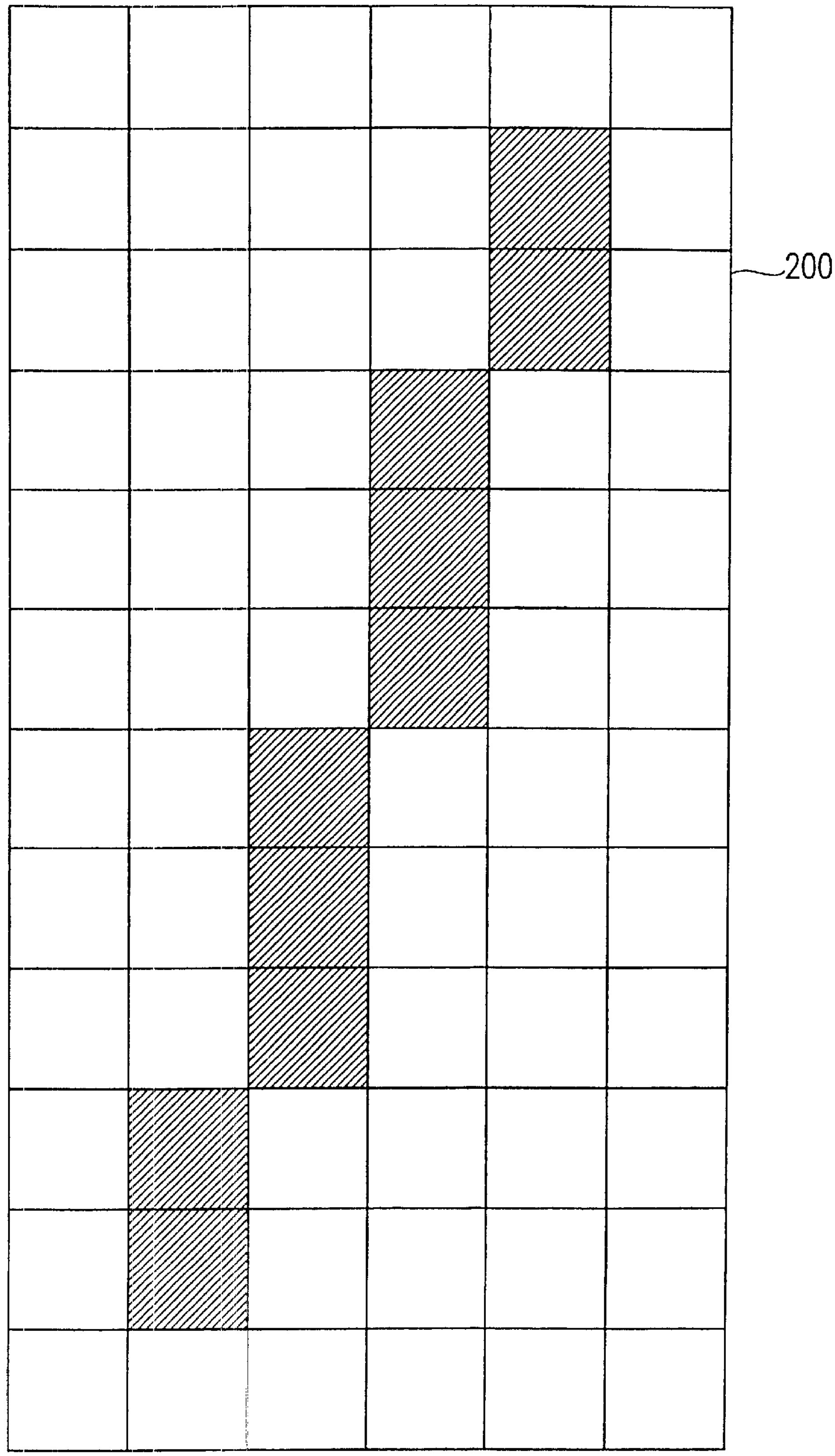
FIG. 2 illustrates the oblique line 102 of FIG. 1 being displayed on a display plane 200 using a conventional dot font.
Figure 3:
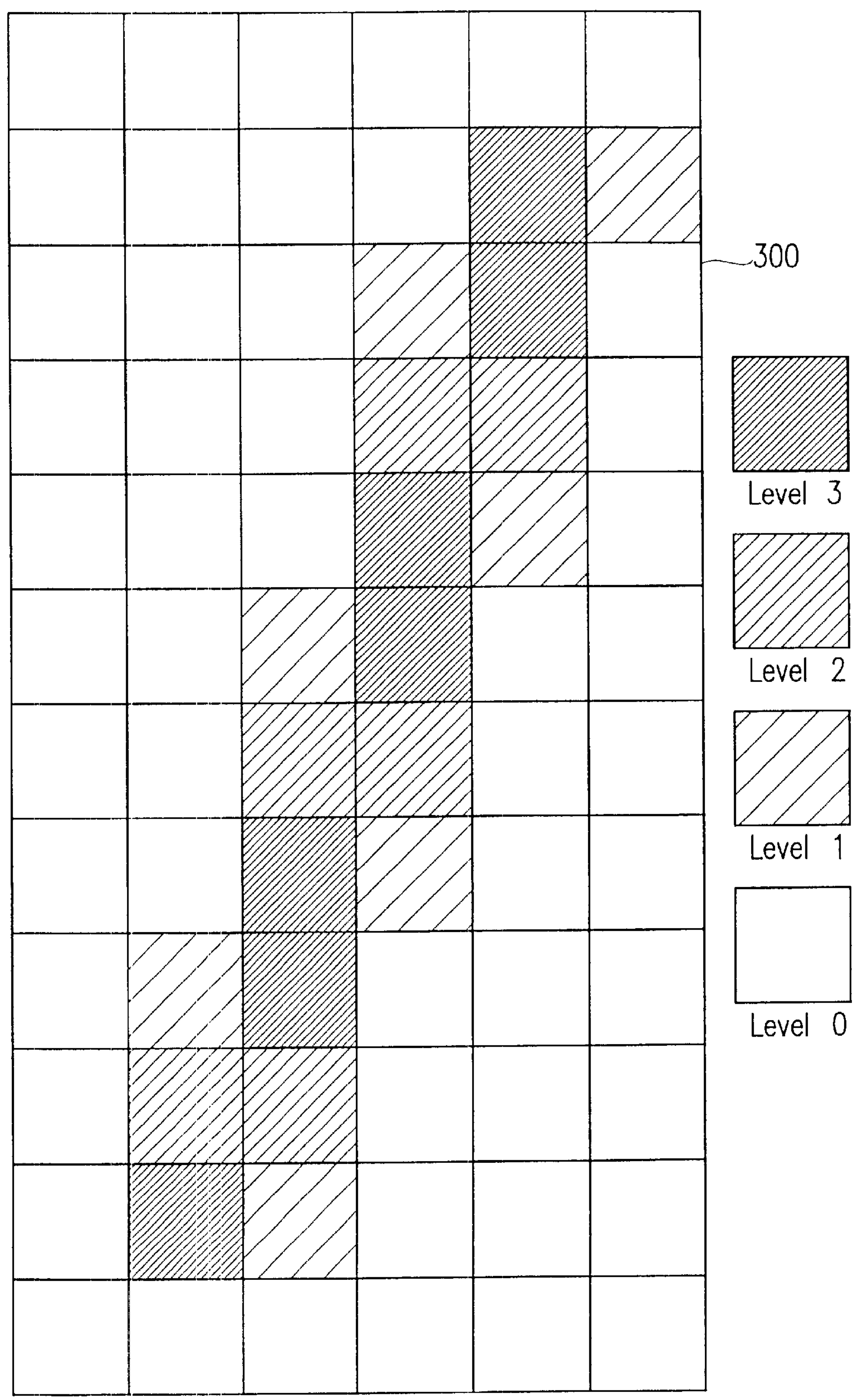
FIG. 3 illustrates the oblique line 102 of FIG. 1 being displayed on a display plane 300 using a conventional gray-scale font.
Figure 5:
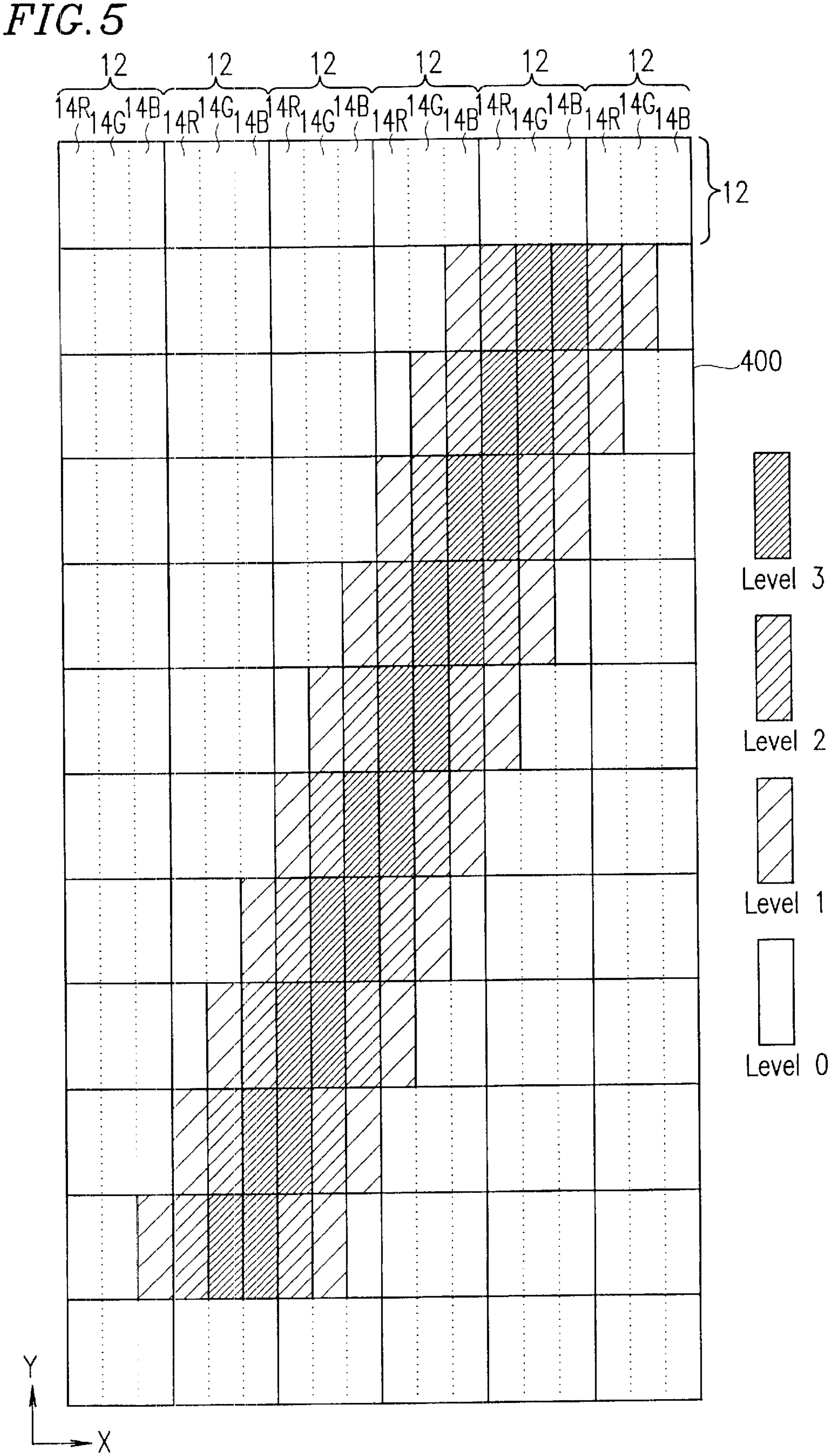
FIG. 5 illustrates the oblique line 102 of FIG. 1 being displayed on the display plane 400 of the display device 10.

FIG. 5 illustrates the oblique line 102 of FIG. 1 being displayed on the 6×12-pixel display plane 400 of the display device 10. In the example illustrated in FIG. 5, the color element level of each of the sub-pixels 14R, 14G and 14B is controlled through four different levels, i.e., level 3 to level 0. In FIG. 5, each level 3 box represents a sub-pixel whose brightness level is 0, each level 2 box represents a sub-pixel whose brightness level is 80, each level 1 box represents a sub-pixel whose brightness level is 180, and each level 0 box represents a sub-pixel whose brightness level is 255.

The color element level of each sub-pixel corresponding to the basic portion of the character is set to level 3 (the maximum color element level). The color element level of each sub-pixel which is adjacent to a sub-pixel corresponding to the basic portion of the character is set to level 2 or level 1.

Figure 6:
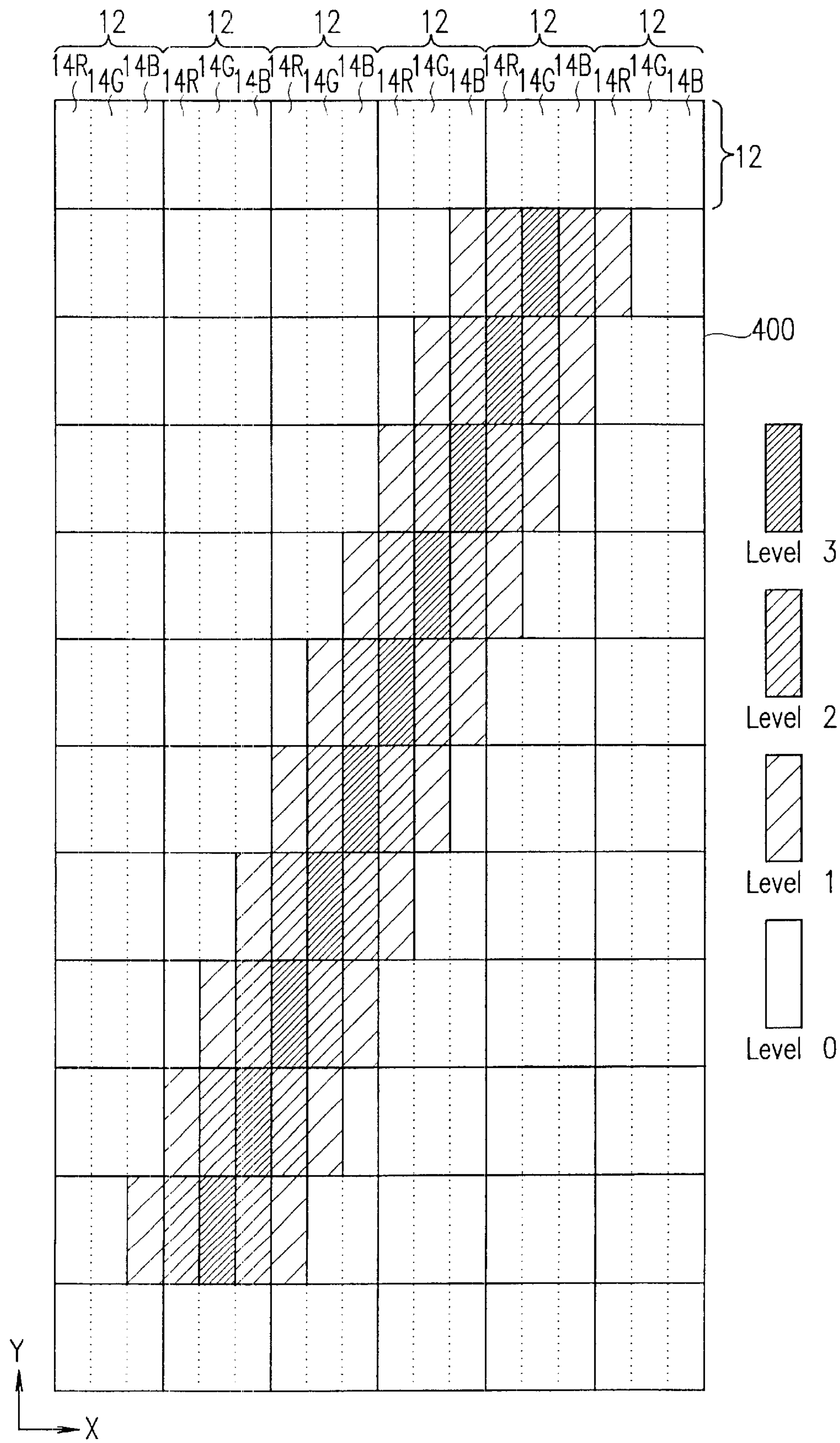
FIG. 6 illustrates the oblique line 102 of FIG. 1 being displayed on the display plane 400 of the display device 10 to be narrower than that illustrated in FIG. 5.

FIG. 6 illustrates the oblique line 102 of FIG. 1 being displayed on the display plane 400 of the display device 10 to be narrower than that illustrated in FIG. 5. Such a display can be achieved by changing the width of the basic portion of the character (i.e., the width of the line corresponding to level 3) from a 2 sub-pixel width to a 1 sub-pixel width.

Figure 7:
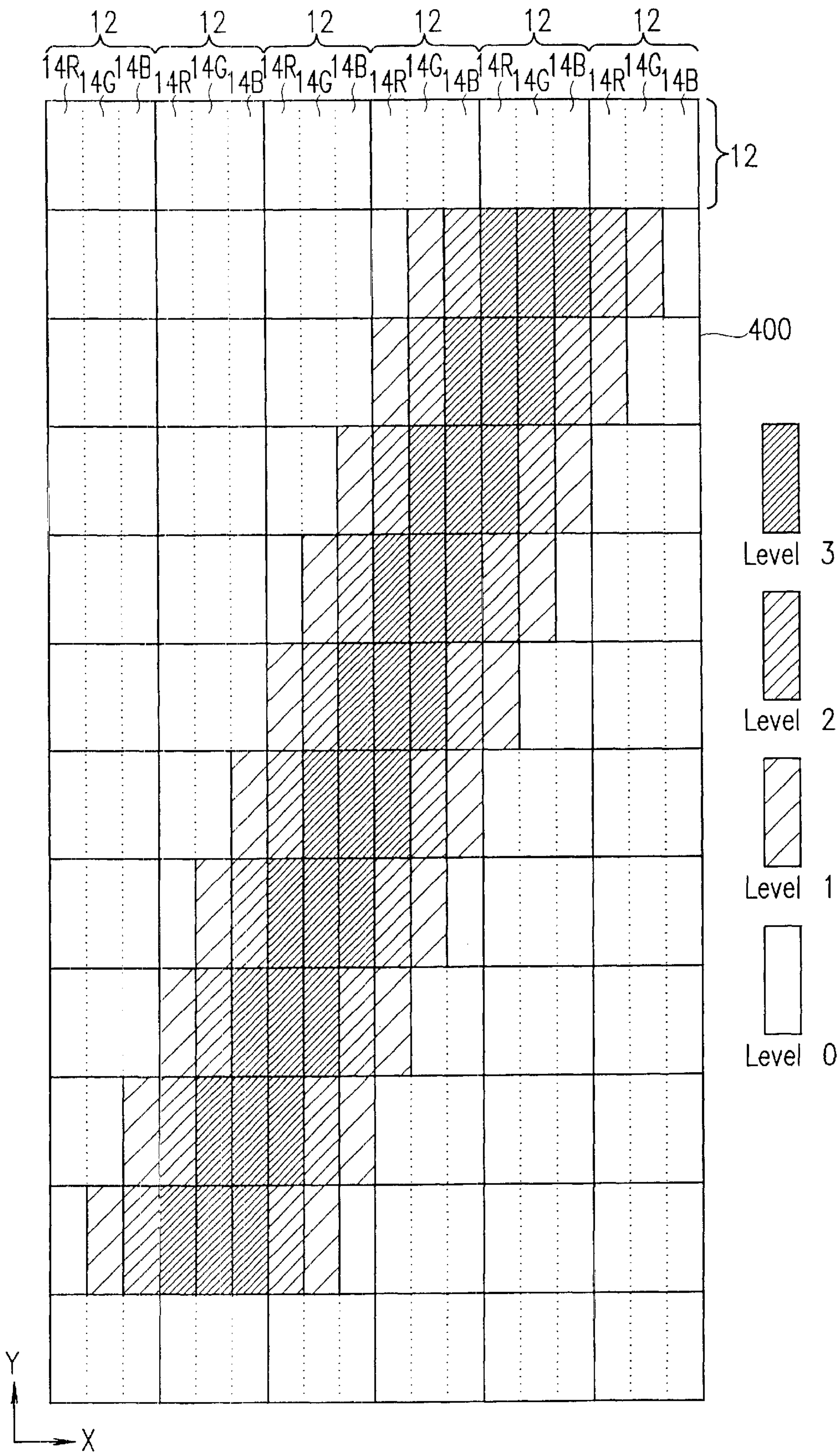
FIG. 7 illustrates the oblique line 102 of FIG. 1 being displayed on the display plane 400 of the display device 10 to be wider than that illustrated in FIG. 5.

FIG. 7 illustrates the oblique line 102 of FIG. 1 being displayed on the display plane 400 of the display device 10 to be wider than that illustrated in FIG. 5. Such a display can be achieved by changing the width of the basic portion of the character (i.e., the width of the line corresponding to level 3) from a 2 sub-pixel width to a 3 sub-pixel width.

Thus, by adjusting the width of the basic portion of a character on a sub-pixel by sub-pixel basis, it is possible to perform a finer control on the width of the character.

Figure 8:
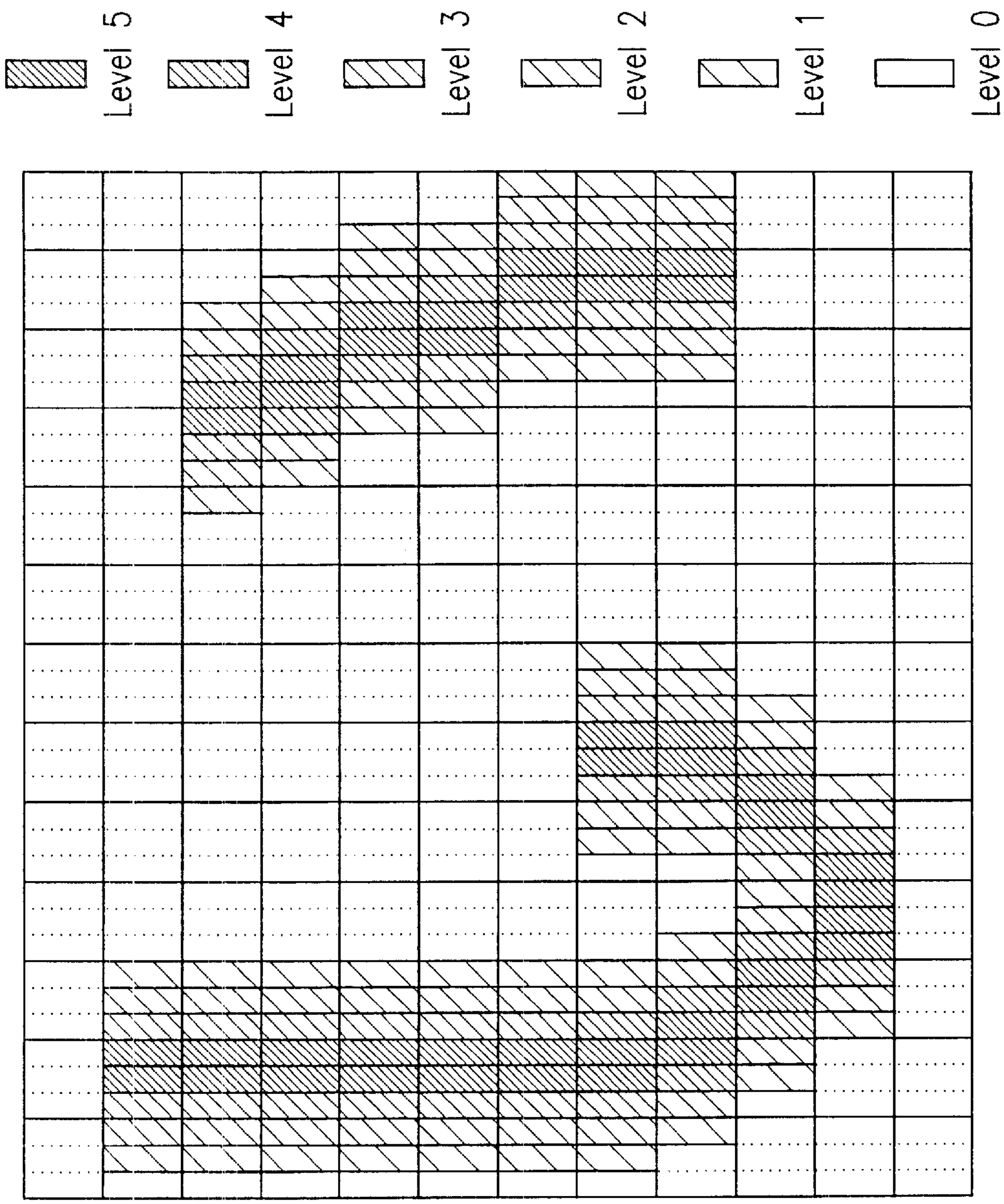
FIG. 8 illustrates font data of a Japanese character "い" which is designed based on the character display principle of the present invention.

FIG. 8 illustrates font data of a Japanese character "い" which is designed based on the character display principle of the present invention. In the example illustrated in FIG. 8, the color element level of each sub-pixel is controlled through six levels, i.e., level 5 to level 0. By increasing the number of color element levels of a sub-pixel, colors of the character other than black can be made less conspicuous to a human eye.

FIG. 9 illustrates the brightness table 92 which defines the relationship between the color element level of a sub-pixel (level 5 to level 0) and the brightness level of the sub-pixel. By storing the brightness table 92 in a memory device, the color element level of each sub-pixel can easily be converted to a brightness level. In the brightness table 92, the six color element levels (level 5 to level 0) are assigned over the range of brightness levels of 0 to 255 at substantially regular intervals.

FIG. 10 illustrates another brightness table 94 which defines the relationship between the color element level of a sub-pixel (level 5 to level 0) and the brightness level of the sub-pixel. In the brightness table 94, brightness levels corresponding to color element levels 5 to 3 are shifted toward the brightness level of 0, and other brightness levels corresponding to color element levels 2 to 0 are shifted toward the brightness level of 255. When the brightness table 94 of FIG. 10 is used, the apparent width of each character stroke can be reduced from that obtained when the brightness table 92 of FIG. 9 is used. In other words, with the brightness table 94 of FIG. 10, the character can be seen more "tightly" by human being.

FIG. 11 illustrates still another brightness table 96 which defines the relationship between the color element level of a sub-pixel (level 5 to level 0) and the brightness level of the sub-pixel. The brightness table 96 is particularly suitable when the display device 10 is a color liquid crystal display device. Even when the brightness level of a sub-pixel of a color element B is relatively low, it is possible with the brightness table 96 to correct the brightness of the sub-pixel of the color element B, thereby preventing the sub-pixel from appearing darker than optimum. Thus, a brightness table suited for the display characteristic of the display device 10 can be employed so as to make colors of the character other than black less conspicuous to a human eye.

Moreover, according to the character display principle of the present invention, the interval between characters can be adjusted on a sub-pixel by sub-pixel basis. Thus, it is possible to perform a finer control on the character interval than that possible with the conventional method where the character interval is controlled on a pixel by pixel basis. Therefore, the display principle of the present invention can suitably be used with a proportional font whose character interval needs to be variably controlled. By applying the display principle of the present invention to a proportional font, it is possible to realize a uniquely clear and smooth character set.

Figure 12:
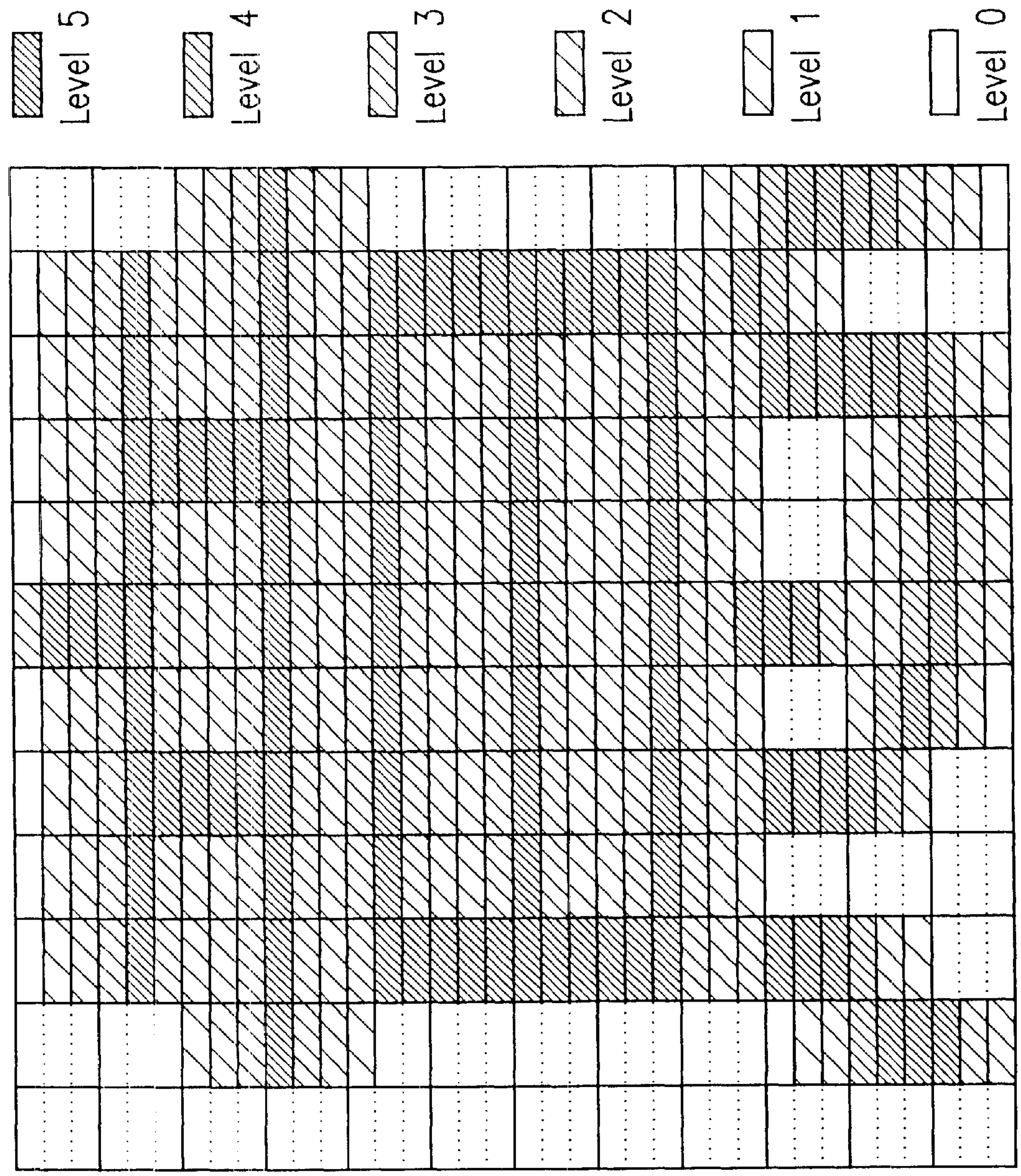
FIG. 12 illustrates font data of a Chinese character "意" which is designed based on the character display principle of the present invention.

FIG. 12 illustrates font data of a Chinese character "意" which is designed based on the character display principle of the present invention. A character having many horizontal strokes such as the Chinese character "意" can be displayed with a better quality when the display plane 400 of the display device 10 is used in the horizontal position by rotating it by 90 degrees than in the vertical position.

Figure 13:
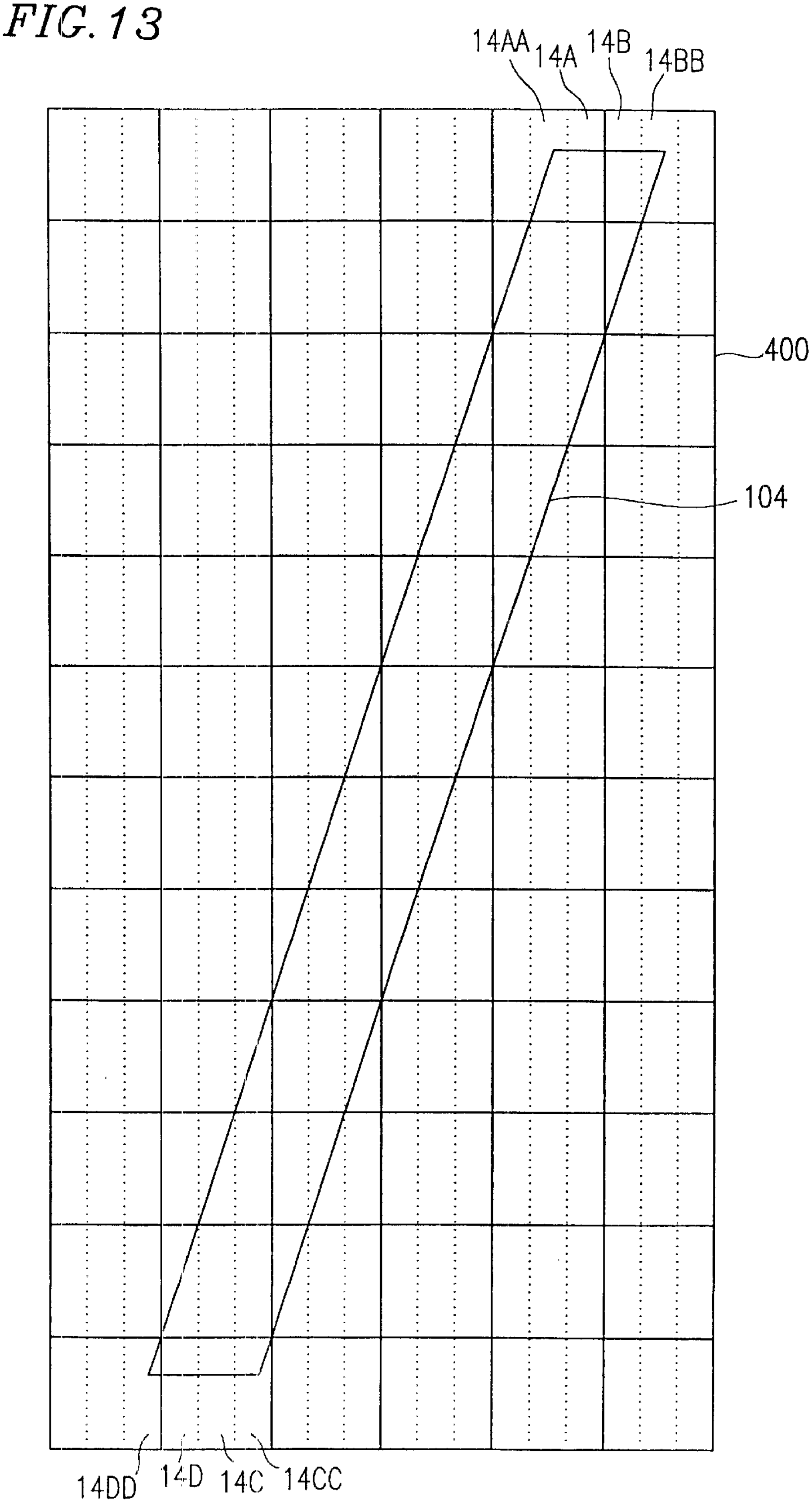
FIG. 13 illustrates an ideal oblique line 104 being displayed on the display plane 400 of the display device 10.

FIG. 13 illustrates an ideal oblique line 104 being displayed on the 6×12-pixel display plane 400 of the display device 10, with each of the top and bottom portions of the ideal oblique line 104 partially overlapping some sub-pixels. In such a case, a particular process is preferably performed on the top and bottom portions of the ideal oblique line 104. The particular process will now be described.

For example, the color element level of each sub-pixel overlapped by the top or bottom portion of the ideal oblique line 104 may be determined according to the overlap area, i.e., the area over which the top or bottom portion of the ideal oblique line 104 overlaps the sub-pixel. Where the color element level of each sub-pixel is controlled through, for example, four levels, i.e., level 3 to level 0, if the overlap area is equal to or greater than 80% of the area of the sub-pixel, the color element level of the sub-pixel is set to level 3. Similarly, if the overlap area is equal to or greater than 50% and less than 80% of the area of the sub-pixel, the color element level of the sub-pixel is set to level 2. If the overlap area is equal to or greater than 20% and less than 50% of the area of the sub-pixel, the color element level of the sub-pixel is set to level 1. If the overlap area is less than 20% of the area of the sub-pixel, the color element level of the sub-pixel is set to level 0.

In FIG. 13, the ideal oblique line 104 overlaps the sub-pixel 14A over an area that is equal to or greater than 50% and less than 80% of the area of the sub-pixel 14A, and the ideal oblique line 104 also overlaps the sub-pixel 14B over an area that is equal to or greater than 50% and less than 80% of the area of the sub-pixel 14B. Therefore, the color element level of the sub-pixel 14A and that of the sub-pixel 14B are both set to level 2.

Moreover, the color element level of the sub-pixel 14AA which is adjacent to the sub-pixel 14A along the X direction is set to level 1, and the color element level of the sub-pixel 14BB which is adjacent to the sub-pixel 14B along the X direction is also set to level 1. Thus, the color element level of the sub-pixel 14AA or 14BB adjacent to the sub-pixel 14A or 14B that corresponds to an end of the ideal oblique line 104 is set so as to complement the color element level of the sub-pixel 14A or 14B.

In FIG. 13, the ideal oblique line 104 overlaps the sub-pixel 14C over an area that is equal to or greater than 20% and less than 50% of the area of the sub-pixel 14C, and the ideal oblique line 104 also overlaps the sub-pixel 14D over an area that is equal to or greater than 20% and less than 50% of the area of the sub-pixel 14D. Therefore, the color element level of the sub-pixel 14C and that of the sub-pixel 14D are both set to level 1.

The color element level of the sub-pixel 14CC which is adjacent to the sub-pixel 14C along the X direction is set to level 0, and the color element level of the sub-pixel 14DD which is adjacent to the sub-pixel 14D along the X direction is also set to level 0. Thus, when the color element level of each sub-pixel 14C or 14D corresponding to one end of the ideal oblique line 104 is level 1, the color element level of each adjacent sub-pixel 14CC or 14DD is level 0 without complementing the color element level of the sub-pixel 14C or 14D.

Figure 14:
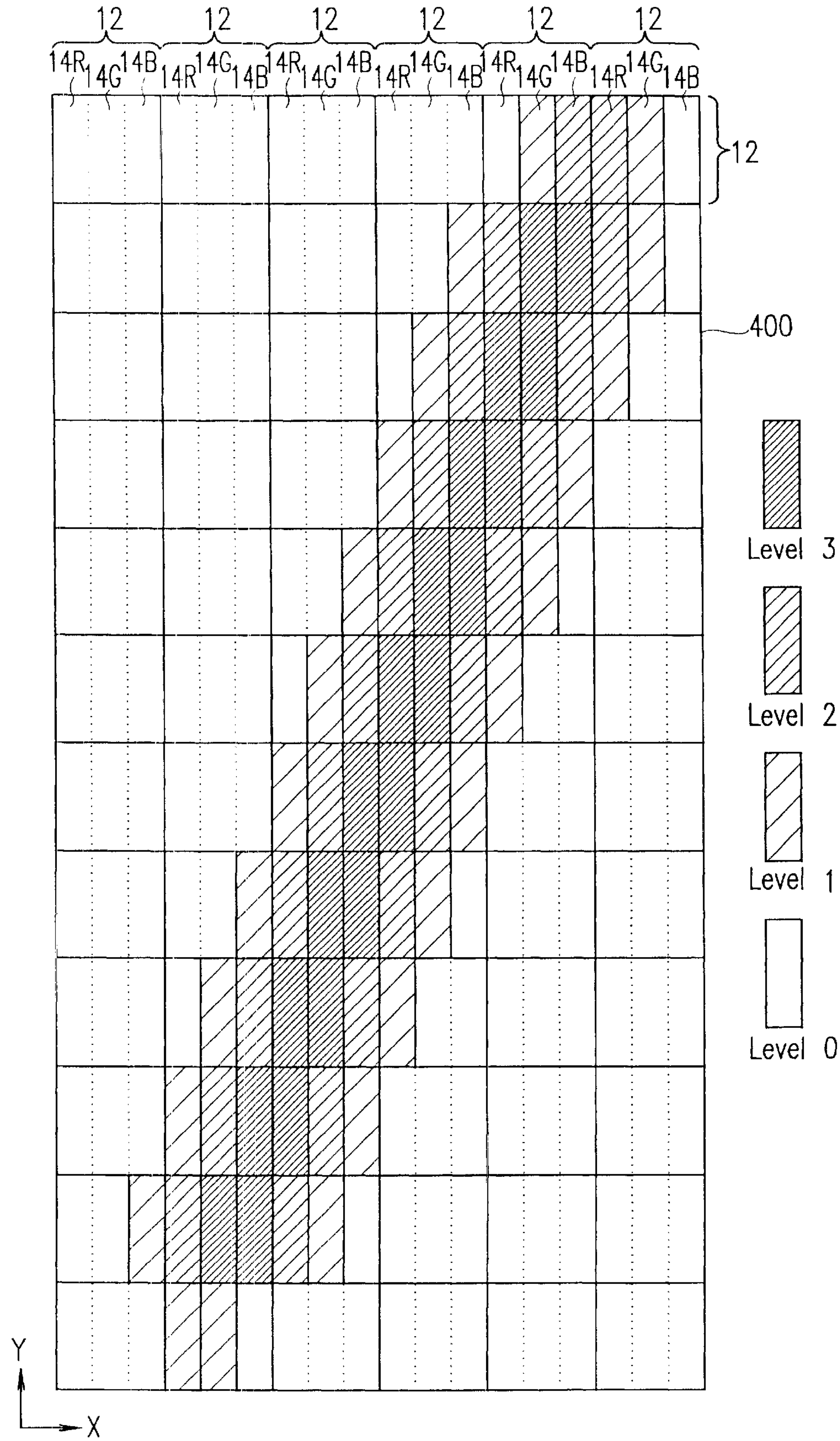
FIG. 14 illustrates the ideal oblique line 104 of FIG. 13 being displayed on the display plane 400 of the display device 10.

FIG. 14 illustrates the ideal oblique line 104 of FIG. 13 being displayed on the 6×12-pixel display plane 400 of the display device 10.

The display device 10 may be a stripe-type color liquid crystal display device. Alternatively, the display device 10 may be a delta-type color liquid crystal display device. Even with a delta-type color liquid crystal display device, effects similar to those provided by a stripe-type color liquid crystal display device can be obtained by independently controlling R, G, B sub-pixels which correspond to one pixel. The color liquid crystal display device may be a transmission type liquid crystal display device, which is widely used in personal computers, or the like, as well as a reflection type or rear projection type liquid crystal display device. However, the display device 10 is not limited to those color liquid crystal display devices. The display device 10 may be any color display apparatus including a plurality of pixels which are arranged along the X and Y directions (so-called "X–Y matrix display apparatus").

Moreover, the number of sub-pixels included in each sub-pixel 12 is not limited to three. The sub-pixel 12 may include any number (two or more) of sub-pixels arranged in a predetermined direction. For example, when N ($N \geqq 2$) color elements are used to represent a color, each sub-pixel 12 may include N sub-pixels.

The order of arrangement of the sub-pixels 14R, 14G and 14B is not limited to that illustrated in FIG. 4. For example, the sub-pixels may be arranged in the order of B, G, R along the X direction. Moreover, the direction of arrangement of the sub-pixels 14R, 14G and 14B is not limited to that illustrated in FIG. 4. The sub-pixels 14R, 14G and 14B may be arranged in any direction.

Furthermore, the group of color elements for use with the present invention is not limited to R (red), G (green), B (blue). Alternatively, the color elements may be C (cyan), Y (yellow), M (magenta).

Embodiments of the present invention will now be described with reference to the accompanying drawings.

Embodiment 1

Figure 15A:
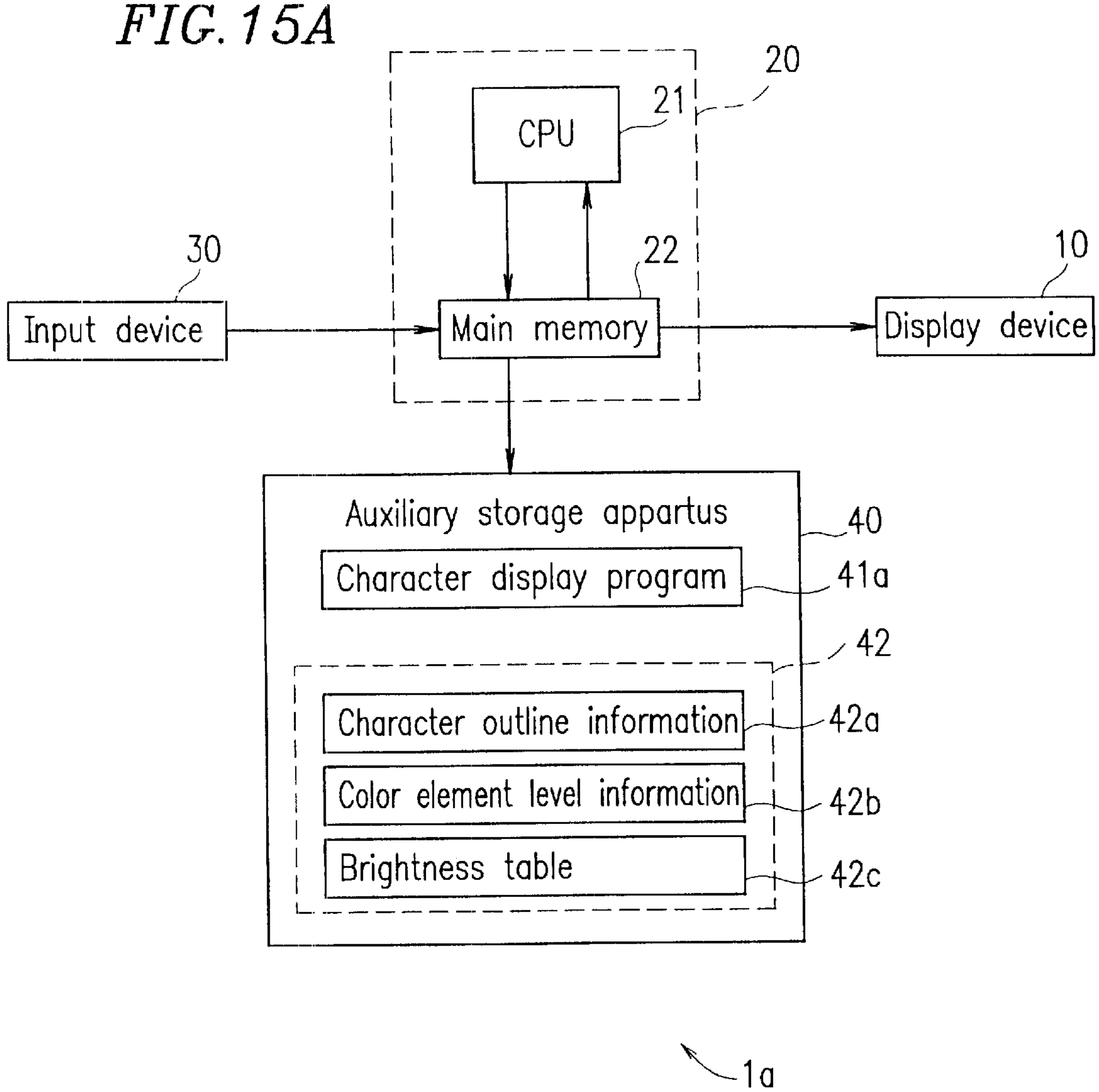
FIG. 15A illustrates a structure of a character display apparatus 1*a* according to Embodiment 1 of the present invention.

FIG. 15A illustrates a structure of a character display apparatus 1*a* according to Embodiment 1 of the present invention. The character display apparatus 1*a* maybe, for example, a personal computer. Such a personal computer may be of any type such as a desk top type or lap top type computer. Alternatively, the character display apparatus 1*a* may be a word processor.

Moreover, the character display apparatus 1*a* may alternatively be any other electronic apparatus or information apparatus incorporating a color display device. For example, the character display apparatus 1*a* may be an electronic apparatus incorporating a color liquid crystal display device, a portable information terminal which is a portable information tool, a portable phone including a PHS, a general-purpose communication apparatus such as a telephone/FAX, or the like.

The character display apparatus 1*a* includes the display device 10 capable of performing a color display, and a control section 20 for independently controlling a plurality of color elements respectively corresponding to a plurality of sub-pixels included in the display device 10. The control section 20 is connected to the display device 10, an input device 30 and an auxiliary storage apparatus 40.

The input device 30 is used to input to the control section 20 character information representing a character to be displayed on the display device 10. For example, the character information may include a character code for identifying the character and a character size indicating the size of the character to be displayed. The input device 30 may be any type of input device through which the character code and the character size can be input. For example, a keyboard, a mouse or a pen-type input device may suitably be used as the input device 30.

The auxiliary storage apparatus 40 stores a character display program 41*a* and data 42 which is required to execute the character display program 41*a*. The data 42 includes character outline information 42*a*, which defines the outline of the character, color element level information 42*b* and a brightness table 42*c*. For example, the brightness table 42*c* may be the brightness table 92 (FIG. 9), the brightness table 94 (FIG. 10) or the brightness table 96 (FIG. 11). The auxiliary storage apparatus 40 may be any type of storage apparatus capable of storing the character display program 41*a* and the data 42. Any type of recording medium may be used in the auxiliary storage apparatus 40 for storing the character display program 41*a* and the data 42. For example, a hard disk, CD-ROM, MO, floppy disk, MD, DVD, IC card, optical card, or the like, may suitably be used as the auxiliary storage apparatus 40.

The present invention is not limited to applications where the character display program 41*a* and the data 42 are stored on a recording medium in the auxiliary storage apparatus 40. For example, the character display program 41*a* and the data 42 may alternatively be stored in a main memory 22 or in a ROM (not shown). For example, such a ROM may be a mask ROM, EPROM, EEPROM, flash ROM, or the like. In such a ROM-based system, it is possible to realize various types of processing only by switching a ROM to another. For example, the ROM-based system may suitably be used with a portable terminal apparatus or a portable phone.

The recording medium for storing the character display program 41*a* and the data 42 may be those which carry a program and/or data in a fixed manner such as the disk or card type storage apparatus or a semiconductor memory, as well as those which carry a program and/or data in a flexible manner such as a communication medium used for transferring a program and/or data in a communication network. When the character display apparatus 1*a* is provided with means for connecting to a communication line, including the Internet, the character display program 41*a* and the data 42 may be downloaded from the communication line. In such a case, a loader program required for the download may be either pre-stored in a ROM (not shown) or installed from the auxiliary storage apparatus 40 into the control section 20.

Other character display programs 41*b* to 41*d* to be described below may be handled in a manner similar to that for the character display program 41*a*.

The control section 20 includes a CPU 21 and the main memory 22.

The CPU 21 controls and monitors the entire character display apparatus 1*a*, and also executes the character display program 41*a* stored in the auxiliary storage apparatus 40.

The main memory 22 temporarily stores data which has been input through the input device 30, data to be displayed on the display device 10, or data which is required to execute the character display program 41*a*. The main memory 22 is accessed by the CPU 21.

The CPU 21 generates a character pattern by executing the character display program 41*a* based on various data stored in the main memory 22. The generated character pattern is once stored in the main memory 22 and then output to the display device 10. The timing at which the character pattern is output to the display device 10 is controlled by the CPU 21.

Figure 16:
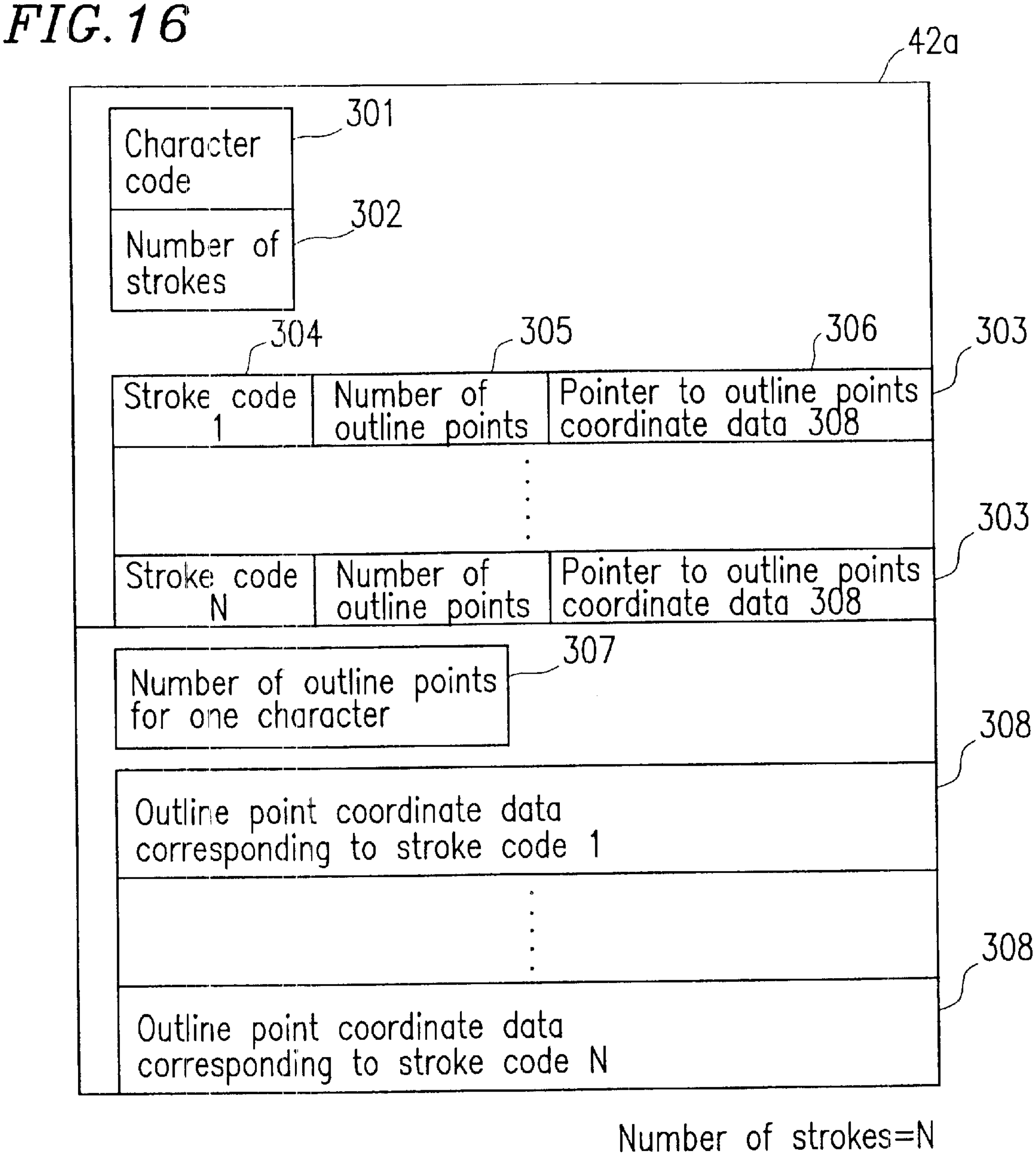
FIG. 16 illustrates a structure of character outline information 42*a*.

FIG. 16 illustrates a structure of the character outline information 42*a* stored in the auxiliary storage apparatus 40.

The character outline information 42*a* includes a character code 301 for identifying the character, data 302 indicating the number of strokes included in the character, and stroke information 303 for each stroke.

The stroke information 303 for each stroke includes a stroke code 304 for identifying the stroke, data 305 indicating the number of outline points included in the stroke, and a pointer 306 to outline points coordinate data 308 which indicates the coordinates of the outline points included in the stroke. The pointer 306 indicates the location in the auxiliary storage apparatus 40 where the outline points coordinate data 308 is stored. By referencing the stroke information 303, the coordinates of each of the outline points of the stroke can be obtained. It is assumed herein that in the outline points coordinate data 308, the coordinates of the outline points included in the stroke are arranged in the counterclockwise direction.

The number of the stroke information 303 is equal to the number of strokes 302. Therefore, when the number of strokes 302 is N (N is an integer equal to or greater than 1), the character outline information 42*a* includes N stroke information 303 respectively corresponding to stroke code 1 to stroke code N.

Methods for approximating the outline of a character include, for example: (1) a method for approximating the outline of the character with one or more straight lines; (2) a method for approximating the outline of the character with a combination of one or more straight lines and one or more arcs: and (3) a method for approximating the outline of the character with a combination of one or more straight lines and one or more curves (e.g., spline curves).

The character outline information 42*a* may include as the outline points coordinate data 308 coordinates of a plurality of outline points which are obtained by any of the above methods (1)–(3). In view of the quality of the character display and the data capacity, the character outline information 42*a* preferably includes the outline points coordinate data 308 obtained based on the method (3).

Figure 17A:
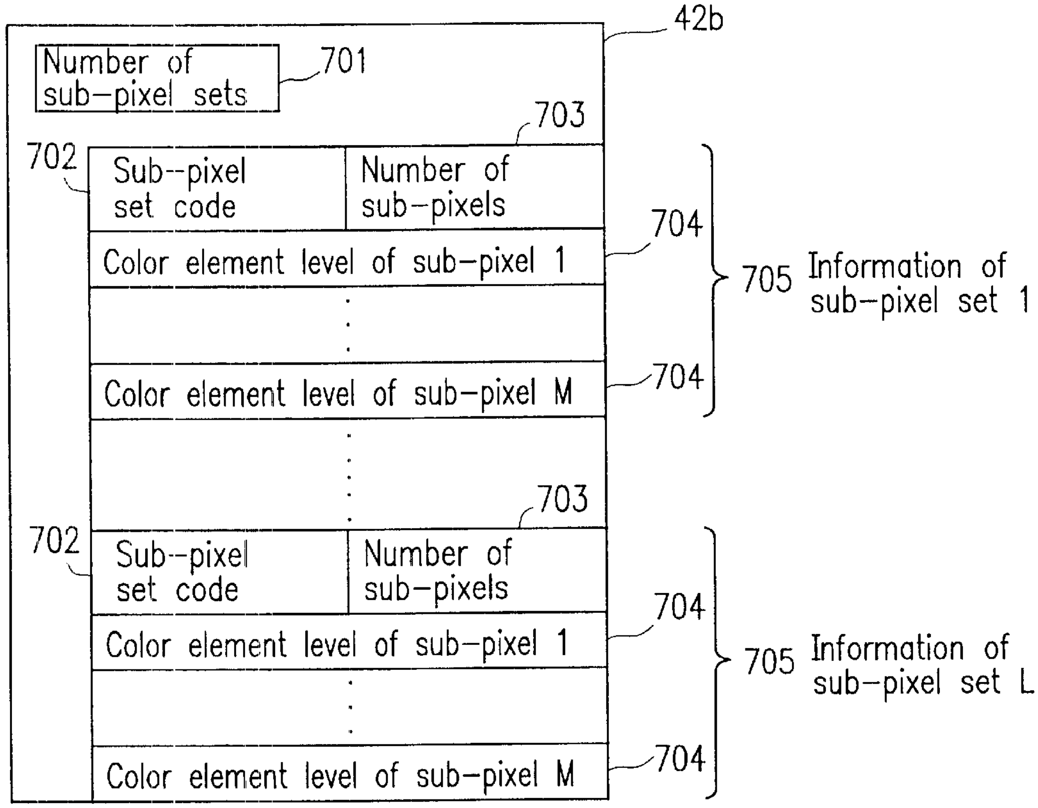
FIG. 17A illustrates a structure of color element level information 42*b*.

FIG. 17A illustrates a structure of the color element level information 42*b* stored in the auxiliary storage apparatus 40.

The color element level information 42*b* includes data 701 which indicates the number of sub-pixel sets 705 included in the color element level information 42*b*, and a plurality of sub-pixel sets 705. As will be discussed below, each of the sub-pixel sets 705 is used to determine the color element level of a sub-pixel arranged in the vicinity of a sub-pixel corresponding to the basic portion of the character.

Each sub-pixel set 705 includes a sub-pixel set code 702 for identifying the sub-pixel set 705, data 703 indicating the number of sub-pixels included in the sub-pixel set 705, and a plurality of color element level data 704 respectively corresponding to sub-pixel 1 to sub-pixel M.

Figure 17B:
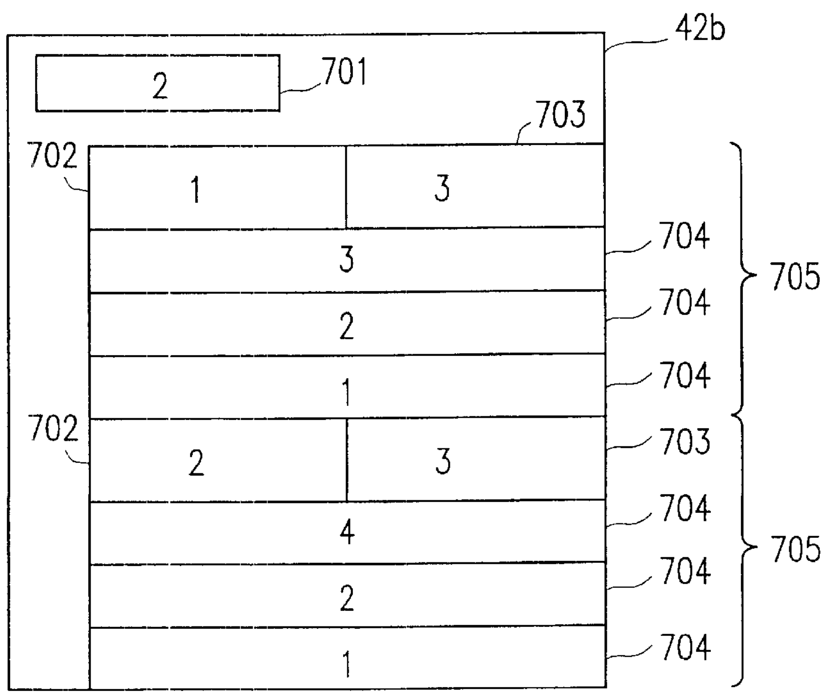
FIG. 17B illustrates an example of the color element level information 42*b*.

FIG. 17B illustrates an example of the color element level information 42*b*. In FIG. 17B, numbers shown in the respective boxes each indicates the value of an attribute that corresponds to the box.

Figure 18:
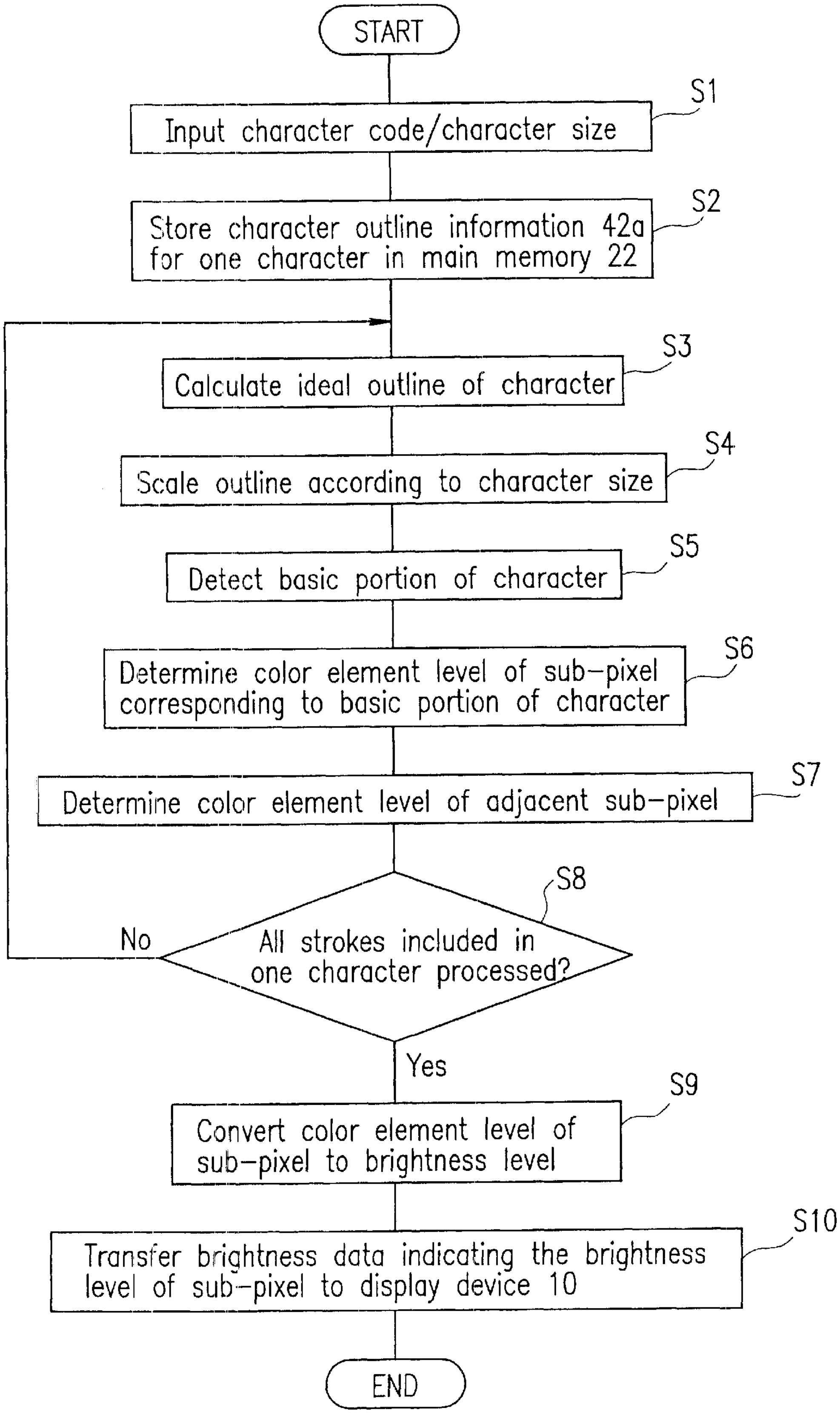
FIG. 18 illustrates a procedure for processing a character display program 41*a*.

FIG. 18 illustrates a procedure for processing the character display program 41*a*. The character display program 41*a* is executed by the CPU 21. Each step in the procedure for processing the character display program 41*a* will now be described.

Step S1: A character code and a character size are input through the input device 30. For example, when displaying a Japanese character "い" on the display device 10, "0404" (a JIS character code) is input as the character code. Such an input can be done by the user depressing a key on the keyboard designated "い". The character size is represented by, for example, the number of dots of the character to be displayed along the horizontal direction and that along the vertical direction. The character size is, for example, 13 dots×12 dots.

Step S2: The character outline information 42*a* corresponding to the character of the input character code is stored in the main memory 22.

Step S3: Based on the outline points coordinate data 308 for one of the strokes included in the character outline information 42*a*, the ideal outline of the character is calculated. The ideal outline of the character is approximated with straight lines or curves according to a known method.

Step S4: The ideal outline of the character calculated in step S3 is scaled according to the input character size. The scaling operation converts the predetermined coordinate system for the outline points coordinate data 308 into the actual pixel coordinate system for the display device 10.

Step S5: The basic portion of the character is detected according to the area over which the inside of the ideal outline of the character which has been scaled in step S4 overlaps sub-pixels of the display device 10. The basic portion of a character is a portion which represents the core structure of the character. For example, when the area over which the inside of the ideal outline of the scaled character overlaps a sub-pixel of the display device 10 is equal to or greater than a predetermined area, the sub-pixel is defined as corresponding to the basic portion of the character. The value of the predetermined area may be a fixed value or a variable value which may be varied according to an input from the input device 30.

For each of the sub-pixels of the display device 10, the area over which the inside of the ideal outline of the scaled character overlaps the sub-pixel is calculated so as to determine which sub-pixels of the display device 10 correspond to the basic portion of the character.

Step S6: The color element level of each sub-pixel corresponding to the basic portion of the character is set to the maximum color element level. For example, where the color element level of a sub-pixel is represented through six levels, i.e., level 5 to level 0, the color element level of each sub-pixel which corresponds to the basic portion of the character is set to level 5.

Step S7: The color element level of each sub-pixel arranged in the vicinity of a sub-pixel which corresponds to the basic portion of the character is set to one of four levels, i.e., level 4 to level 1, according to a predetermined rule. The details of the predetermined rule will be described below with reference to FIG. 19.

Step S8: It is determined whether steps S3–S7 have been-performed for all of the strokes included in the character. If "No", the process returns to step S3. If "Yes", the process proceeds to step S9.

Step S9: The color element level of each sub-pixel is converted to a brightness level. Such a conversion is performed by using, for example, the brightness table 42*c* stored in the auxiliary storage apparatus 40.

Step S10: Brightness data indicating the brightness level of each sub-pixel is transferred to the display device 10. Thus, the brightness level of the display device 10 is controlled on a sub-pixel by sub-pixel basis.

Figure 19:
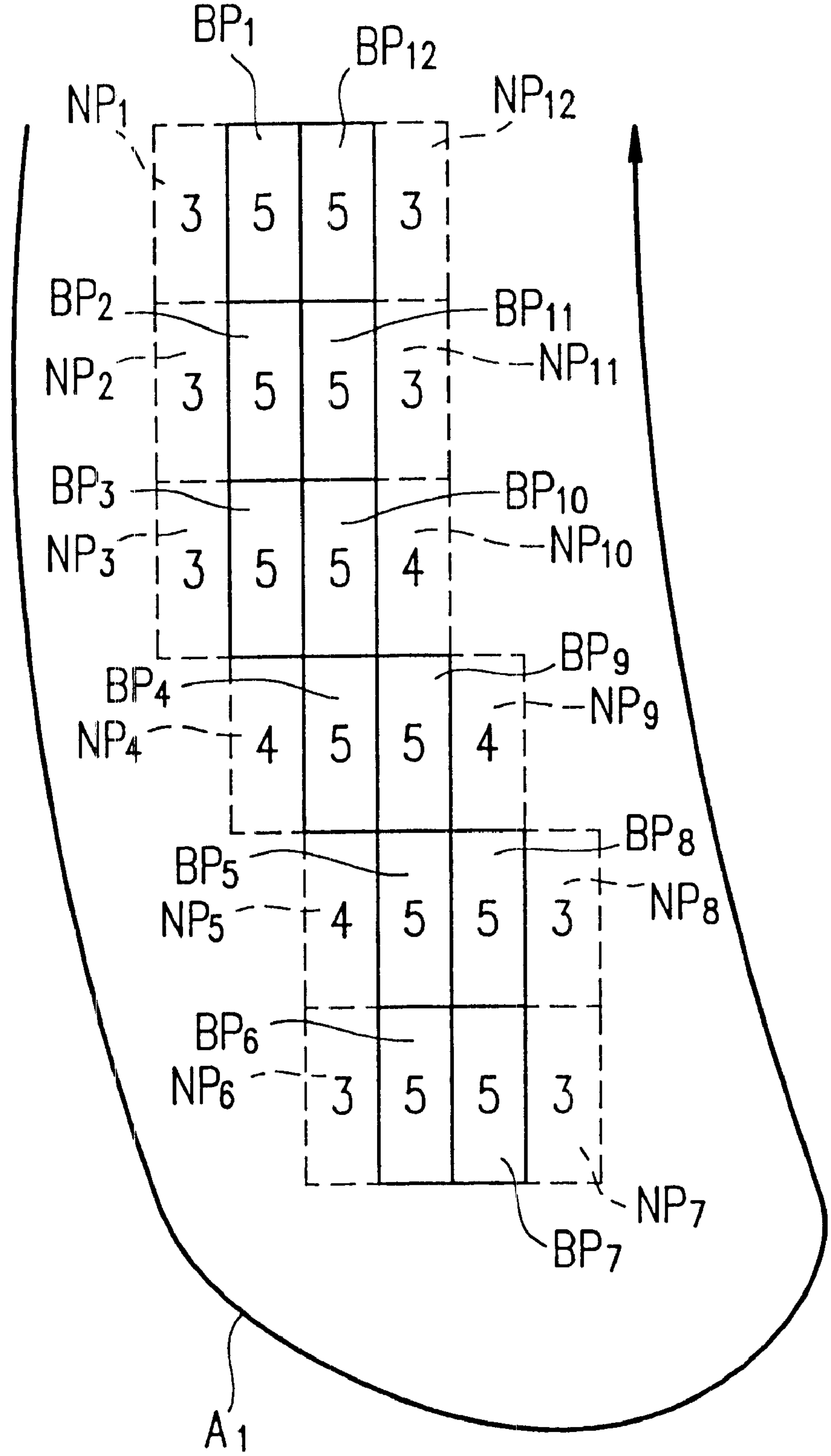
FIG. 19 illustrates how to determine the color element level of each sub-pixel arranged in the vicinity of a sub-pixel which corresponds to the basic portion of a character.

FIG. 19 illustrates how to determine the color element level of each sub-pixel arranged in the vicinity of a sub-pixel which corresponds to the basic portion of the character.

First, the direction of the ideal outline of the character (hereinafter, referred to as the "outline direction") is determined based on the arrangement of the coordinates of the outline points coordinate data 308. In the example illustrated in FIG. 19, the outline direction is denoted by arrow $A_1$. Sub-pixels $BP_1$–$BP_{12}$ corresponding to the basic portion of the character are arranged along the outline direction.

Now, referring to FIG. 19, one sub-pixel $BP_k$ (where k=1, 2, . . . , 11) corresponding to the basic portion of the character is assumed to be a reference sub-pixel. Then, the color element level of the sub-pixel $NP_{k+1}$ adjacent to the sub-pixel $BP_{k+1}$ which corresponds to the basic portion of the character and is arranged next to the reference sub-pixel $BP_k$ along the outline direction is determined according to the positional relationship between the reference sub-pixel $BP_k$ and the sub-pixel $BP_{k+l}$.

When the position (coordinates) of the reference sub-pixel $BP_k$ and the position (coordinates) of the sub-pixel $BP_{k+1}$ are the same in the direction along which sub-pixels are arranged in each pixel (i.e., the horizontal direction in FIG. 19), the color element level of the sub-pixel $NP_{k+1}$ is set to level 3. Otherwise, the color element level of the sub-pixel $NP_{k+1}$ is set to level 4. The determination of the position and the color element level of each sub-pixel are performed by the CPU 21.

In the example illustrated in FIG. 19, the color element level of each sub-pixel $NP_{k+1}$ is determined by determining the positional relationship between the reference sub-pixel $BP_k$ and the sub-pixel $BP_{k+1}$ for each value of k from k=1 to k=11. The color element level of the sub-pixel $NP_1$ may be set to any level (e.g., level 3).

In this way, the color element level of the sub-pixel $NP_k$ adjacent to the sub-pixel $BP_k$ which corresponds to the basic portion of the character is determined. In FIG. 19, each number shown in a sub-pixel box indicates the color element level which is set for the sub-pixel.

The respective color element levels of sub-pixels which are adjacent to the sub-pixel $NP_k$ are determined by using the color element level information 42*b* (FIG. 17A). In particular, one of the sub-pixel sets 705 included in the color element level information 42*b* in which the color element level of the sub-pixel $NB_k$ is the maximum color element level is selected. The respective color element levels of such sub-pixels are determined toward the outer direction from the outline of the character by the number of sub-pixels 703 which is defined in the selected sub-pixel set 705.

For example, when the color element level of the sub-pixel $NP_k$ is set to level 3, one of the sub-pixel sets 705 which has a value of 3 as the color element level 704 of sub-pixel 1 is selected from the color element level information 42*b*. According to the value of 2 of the color element level 704 of sub-pixel 2 defined in the selected sub-pixel set 705, the color element level of the sub-pixel $N'P_k$ adjacent to the sub-pixel $NP_k$ is set to level 2. Moreover, according to the value of 1 of the color element level 704 of sub-pixel 3 defined in the selected sub-pixel set 705, the color element level of the sub-pixel $N''P_k$ which is adjacent to the sub-pixel $N'P_k$ is set to level 1.

In this way, the color element level of each of the sub-pixels $NP_k$, $N'P_k$ and $N''P_k$ which are arranged in the vicinity of the sub-pixel $BP_k$ corresponding to the basic portion of the character is determined.

The color element level of each of the sub-pixels $NP_k$, $N'P_k$ and $N''P_k$ which are arranged in the vicinity of the sub-pixel $BP_k$ corresponding to the basic portion of the character may be set to any other level by altering the data contained in the color element level information 42*b*.

Figure 20:
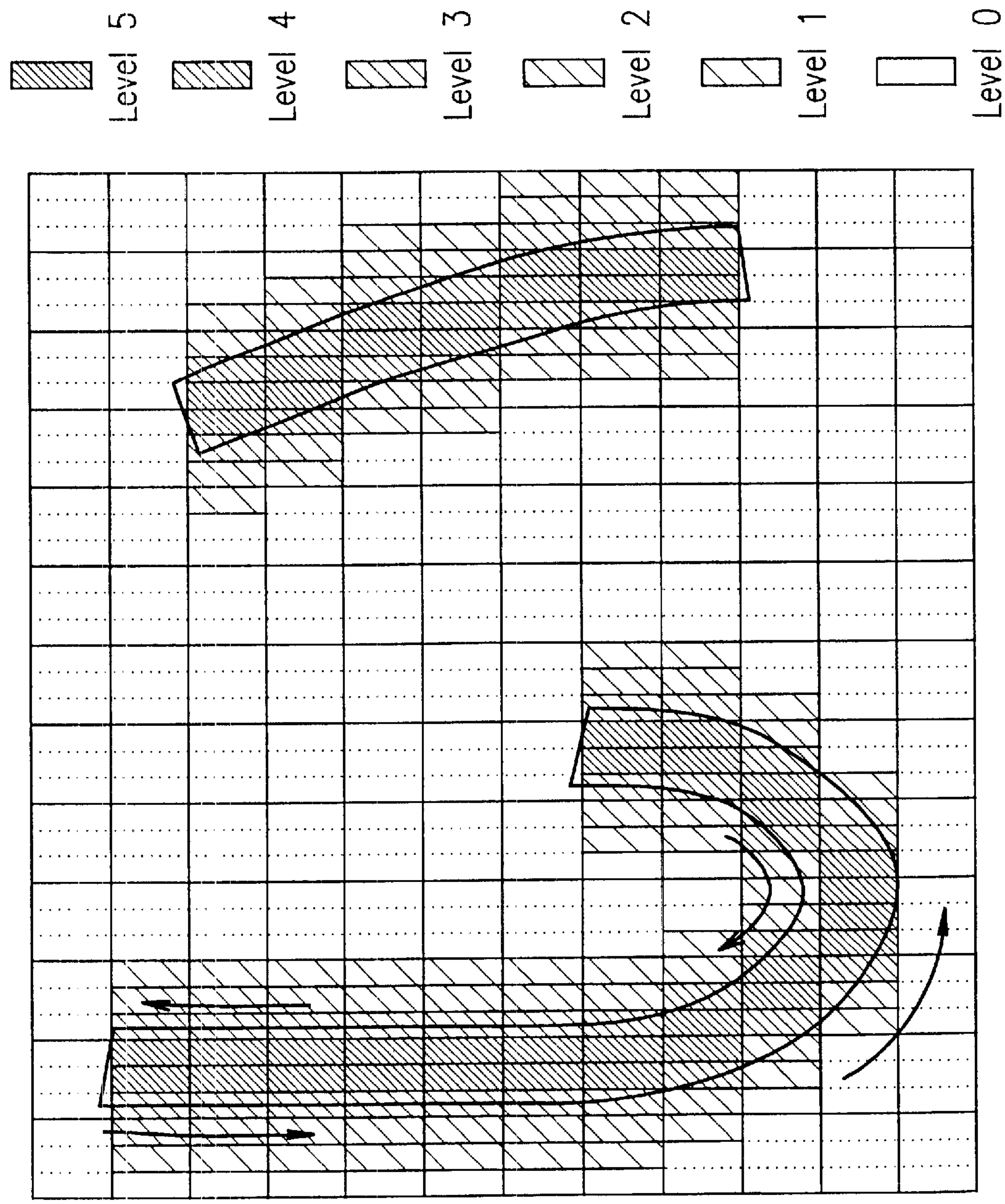
FIG. 20 illustrates font data of a Japanese character "い" which is designed based on the character display principle of the present invention, with the ideal outline of the Japanese character "い" being superimposed thereon.

FIG. 20 illustrates font data of a Japanese character "い" which is designed based on the character display principle of the present invention, with the ideal outline of the Japanese character "い" being superimposed thereon. In FIG. 20, the arrows indicate the outline direction. As described above with reference to FIG. 19, font data of a character can be obtained by successively determining the respective color element levels of sub-pixels arranged in the vicinity of sub-pixels corresponding to the basic portion of the character along the outline direction.

The control section 20 may have a function to display a character while rotating the sub-pixel arrangement by 90 degrees. Whether or not to rotate the sub-pixel arrangement by 90 degrees may be selected by the user. For example, a Chinese character "意" can be displayed as illustrated in FIG. 12, by displaying the character while rotating the sub-pixel arrangement by 90 degrees according to the sub-pixel arrangement of the display device 10. Thus, by rotating the display direction of the stripe-type liquid crystal display device to the horizontal position, it is possible to achieve a character display apparatus which is suitable for the Japanese language.

Embodiment 2

Figure 21:
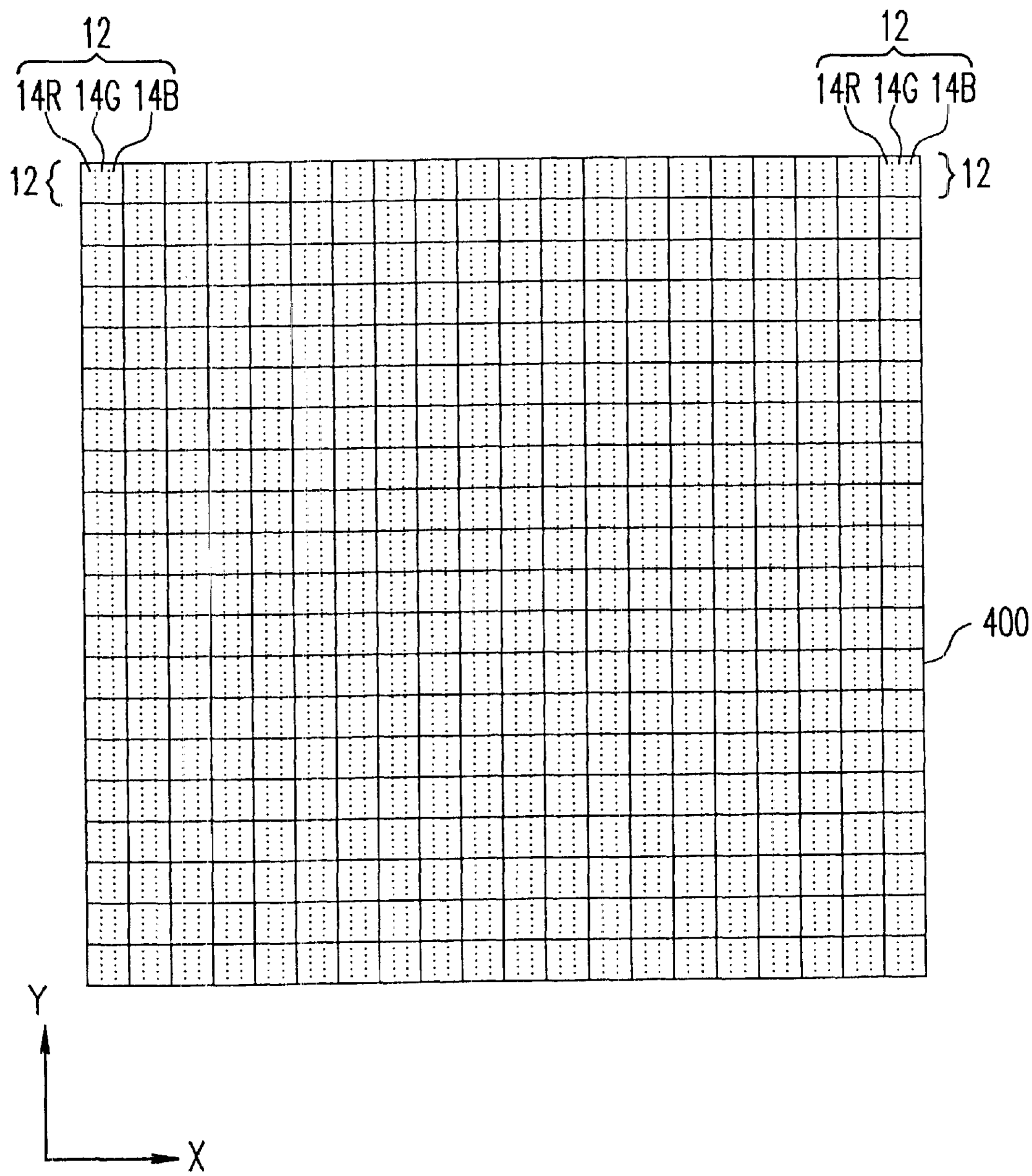
FIG. 21 schematically illustrates the display plane 400 of the display device 10 which can be used with the character display apparatus 1*b* of the present invention.

FIG. 21 schematically illustrates the display plane 400 of the display device 10 which can be used with a character display apparatus 1*b* according to Embodiment 2 of the present invention. The display device 10 has a plurality of pixels 12 arranged along the X and Y directions. Each of the pixels 12 includes a plurality of sub-pixels which are arranged along the X direction. In the example illustrated in FIG. 21, each pixel 12 includes three sub-pixels 14R, 14G and 14B.

The sub-pixel 14R is pre-assigned to a color element R so as to output color R (red). The sub-pixel 14G is pre-assigned to a color element G so as to output color G (green). The sub-pixel 14B is pre-assigned to a color element B so as to output color B (blue).

The brightness of each of the sub-pixels 14R, 14G and 14B is represented by a value ranging from 0 to 255, for example. When each of the sub-pixels 14R, 14G and 14B may independently take a value ranging from 0 to 255, it is possible to display about 16,700,000 (=256×256×256) different colors.

Figure 15B:
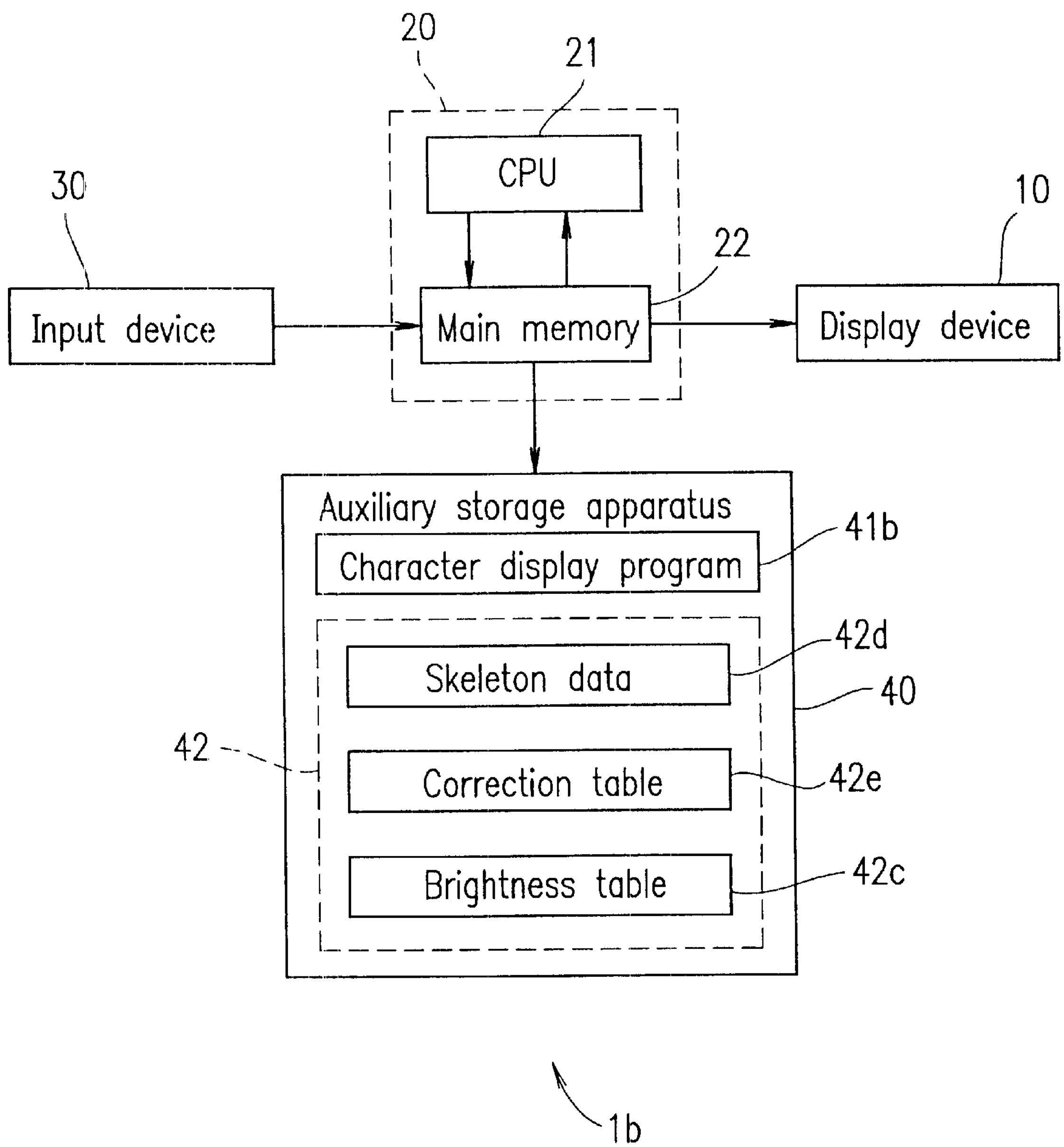
FIG. 15B illustrates a structure of a character display apparatus 1*b* according to Embodiment 2 of the present invention.

FIG. 15B illustrates a structure of the character display apparatus 1*b* according to Embodiment 2 of the present invention.

Elements in FIG. 15B having like reference numerals to those shown in FIG. 15A will not further be described.

The auxiliary storage apparatus 40 stores a character display program 41*b* and data 42 which is required to execute the character display program 41*b*. The data 42 includes skeleton data 42*d* which defines the skeleton shape of a character, a correction table 42*e* and a brightness table 42*c*. The auxiliary storage apparatus 40 may be any type of storage apparatus capable of storing the character display program 41*b* and the data 42.

Figure 22:
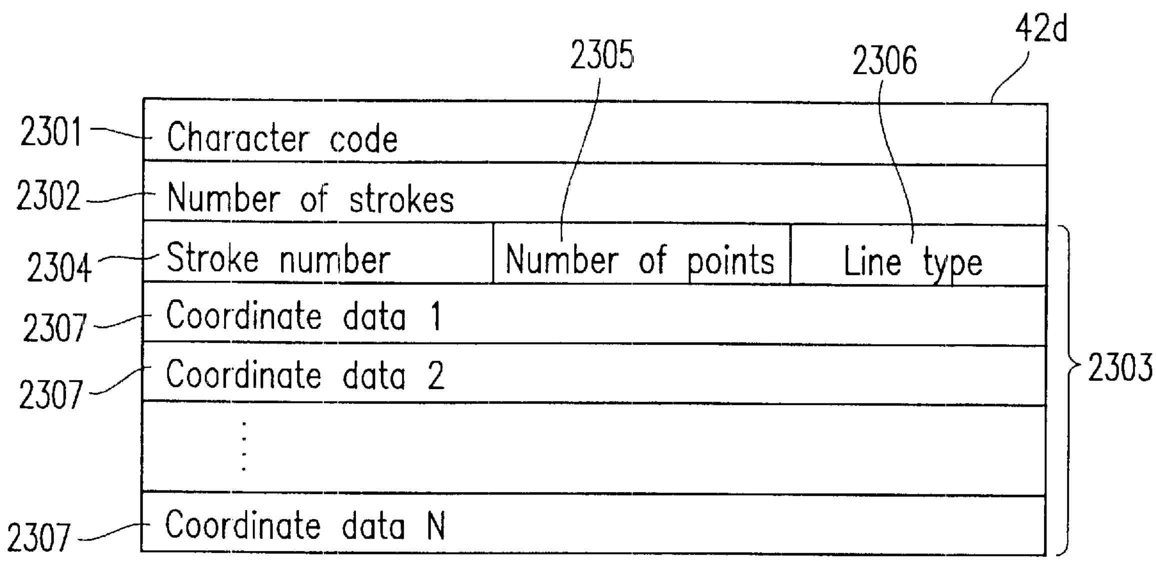
FIG. 22 illustrates a structure of skeleton data 42*d*.

FIG. 22 illustrates an exemplary structure of the skeleton data 42*d* stored in the auxiliary storage apparatus 40.

The skeleton data 42*d* represents the skeleton shape of a character. The skeleton data 42*d* includes a character code 2301 for identifying the character, data 2302 indicating the number M of strokes included in the character (M is an integer equal to or greater than 1), and stroke information 2303 for each stroke.

The stroke information 2303 for each stroke includes a stroke number 2304 for identifying the stroke, data 2305 indicating the number N of points included in the stroke (N is an integer equal to or greater than 1), a line type 2306 indicating the line type of the stroke, and a plurality of coordinate data 2307 respectively indicating the plurality of points included in the stroke. Since the number of coordinate data 2307 is equal to the number of points 2305, a number N of coordinate data sets are stored for each stroke.

Since the number of stroke information 2303 is equal to the number of strokes 2302, the skeleton data 42*d* includes a number M of stroke information 2303 for stroke code 1 to stroke code M.

The line type 2306 may include, for example, a line type “straight line” and a line type “curve”. When the line type 2306 is “straight line”, the plurality of points included in the stroke are approximated with a straight line. When the line type 2306 is “curve”, the points included in the stroke are approximated with a curve (e.g., a spline curve).

Figure 23:
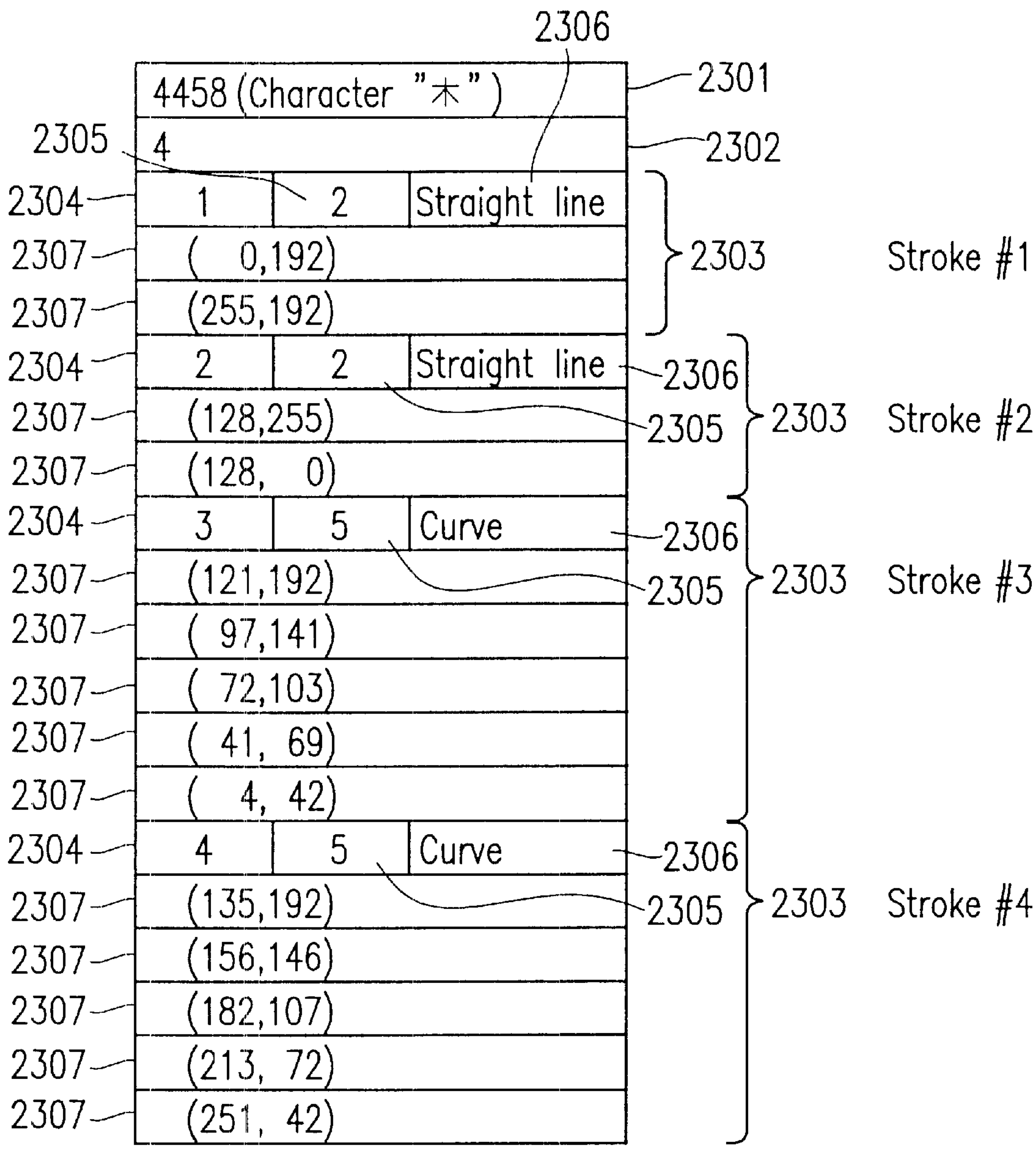
FIG. 23 illustrates an example of the skeleton data 42*d* representing the skeleton shape of a Chinese character "木"

FIG. 23 illustrates an example of the skeleton data 42*d* representing the skeleton shape of a Chinese character “木”. The skeleton data 42*d* representing the skeleton shape of the Chinese character “木” includes four strokes, i.e., stroke #1 to stroke #4 respectively corresponding to stroke code 1 to stroke code 4.

Stroke #1 is defined as a straight line between a starting point (0, 192) and an end point (255, 192). Stroke #2 is defined as a straight line between a starting point (128, 255) and an end point (128, 0). Stroke #3 is obtained by approximating five points (121, 192), (97, 141), (72, 103), (41, 69), (4, 42) with a curve. Stroke #4 is obtained by approximating five points (135, 192), (156, 146), (182, 107), (213, 72), (251, 42) with a curve.

Figure 24:
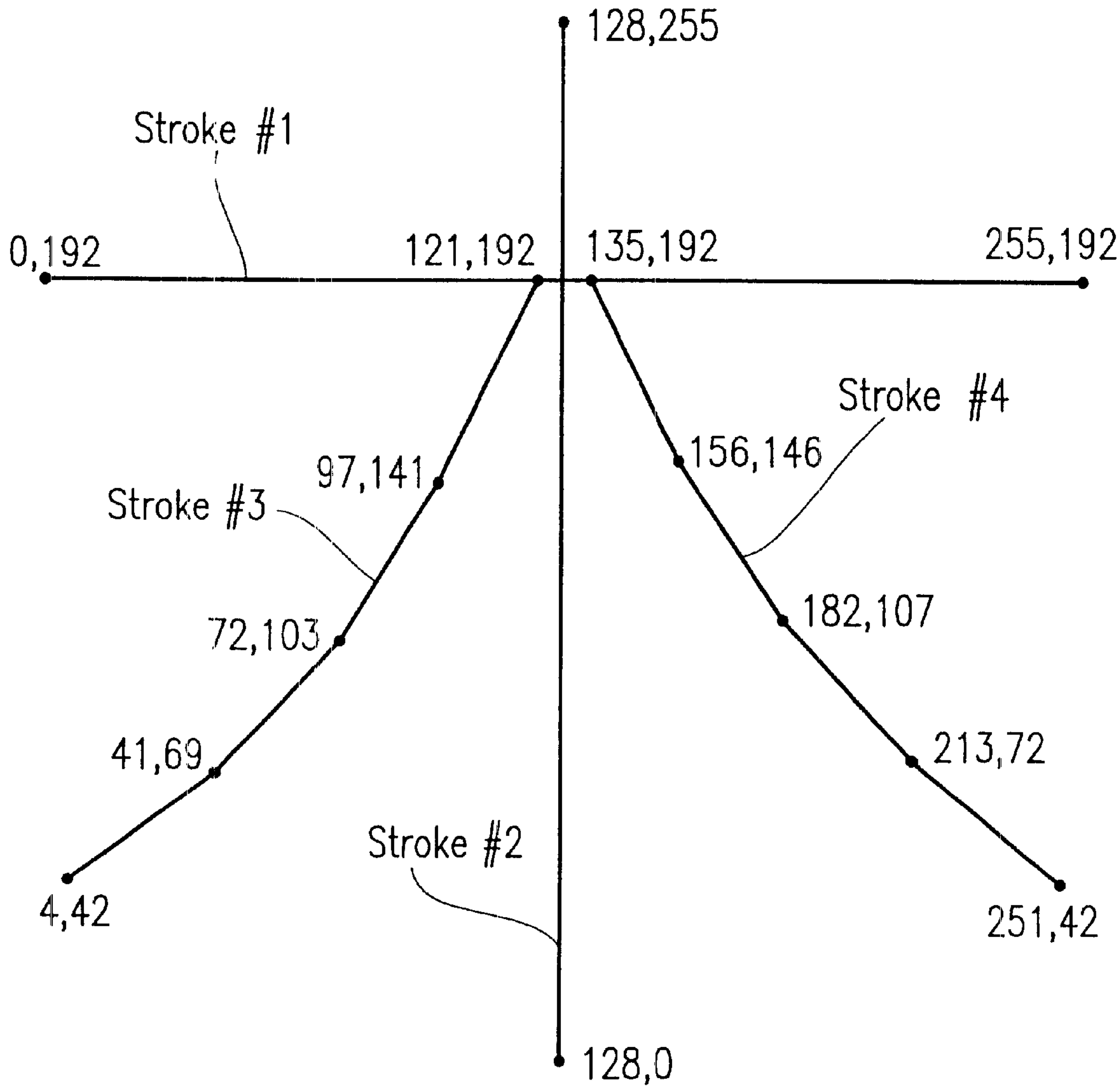
FIG. 24 illustrates an example of the skeleton data 42*d* representing the skeleton shape of the Chinese character "木" as shown on a coordinate plane.

FIG. 24 illustrates an example of the skeleton data 42*d* representing the skeleton shape of the Chinese character “木” as shown on a coordinate plane. In the example illustrated in FIG. 24, stroke #3 and stroke #4 are approximated with straight lines for the sake of simplicity.

FIG. 25 illustrates a correction table 2060 as an example of the correction table 42*e* stored in the auxiliary storage apparatus 40. The correction table 2060 includes a correction pattern 1 and a correction pattern 2. The correction pattern 1 indicates that the color element levels of sub-pixels arranged in the vicinity of a sub-pixel corresponding to the basic portion of the character are set to “5”, “2” and “1” in this order from the sub-pixel closest to the basic portion of the character to the farthest one from the basic portion of the character. The correction pattern 2 indicates that the color element levels of sub-pixels arranged in the vicinity of a sub-pixel corresponding to the basic portion of the character are set to “4”, “2” and “1” in this order from the sub-pixel closest to the basic portion of the character to the farthest one from the basic portion of the character. Whether to use the correction pattern 1 or the correction pattern 2 in a particular situation will be described below with reference to FIGS. 30A, 30B, 31A and 31B.

Thus, the correction pattern 1 and the correction pattern 2 are used to determine the color element level of each sub-pixel which is arranged in the vicinity of a sub-pixel corresponding to the basic portion of the character.

The number of correction patterns included in the correction table 2060 is not limited to 2. The number of correction patterns included in the correction table 2060 may be any number equal to or greater than 2. Moreover, the number of color element levels included in each correction pattern is not limited to 3. The number of color element levels included in each correction pattern may be any number equal to or greater than 1.

FIG. 26 illustrates a brightness table 2070 as an example of the brightness table 42*a* stored in the auxiliary storage apparatus 40. The brightness table 2070 defines the relationship between the color element level of a sub-pixel and the brightness level of the sub-pixel. By having the brightness table 2070 stored in the auxiliary storage apparatus 40, the color element level of each sub-pixel can easily be converted to a brightness level. In the brightness table 2070, the eight color element levels (level 7 to level 0) are assigned over the range of brightness levels of 0 to 255 at substantially regular intervals.

FIG. 27 illustrates a brightness table 2080 as another example of the brightness table 42*c*. The brightness table 2080 defines the relationship between the color element level of a sub-pixel and the brightness level of the sub-pixel. In the brightness table 2080, the brightness levels corresponding to color element levels 7 to 4 are shifted toward the brightness level of 0, and other brightness levels corresponding to color element levels 3 to 0 are shifted toward the brightness level of 255. When the brightness table 2080 of FIG. 27 is used, the apparent width of each character stroke can be reduced from that obtained when the brightness table 2070 of FIG. 26 is used. In other words, with the brightness, table 2080 of FIG. 27, the character can be seen more “tightly” by human being.

FIG. 28 is a brightness table 2090 in still another example of the brightness table 42*a*. The brightness table 2090 defines the relationship between the color element level of a sub-pixel and the brightness level of the sub-pixel. The brightness table 2090 is particularly suitable when the display device 10 is a color liquid crystal display device. Even when the brightness level of a sub-pixel of a color element B is relatively low, it is possible with the brightness table 2090 to correct the brightness of the sub-pixel of the color element B, thereby preventing the sub-pixel from appearing darker than optimum. Thus, a brightness table suited for the display characteristic of the display device 10 can be employed so as to make colors of the character other than black less conspicuous to a human eye.

Figure 29A:
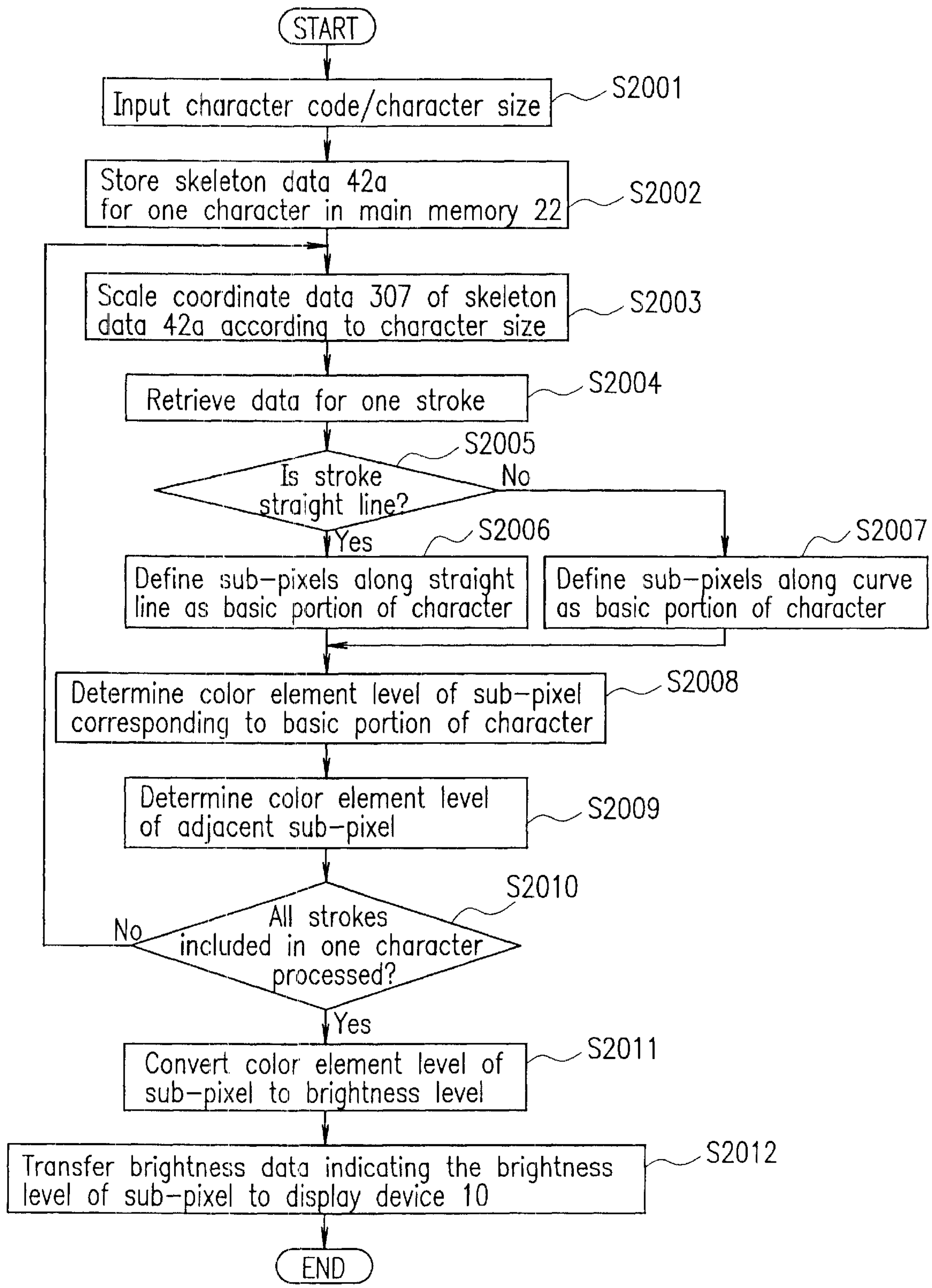
FIG. 29A is a flow chart illustrating a procedure for processing a character display program 41*b*.

FIG. 29A illustrates a procedure for processing the character display program 41*b*. The character display program 41*b* is executed by the CPU 21. Each step in the procedure for processing the character display program 41*b* will now be described.

Step S2001: A character code and a character size are input through the input device 30. For example, when displaying a Chinese character “木” on the display device 10, “4458” (a JIS character code; section 44, point 58) is input as the character code. The character size is represented by, for example, the number of dots of the character to be displayed along the horizontal direction and that along the vertical direction. The character size is, for example, 20 dots×20 dots.

Step S2002: The skeleton data 42*d* for the character corresponding to the input character code is stored in the main memory 22.

Step S2003: The coordinate data 2307 of the skeleton data 42*d* is scaled according to the input character size. The scaling operation converts the predetermined coordinate system for the coordinate data 2307 of the skeleton data 42*d* into th e actual pixel coordinate system for the display device 10. The scaling operation is performed taking the sub-pixel arrangement into consideration. For example, where each pixel 12 includes three sub-pixels 14R, 14G and 14B arranged along the X direction, as illustrated in FIG. 21, if the character size is 20 dots×20 dots, the coordinate data 2307 of the skeleton data 42*d* is scaled to data of 60 (=20×3) pixels×20 pixels.

Step S2004: Data (stroke information 2303) for each stroke is retrieved from the skeleton data 42*d*.

Step S2005: It is determined whether the stroke is a straight line based on the data (stroke information 2303) for the stroke which has been retrieved in step S2004. Such a determination is done by referencing the line type 2306 included i n the stroke information 2303. If the determination of step S2005 is "Yes", the process proceeds to step S2006. If the determination of step S2005 is "No", the process proceeds to step S2007.

Step S2006: The points defined by the scaled coordinate data 2307 are connected together with a straight line. The sub-pixels arranged along the straight line are defined as corresponding to the basic portion of the character. Thus, the basic portion of the character is defined on a sub-pixel by sub-pixel basis.

Step S2007: The points defined by the scaled coordinate data 2307 are approximated with a curve. The curve may be, for example, a spline curve. The sub-pixels arranged along the curve are defined as corresponding to the basic portion of the character. Thus, the basic portion of the character is defined on a sub-pixel by sub-pixel basis.

Step S2008: The color element level of each sub-pixel corresponding to the basic portion of the character is set to the maximum color element level. For example, where the color element level of a sub-pixel is represented through eight levels, i.e., level 7 to level 0, the color element level of each sub-pixel which corresponds to the basic portion of the character is set to level 7.

Step S2009: The color element level of each sub-pixel arranged in the vicinity of a sub-pixel corresponding to the basic portion of the character is set to one of level 6 to level 0 according to a predetermined correction pattern selection rule. The details of the predetermined correction pattern selection rule will be described below with reference to FIGS. 30A, 30B, 31A and 31B. For example, the setting of the color element level may be performed by using the correction table 42*e* stored in the auxiliary storage apparatus 40.

Step S2010: It is determined whether steps S2003-S2009 have been performed for all of the strokes included in the character. If "No", the process returns to step S2003. If "Yes", the process proceeds to step S2011.

Step S2011: The color element level of each sub-pixel is converted to a brightness level. Such a conversion is performed by using, for example, the brightness table 42*a* stored in the auxiliary storage apparatus 40.

Step S2012: Brightness data indicating the brightness level of each sub-pixel is transferred to the display device 10. Thus, the brightness level of the display device 10 is controlled on a sub-pixel by sub-pixel basis.

Figure 30A:
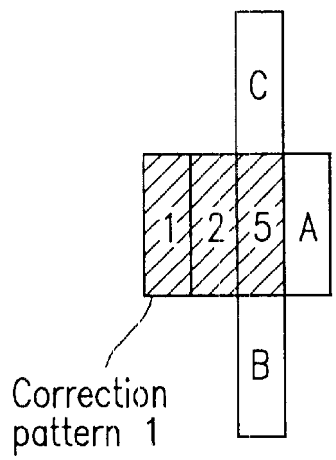
FIGS. 30A and 30B illustrate how to determine the color element level for sub-pixels arranged adjacent to the left side of a sub-pixel which corresponds to the basic portion of a character.
Figure 30B:
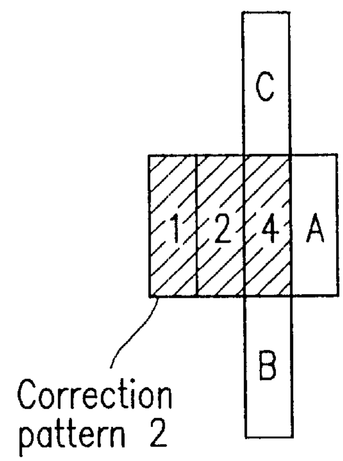

FIGS. 30A and 30B illustrate how to determine the color element level for sub-pixels arranged adjacent to the left side of a sub-pixel which corresponds to the basic portion of the character.

The color element levels of sub-pixels each arranged adjacent to the left side of a sub-pixel which corresponds to the basic portion of the character are determined in the downward direction, irrespective of the direction of the straight line between the start point and the end point of the stroke.

Referring to FIGS. 30A and 30B, the sub-pixel A corresponding to the basic portion of the character is assumed to be a reference sub-pixel, the sub-pixel located on the left lower side of the reference sub-pixel A is assumed to be a sub-pixel B, and the sub-pixel located on the left upper side of the reference sub-pixel A is assumed to be a sub-pixel C.

When at least one of the sub-pixel B and the sub-pixel C corresponds to the basic portion of the character, the color element level of the sub-pixel adjacent to the left side of the sub-pixel A is determined according to the correction pattern 1 of the correction table 42*e*. This corresponds to the case illustrated in FIG. 30A. For example, when the correction table 2060 (FIG. 25) is used as the correction table 42*e*, the correction pattern 1 is a pattern: "5", "2", "1". Therefore, the color element levels of the three sub-pixels adjacent to the left side of the sub-pixel A are set to "5", "2" and "1", respectively, from the sub-pixel closest to the sub-pixel A to the farthest one from the sub-pixel A.

When neither sub-pixel B nor sub-pixel C corresponds to the basic portion of the character, the color element levels of the three sub-pixels adjacent to the left side of the sub-pixel A are determined according to the correction pattern 2 of the correction table 42*e*. This corresponds to the case illustrated in FIG. 30B. For example, when the correction table 2060 (FIG. 25) is used as the correction table 42*e*, the correction pattern 2 is a pattern: "4", "2", "1". Therefore, the color element levels of the three sub-pixels adjacent to the left side of the sub-pixel A are set to "4", "2" and "1", respectively, from the sub-pixel closest to the sub-pixel A to the farthest one from the sub-pixel A.

Where more than one sub-pixels corresponding to the basic portion of the character are.arranged along the horizontal direction, the leftmost one of those sub-pixels may be selected as the sub-pixel A.

Figure 31A:
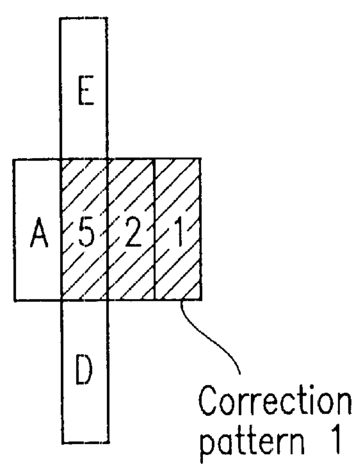
FIGS. 31A and 31B illustrate how to determine the color element level for sub-pixels arranged adjacent to the right side of a sub-pixel which corresponds to the basic portion of a character.
Figure 31B:
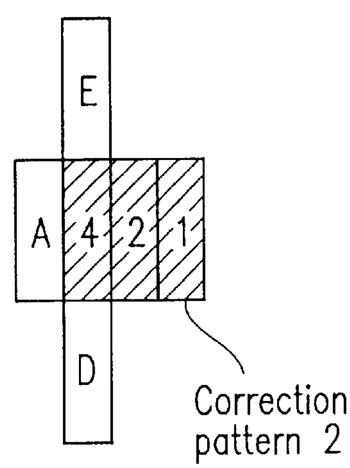

FIGS. 31A and 31B illustrate how to determine the color element level for sub-pixels arranged adjacent to the right side of a sub-pixel which corresponds to the basic portion of the character.

The color element levels of sub-pixels each arranged adjacent to the right side of a sub-pixel which corresponds to the basic portion of the character are determined in the downward direction, irrespective of the direction of the straight line between the start point and the end point of the stroke.

Referring to FIGS. 31A and 31B, the sub-pixel A corresponding to the basic portion of the character is assumed to be a reference sub-pixel, the sub-pixel located on the right lower side of the reference sub-pixel A is assumed to be a sub-pixel D, and the sub-pixel located on the right upper side of the reference sub-pixel A is assumed to be a sub-pixel E.

When at least one of the sub-pixel D and the sub-pixel E corresponds to the basic portion of the character, the color element level of the sub-pixel adjacent to the right side of the sub-pixel A is determined according to the correction pattern 1 of the correction table 42*e*. This corresponds to the case illustrated in FIG. 31A. For example, when the correction table 2060 (FIG. 25) is used as the correction table 42*e*, the correction pattern 1 is a pattern: "5", "2", "1". Therefore, the color element levels of the three sub-pixels adjacent to the right side of the sub-pixel A are set to "5", "2" and "1", respectively, from the sub-pixel closest to the sub-pixel A to the farthest one from the sub-pixel A.

When neither sub-pixel D nor sub-pixel E corresponds to the basic portion of the character, the color element levels of the three sub-pixels adjacent to the right side of the sub-pixel A are determined according to the correction pattern 2 of the correction table 42*e*. This corresponds to the case illustrated in FIG. 31B. For example, when the correction table 2060

(FIG. 25) is used as the correction table 42*e*, the correction pattern 2 is a pattern: “4”, “2”, “1”. Therefore, the color element levels of the three sub-pixels adjacent to the right side of the sub-pixel A are set to “4”, “2” and “1”, respectively, from the sub-pixel closest to the sub-pixel A to the farthest one from the sub-pixel A.

Where more than one sub-pixels corresponding to the basic portion of the character are arranged along the horizontal direction, the rightmost one of those sub-pixels may be selected as the sub-pixel A.

Thus, the color element level of each sub-pixel adjacent to a sub-pixel corresponding to the basic portion of the character is determined. In FIGS. 30A, 30B, 31A and 31B, each number shown in a sub-pixel box indicates the color element level which is set for the sub-pixel.

Figure 32:
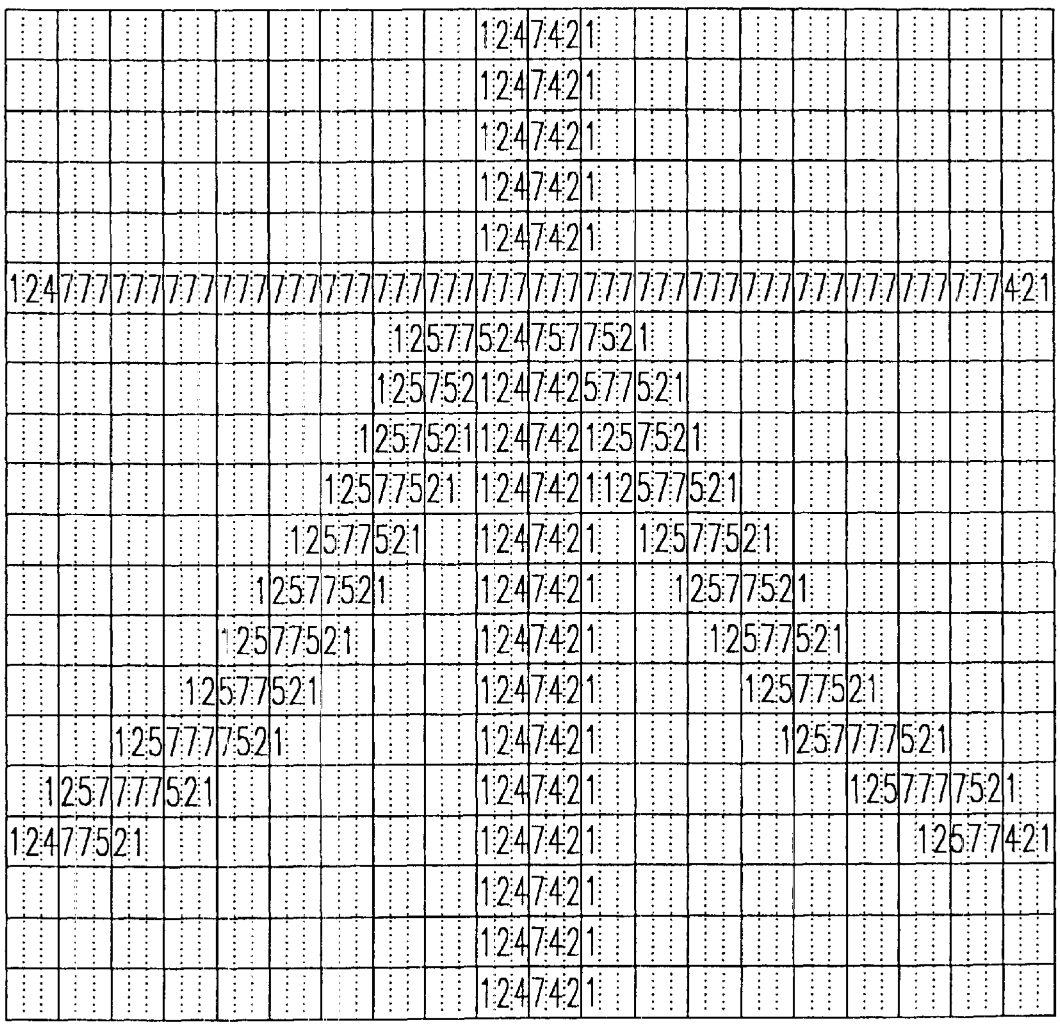
FIG. 32 illustrates an example where the color element levels of all of the sub-pixels of the display device 10 have been set.

FIG. 32 illustrates an example where the color element levels of all of the sub-pixels of the display device 10 have been set based on the skeleton data 42*d* representing the skeleton shape of the Chinese character “木”. In FIG. 32, each number shown in a sub-pixel box indicates the color element level which is set for the sub-pixel. The color element level of each blank sub-pixel is level 0.

The sub-pixel color element level arrangement of the character as illustrated in FIG. 32 is obtained by combining together the respective sub-pixel color element level arrangements for the strokes included in the skeleton data 42*d*.

FIGS. 33A to 33D illustrate the sub-pixel color element level arrangements for stroke #1 to stroke #4 of the Chinese character “木”, respectively. Such setting of the sub-pixel color element levels can be performed by applying the correction pattern selection rule as described above with reference to FIGS. 30A, 30B, 31A and 31B. The color element level arrangement illustrated in FIG. 32 is obtained by combining together the planes 2141–2144 illustrated in FIGS. 33A–33D while taking the highest color element level for each sub-pixel.

Figure 34:
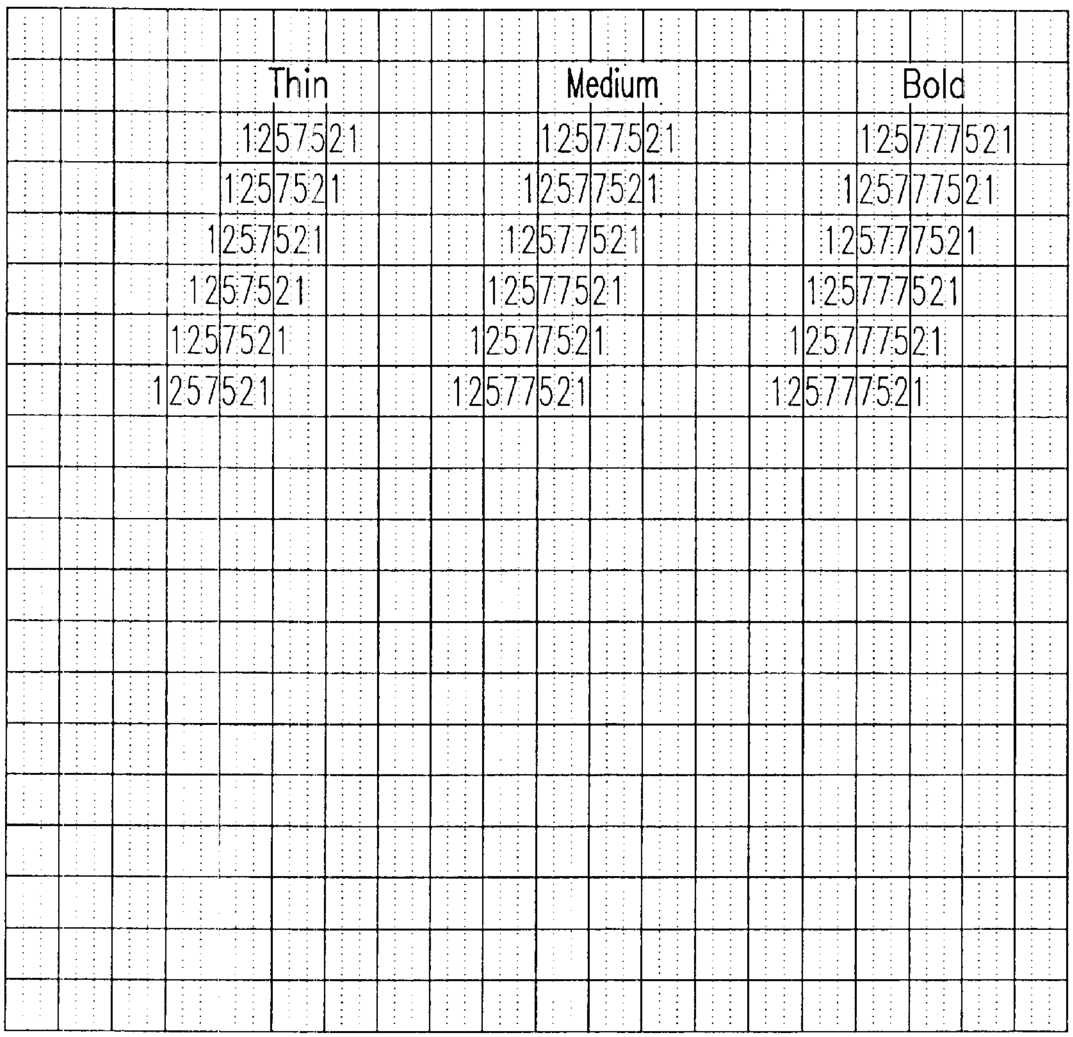
FIG. 34 illustrates an exemplary adjustment of the line width of a character by adjusting the width of the basic portion of a character on a sub-pixel by sub-pixel basis.

FIG. 34 illustrates an exemplary adjustment of the line width of a character by adjusting the width of the basic portion of the character on a sub-pixel by sub-pixel basis. In FIG. 34, the color element level of each sub-pixel corresponding to the basic portion of the character is set to level 7.

In the example illustrated in FIG. 34, the width of the basic portion of the character designated “Thin” is equal to the width of one sub-pixel, the width of the basic portion of the character designated “Medium” is equal to the width of two sub-pixels, and the width of the basic portion of the character designated “Bold” is equal to the width of three sub-pixels.

For example, the line width information indicating the line width of the character may be input in step S2001 of FIG. 29A from the input device 30 to the control section 20. In steps S2006 and S2007 of FIG. 29A, a straight line or curve may be generated according to the input line width information of the character, defining the sub-pixels along the straight line or curve as corresponding to the basic portion of the character.

Figure 35:
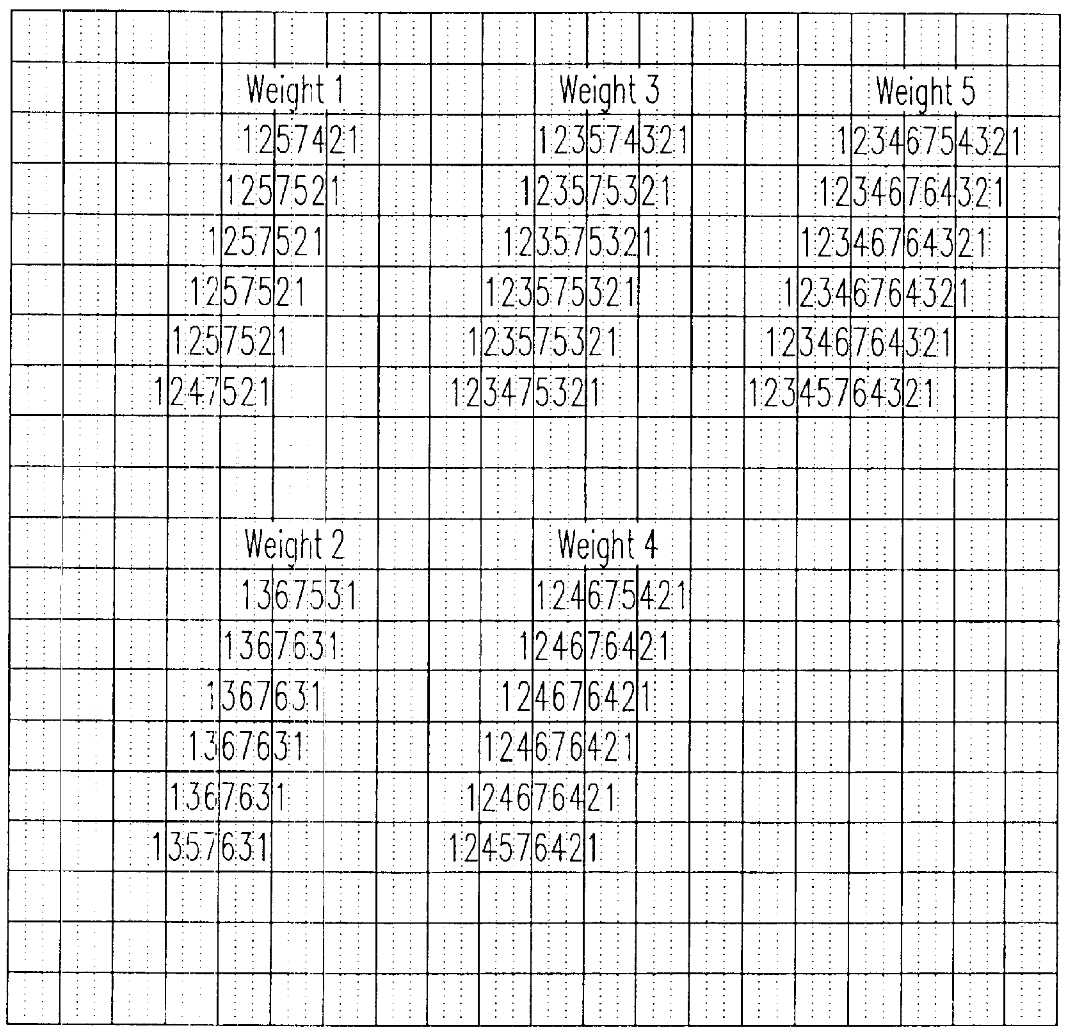
FIG. 35 illustrates an exemplary adjustment of the line width of a character by adjusting a correction pattern in a correction table 42*e*.

FIG. 35 illustrates an exemplary adjustment of the line width of a character by adjusting the correction pattern in the correction table 42*e*. In FIG. 35, the color element level of each sub-pixel corresponding to the basic portion of the character is set to level 7.

In each of the examples illustrated in FIG. 35, the width of the basic portion of the character is equal to the width of one sub-pixel. However, the line width of the character increases as the value of “weight No” increases.

The color element level of each sub-pixel adjacent to a sub-pixel corresponding to the basic portion of the character is determined according to the correction pattern 1 or the correction pattern 2. As illustrated in FIG. 36, each of the correction patterns 1 and 2 may be divided into five patterns, i.e., weight 1 to weight 5, so that one of weight 1 to weight 5 can be selected according to the line width of the character, thereby adjusting the line width of the character.

For example, the line width information indicating the line width of the character may be input 5 in step S2001 of FIG. 29A from the input device 30 to the control section 20. In step S2009 of FIG. 29A, one of weight 1 to weight 5 of the correction pattern 1 or one of weight 1 to weight 5 of the correction pattern 2 may be selected according to the input line width information of the character, so that the color element level of each sub-pixel adjacent to a sub-pixel corresponding to the basic portion of the character may be set according to the selected correction pattern.

FIG. 37 illustrates an example of a correction table 2180 as a variation of the correction table 42*e*. When characters of various sizes are all generated by using the same correction pattern, a stroke of a larger-size character may appear to be thinner than that of a smaller-size character. By selecting an appropriate correction pattern according to the size of the character, it is possible to suppress variations in the width of a stroke dependent upon the size of the character.

In the example illustrated in FIG. 37, three different correction patterns are provided respectively for a character size range of less than 20 dots, a character size range of 21–32 dots, and a character size range of 33–48 dots. Thus, by selecting a correction pattern appropriate for the character size, it is possible to suppress variations in the width of a stroke. The variations in the width of a stroke may be further suppressed by dividing the character size range into a larger number of smaller ranges.

For example, the correction pattern of the correction table 2180 may be used in step S2009 of FIG. 29A.

Figure 38:
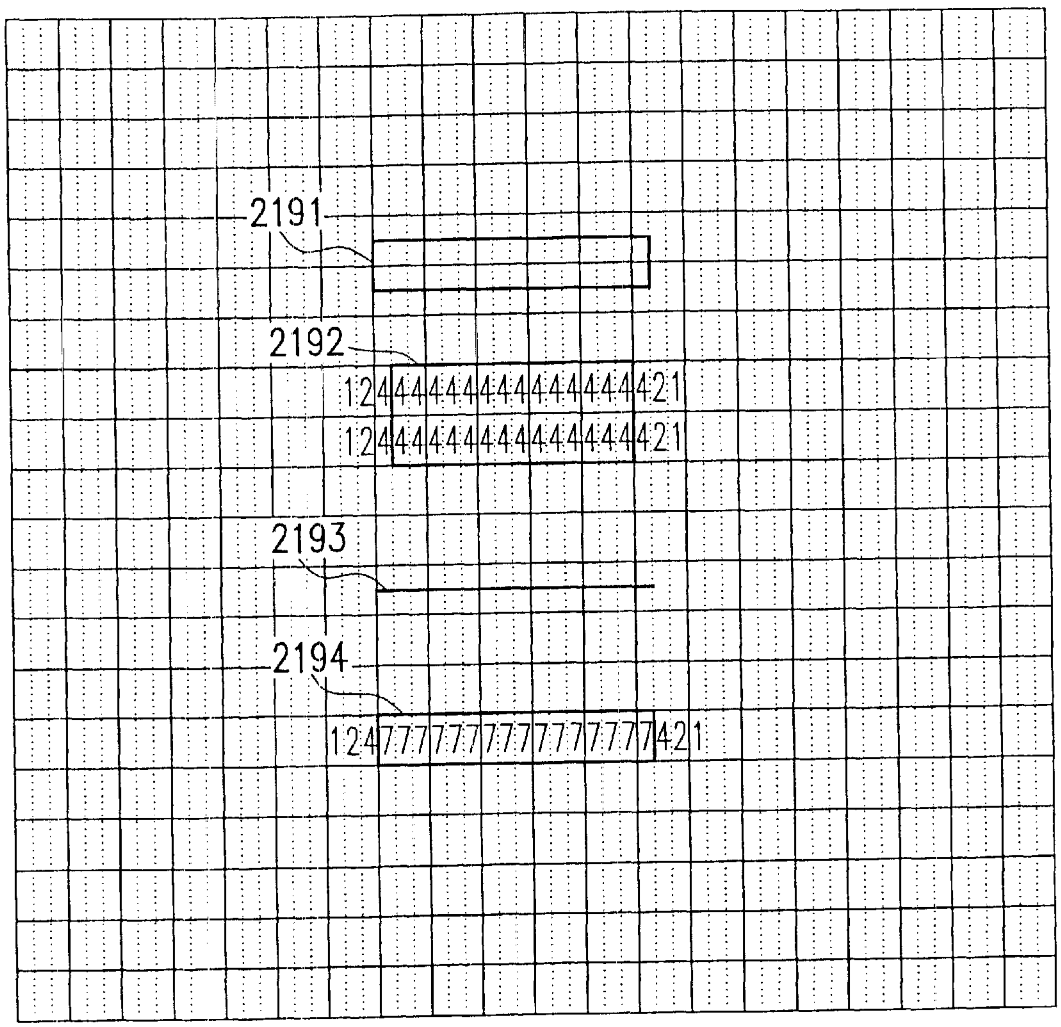
FIG. 38 illustrates a generation of a character pattern based on the skeleton data 42*d*.

In Embodiment 1, the generation of a character pattern based on an outline font is described. The generation of a character pattern based on skeleton data described in Embodiment 2 has advantages over the generation of a character pattern based on an outline font. The advantages will now be described with reference to FIG. 38.

In the generation of a character pattern based on an outline font, a real number calculation is used when scaling the outline data of a character according to the output character size. Thus, an outline 2191 of the scaled character might extend over a grid. The term “grid” as used herein refers to the boundary between two adjacent pixels. In such a case, the color element level of each sub-pixel corresponding to a basic portion 2192 of the character defined by the outline 2191 of the character is not set to the maximum color element level (in this example, level 7). As a result, the basic portion 2192 of the character is displayed in a gray scale color.

On the other hand, in the generation of a character pattern based on skeleton data, the skeleton data itself does not have any thickness or width. Therefore, scaled skeleton data 2193 would never extend over a grid, unlike the case of a scaling operation from an outline font. A basic portion 2194 of the character is defined based on the scaled skeleton data 2193. The color element level of each sub-pixel corresponding to the basic portion 2194 of the character is set to the maximum color element level (in this example, level 7). Thus, according to the generation of a character pattern based on skeleton data, the character pattern necessarily includes a portion which is set to the maximum color element level. As a result, it is possible to clearly display the character.

As described above, it is possible to more clearly display a character by first defining the basic portion of the character based on scaled skeleton data and then determining the line width of the character, than by first determining the line width of the character using the outline of the character and then performing a scaling operation.

Figure 39:
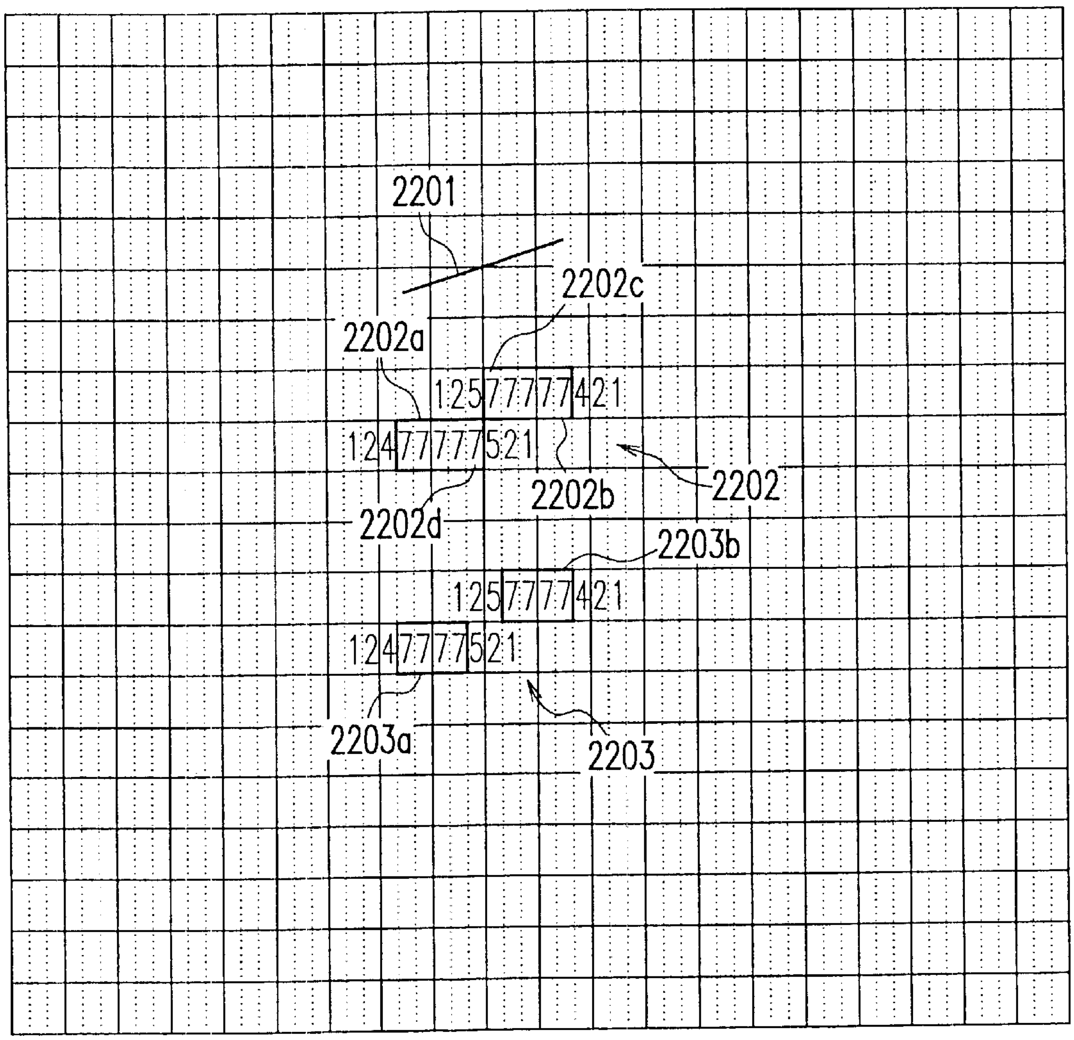
FIG. 39 illustrates a correction of the basic portion of a character where scaled skeleton data 2201 represents an obliquely-extending straight line.

Referring to FIG. 39, a correction of the basic portion of a character in the case where scaled skeleton data 2201 represents a straight line extending in an oblique direction will now be described.

A basic portion 2202 of the character is defined based on the scaled skeleton data 2201. The basic portion 2202 of the character includes a portion 2202*a* and a portion 2202*b* which are laterally continuous and vertically offset from each other. Each of the portions 2202*a* and 2202*b* includes a plurality of sub-pixels (e.g., three or more sub-pixels). The color element level of each sub-pixel corresponding to the basic portion 2202 of the character is set to the maximum color element level (in this example, level 7). The color element level of each sub-pixel adjacent to a sub-pixel corresponding to the basic portion 2202 of the character is set according to the correction pattern 1 or the correction pattern 2 of the correction table 42*e*. When the portions 2202*a* and 2202*b* which are set to the maximum color element level are laterally continuous and vertically offset from each other as in the basic portion 2202, the straight line extending in an oblique direction is unlikely to appear as a uniform straight line.

In order to improve this, it is preferred to correct the basic portion 2202 of the character to a basic portion 2203. The basic portion 2203 of the character is obtained by setting the color element level of each of sub-pixels 2202*a* and 2202*d*, which are located at the junction between the portions 2202*a* and 2202*b* in the basic portion 2202 to the minimum color element level (in this example, level 0). The basic portion 2203 of the character includes a portion 2203*a* and a portion 2203*b*. After the basic portion 2202 of the character is corrected to the basic portion 2203, the color element level of each sub-pixel adjacent to a sub-pixel corresponding to the basic portion 2203 of the character is determined.

Thus, when the sub-pixel arrangement corresponding to the basic portion of a character forms a particular pattern, the color element level of one or more sub-pixels corresponding to the basic portion of the character is corrected so as to divide the basic portion of the character into at least two portions. In this way, it is possible to prevent black bleeding from occurring in the middle of a straight line. The term "black bleeding" as used herein refers to a phenomenon where a stroke having a certain width (area) is visually observed as having a greater width (area) when the stroke crosses with, or is too close to, another stroke. As a result, it is possible to display a obliquely-extending straight line as a uniform straight line.

FIG. 40 illustrates an example of a correction table 2210 as a variation of the correction table 42*e*. The correction pattern of the correction table 2210 is suitably defined for the skeleton data 42*d* (FIG. 23) which represents the skeleton shape of the Chinese character "木". Specifically, a correction pattern 2211 (4, 2, 1) is defined for stroke #1, a correction pattern 2212 (5, 4, 2, 1) is defined for stroke #2, a correction pattern 2213-1 (6, 4, 2, 1), a correction pattern 2213-2 (6, 4, 2, 1), a correction pattern 2213-3 (6, 4, 2, 1), and a correction pattern 2213-4 (5, 3, 1) are defined for stroke #3, a correction pattern 2214-1 (6, 4, 2, 1), a correction pattern 2214-2 (6, 4, 2, 1), a correction pattern 2214-3 (6, 4, 2, 1), and a correction pattern 2214-4 (5, 3, 1) are defined for stroke #4.

The correction pattern 2213-1 is applied between point 1 and point 2 of stroke #3, the correction pattern 2213-2 is applied between point 2 and point 3 of stroke #3, the correction pattern 2213-3 is applied between point 3 and point 4 of stroke #3, and the correction pattern 2213-4 is applied between point 4 and point 5 of stroke #3. The correction patterns 2214-1 to 2214-4 are applied in a similar manner.

Thus, by providing a correction pattern for each stroke of the skeleton data 42*d* representing the basic portion of a character, it is possible to perform a fine color element level correction suited for the character. As a result, it is possible display a character with a better quality.

The correction pattern of the correction table 2210 may be used, for example, in step S2009 of FIG. 29A.

In the correction table 2210, only one set of correction patterns is defined for each stroke of the skeleton data 42*d*. Alternatively, a plurality of sets of correction patterns may be defined for each stroke. In such a case, for example, one of the sets of correction patterns is selectively used according to the rule for arranging a selected correction pattern as described above with reference to FIGS. 30A, 30B, 31A and 31B.

Figure 41:
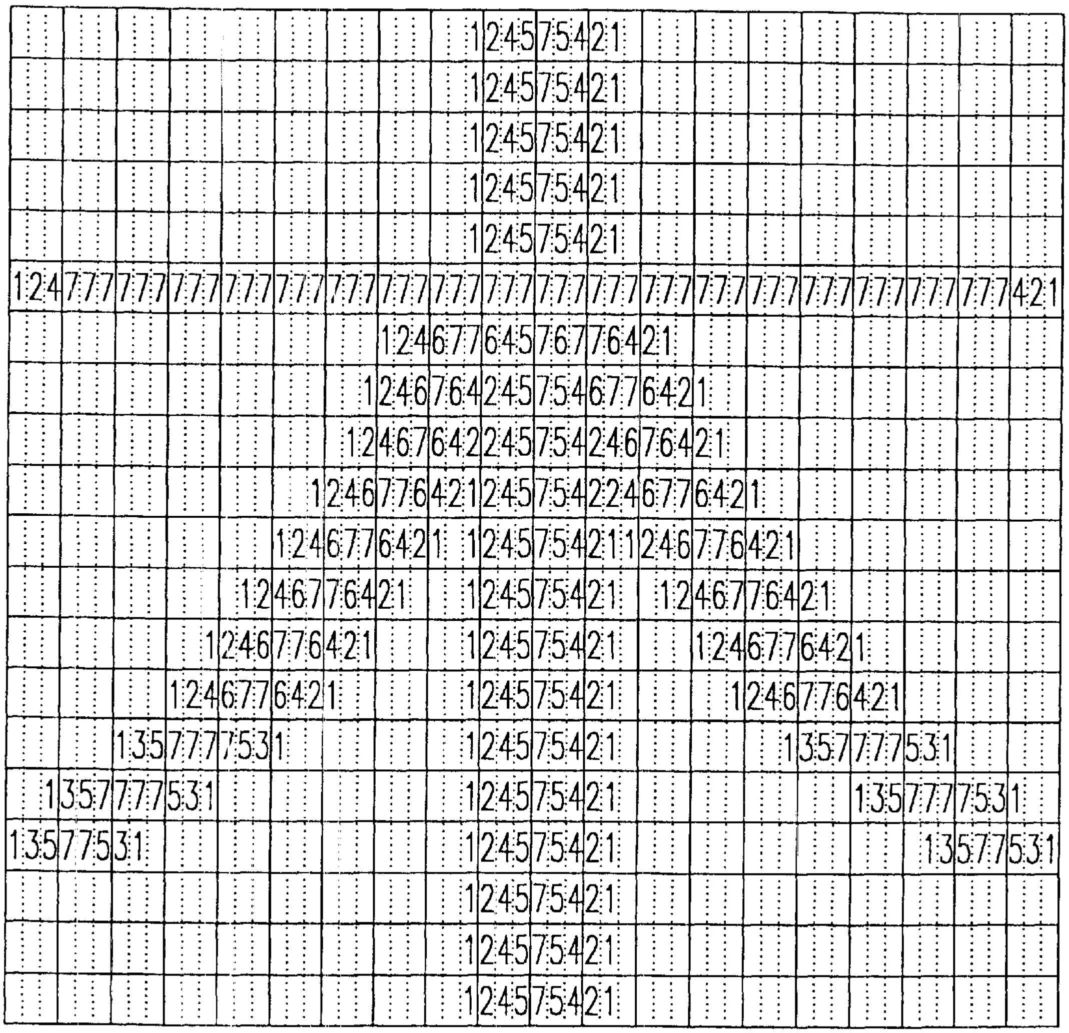
FIG. 41 illustrates an example where the color element levels of the sub-pixels corresponding to the Chinese character "木" are set.

FIG. 41 illustrates an example where the color element levels of the sub-pixels corresponding to the Chinese character "木" are set by using the correction table 2210 illustrated in FIG. 40. In FIG. 41, the color element level of each blank sub-pixel is level 0.

FIG. 42 illustrates an example of a correction table 2230 as a variation of the correction table 42*e*. The correction pattern of the correction table 2230 is suitably defined for the skeleton data 42*d* which represents a "hen" radical of the Chinese character "木".

Thus, by providing a correction pattern for each Chinese character radical, it is possible to perform a fine color element level correction suited for the Chinese character radical. This has an advantage over the case where a correction pattern is provided for each Chinese character in that a correction pattern provided for each Chinese character radical can be shared by a number of Chinese characters, thereby reducing the memory capacity required for storing the correction patterns.

The correction pattern of the correction table 2230 may be used, for example, in step S2009 of FIG. 29A.

Figure 43:
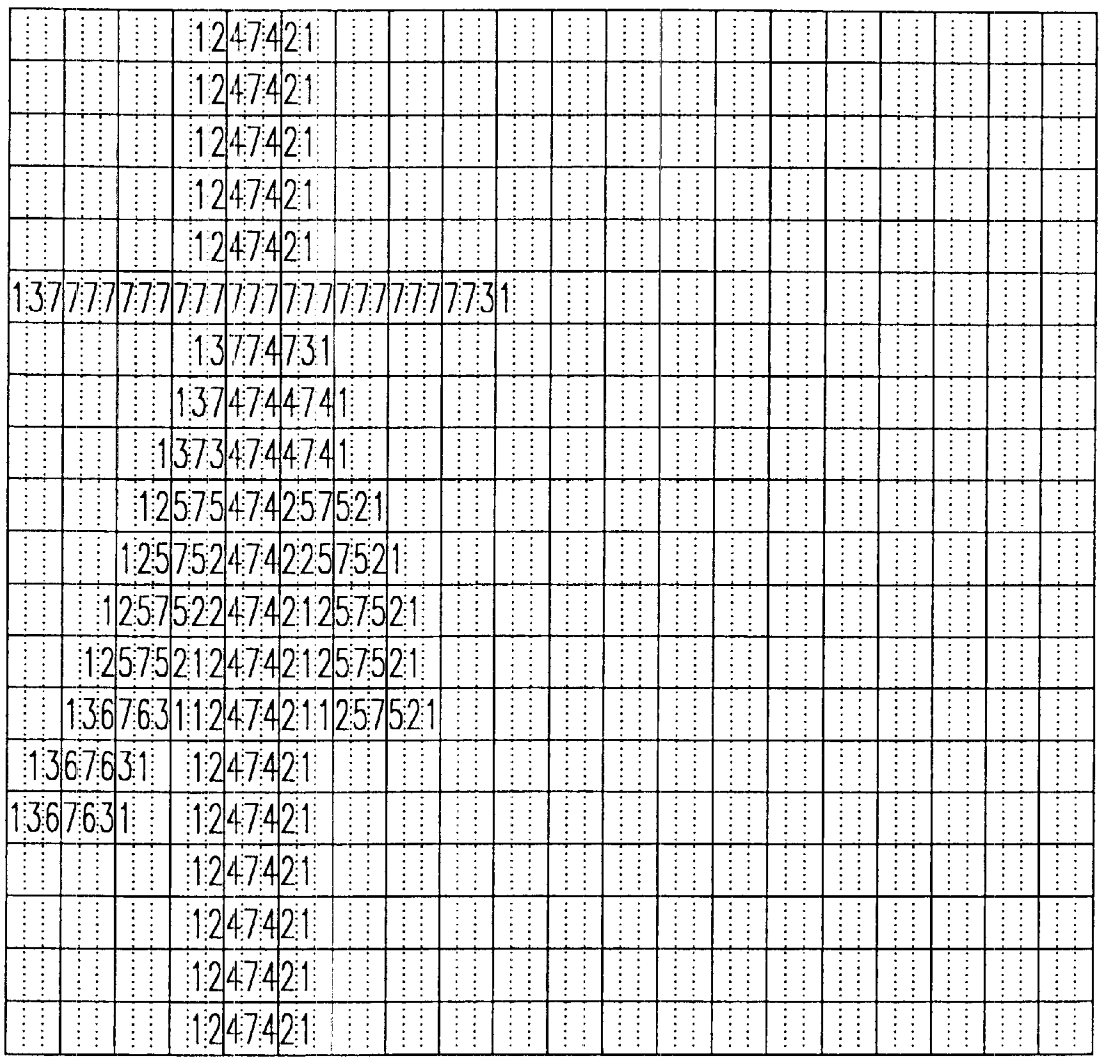
FIG. 43 illustrates an example where the color element levels of sub-pixels corresponding to a Chinese character "木" to be used as a "hen" radical (i.e., a component of a Chinese character) are set.

FIG. 43 illustrates an example where the color element levels of the sub-pixels corresponding to the "hen" radical of the Chinese character "木" are set by using the correction table 2230 illustrated in FIG. 42. In FIG. 43, the color element level of each blank sub-pixel is level 0.

FIG. 44 illustrates an example of a correction table 2250 as a variation of the correction table 42*e*. Each correction pattern of the correction table 2250 is suitably defined for the number of strokes of the skeleton data 42*d* which represents the skeleton shape of the character. Specifically, a correction pattern 1 (6, 4, 3, 2, 1) and a correction pattern 2 (5, 4, 3, 2, 1) are defined for characters whose number of strokes is equal to or greater than 1 and less than or equal to 6, a correction pattern 1 (6, 4, 2, 1) and a correction pattern 2 (5, 4, 2, 1) are defined for characters whose number of strokes is equal to or greater than 7 and less than or equal to 14, and a correction pattern 1 (5, 2, 1) and a correction pattern 2 (4, 2, 1) are defined for characters whose number of strokes is equal to or greater than 15.

Thus, by selectively using an appropriate correction pattern according to the number of strokes of the stroke data, there is provided the following advantages. First, it is possible to prevent a character with less strokes from appearing to be thinner than a character with more strokes. Moreover, it is possible to provide an appropriate correction pattern even for characters with a large number of strokes. Such an effect can be made even more pronounced by dividing the number of stroke range into a larger number of smaller ranges.

The correction pattern of the correction table 2250 may be used, for example, in step S2009 of FIG. 29A.

FIG. 45 illustrates an example of a correction table 2260 as a variation of the correction table 42*e*. The correction pattern of the correction table 2260 is suitably defined for the inclination angle of a stroke of the skeleton data 42*d* which represents the skeleton shape of the character. Specifically, a correction pattern (3, 2) is defined for a stroke whose inclination angle is 0°, a correction pattern (6, 3, 2, 1) is defined for a stroke whose inclination angle is greater than 0° and less than or equal to 30°, a correction pattern (5, 3, 2) is defined for a stroke whose inclination angle is greater than 30° and less than or equal to 45°, a correction pattern (6, 3, 1) is defined for a stroke whose inclination angle is greater than 45° and less than or equal to 60°, and a correction pattern (4, 2, 1) is defined for a stroke whose inclination angle is greater than 60° and less than or equal to 90°.

Thus, by selectively using an appropriate correction pattern according to the inclination angle of a stroke of the skeleton data, it is possible to display a character with a high quality. It is possible to display a character with an even better quality by dividing the range of inclination angle of the skeleton data stroke into a larger number of smaller ranges.

The correction pattern of the correction table 2260 may be used, for example, in step S2009 of FIG. 29A.

Figure 47:
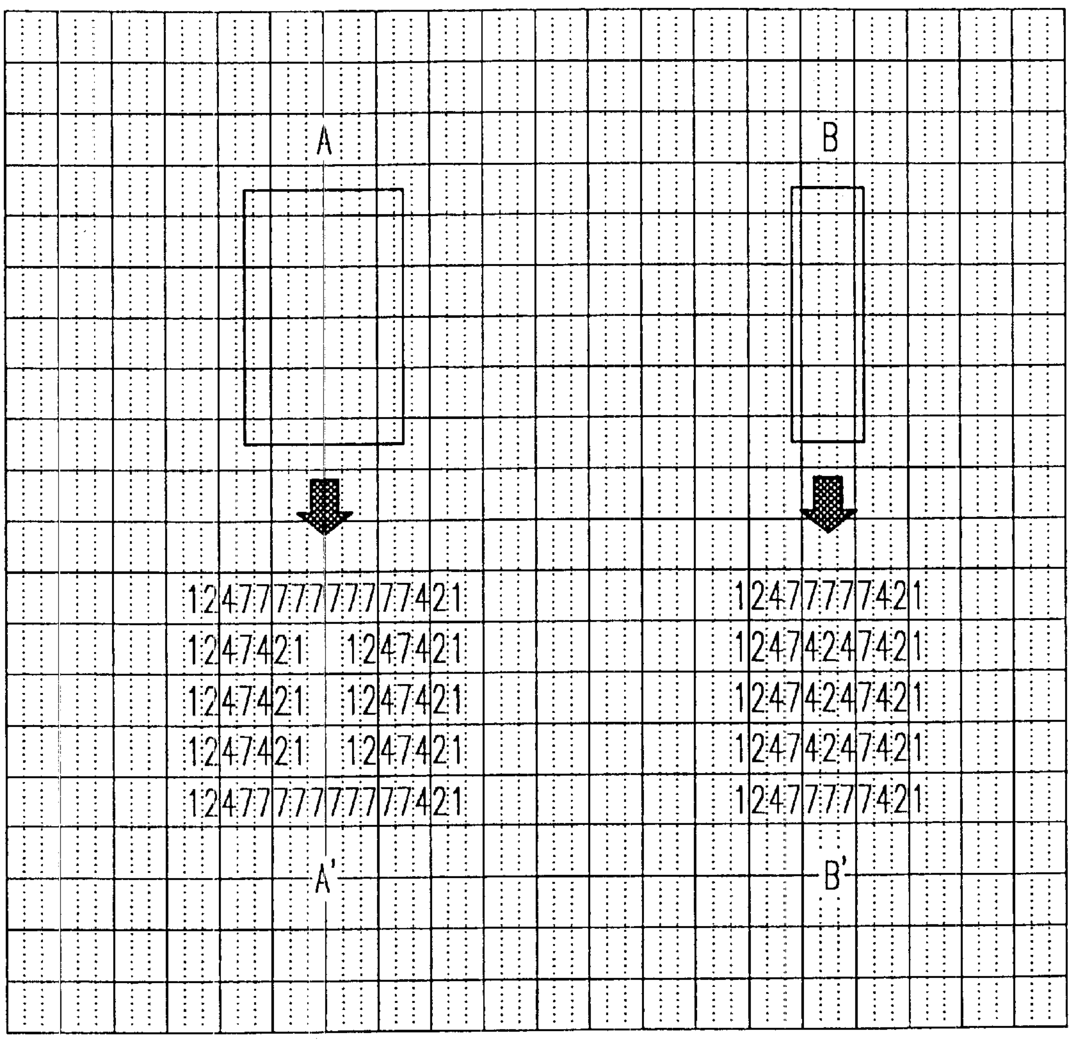
FIG. 47 illustrates an example where an appropriate correction pattern is selectively used according to the distance between two portions of the basic portion of a character.

FIG. 46 illustrates an example of a correction table 2270 as a variation of the correction table 42*e*. The correction patterns of the correction table 2270 are suitably defined both for a case where the distance between two portions of the basic portion of the character is large (Example A in FIG. 47) and for a case where the distance between two portions of the basic portion of the character is small (Example B in FIG. 47). Specifically, the normal correction pattern 1 or the normal correction pattern 2 of the correction table 2270 is used for Example A in FIG. 47. As a result, the color element levels of the sub-pixels are set as illustrated in Example A' in FIG. 47. On the other hand, the special correction pattern 1 of the special correction pattern 2 of the correction table 2270 is used for Example B in FIG. 47. As a result, the color element levels of the sub-pixels are set as illustrated in Example B' in FIG. 47.

Thus, by selectively using an appropriate correction pattern according to the "density" of the basic portion of the character, it is possible to display a character with a high quality.

The correction pattern of the correction table 2270 may be used, for example, in step S2009 of FIG. 29A.

Embodiment 3

Figure 15C:
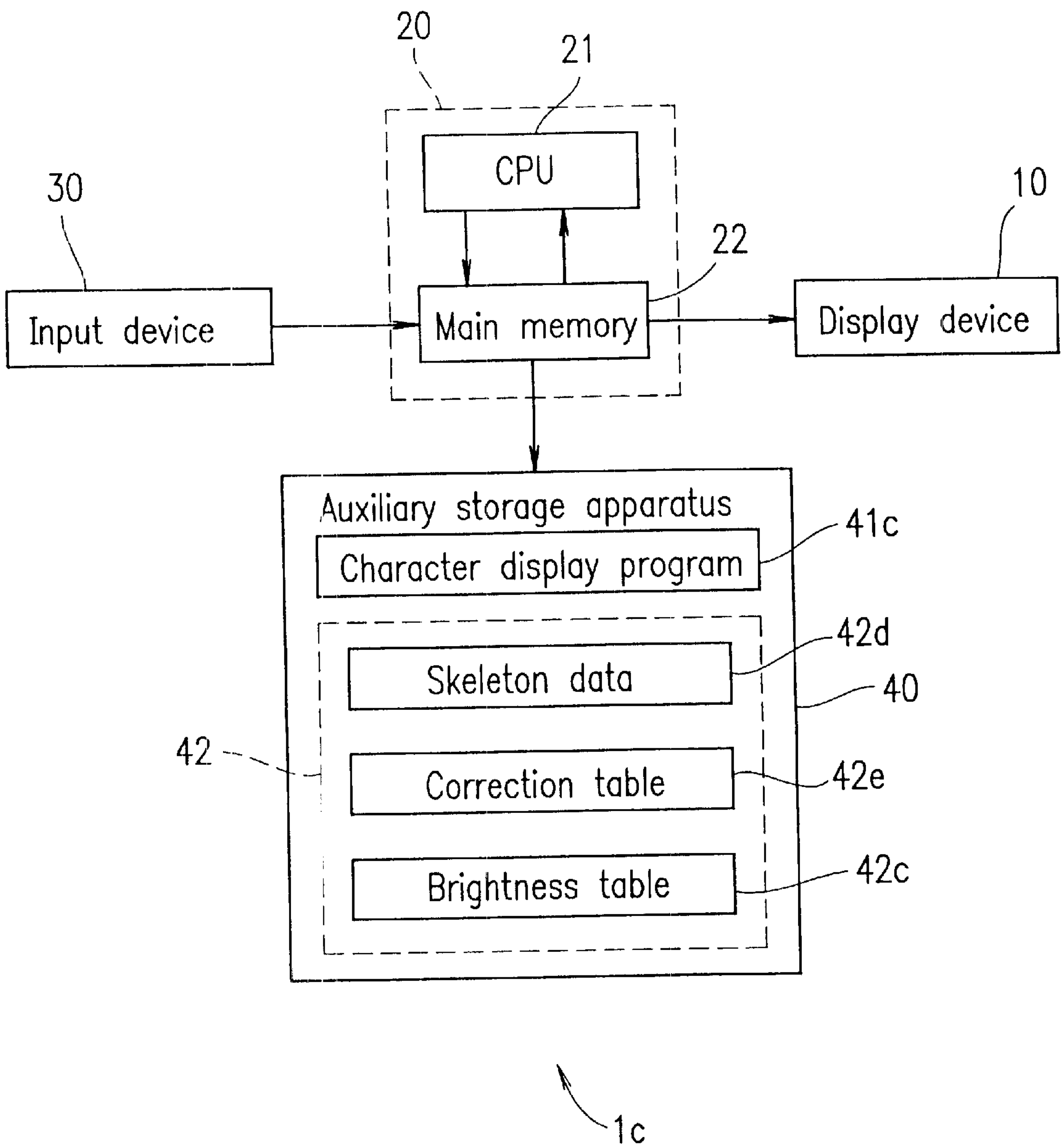
FIG. 15C illustrates a structure of a character display apparatus 1*c* according to Embodiment 3 of the present invention.

FIG. 15C illustrates a structure of a character display apparatus 1*e* according to Embodiment 3 of the present invention.

Elements in FIG. 15C having like reference numerals to those shown in FIG. 15B will not further be described.

Figure 29B:
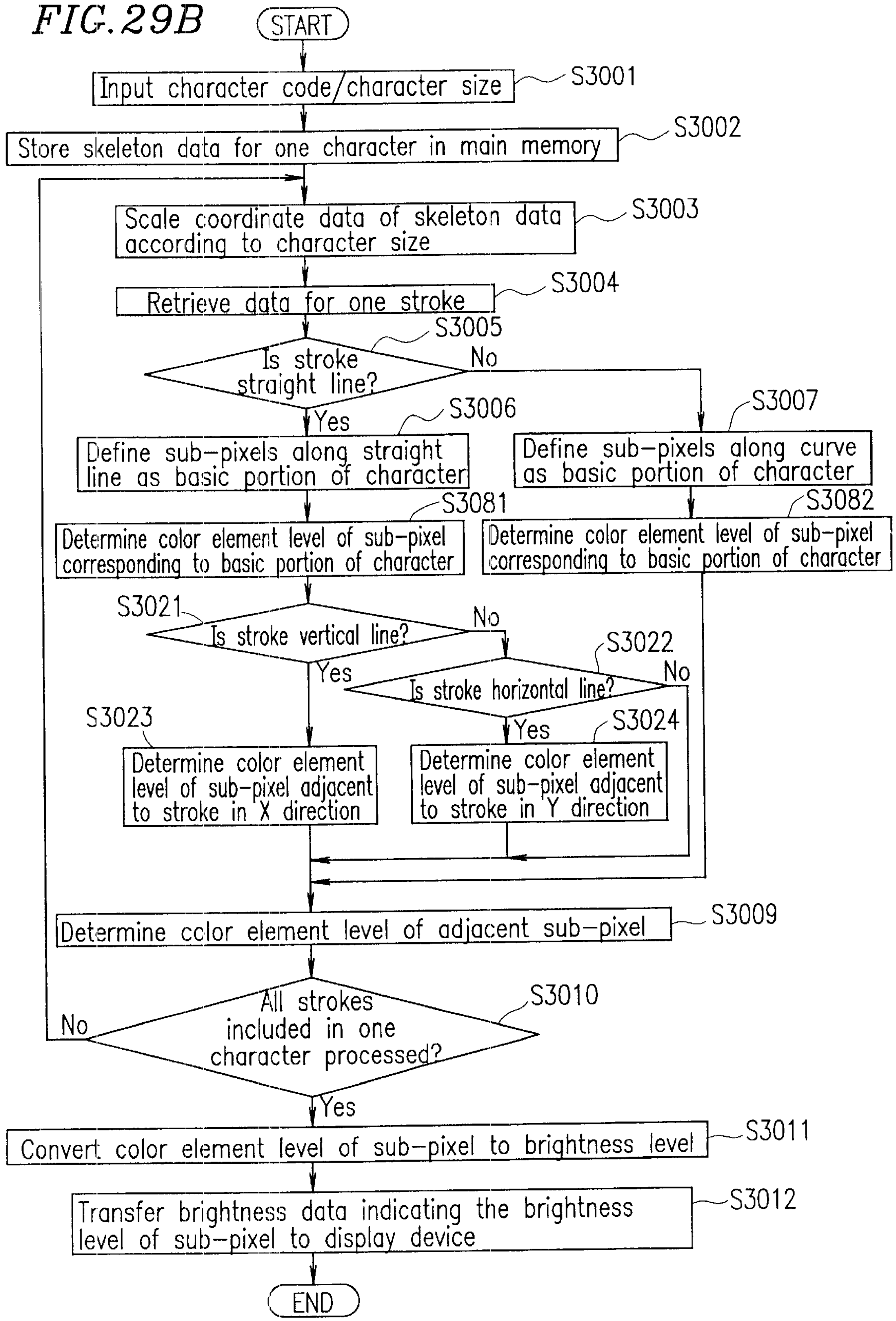
FIG. 29B is a flow chart illustrating a procedure for processing a character display program 41*c*.

FIG. 29B illustrates a procedure for processing a character display program 41*a* which is used where an auxiliary pattern is set which represents a feature of a character typeface based on the shape of a stroke. The character display program 41*c* is executed by the CPU 21. Each step in the procedure for processing the character display program 41*a* will now be described.

Step S3001: A character code and a character size are input through the input device 30. For example, when displaying a Chinese character "木" on the display device 10, "4458" (a JIS character code; section 44, point 58) is input as the character code. The character size is represented by, for example, the number of dots of the character to be displayed along the horizontal direction and that along the vertical direction. The character size is, for example, 20 dots×20 dots.

Step S3002: The skeleton data, 42*d* for the character corresponding to the input character code is stored in the main memory 22.

Step S3003: The coordinate data 2307 of the skeleton data 42*d* is scaled according to the input character size. The scaling operation converts the predetermined coordinate system for the coordinate data 2307 of the skeleton data 42*d* into the actual pixel coordinate system for the display device 10. The scaling operation is performed taking the sub-pixel arrangement into consideration. For example, where each pixel 12 includes three sub-pixels 14R, 14G and 14B arranged along the X direction, as illustrated in FIG. 21, if the character size is 20 dots×20 dots, the coordinate data 2307 of the skeleton data 42*d* is scaled to data of 60 (=20×3) pixels×20 pixels.

Step S3004: Data (stroke information 2303) for each stroke is retrieved from the skeleton data 42*d*.

Step S3005: It is determined whether the stroke is a straight line based on the data (stroke information 2303) for the stroke which has been retrieved in step S3004. Such a determination is done by referencing the line type 2306 included in the stroke information 2303. If the determination of step S3005 is "Yes", the process proceeds to step S3006. If the determination of step S3005 is "No", the process proceeds to step S3007.

Step S3006: The points defined by the scaled coordinate data 2307 are connected together with a straight line. The sub-pixels arranged along the straight line are defined as corresponding to the basic portion of the character. Thus, the basic portion of the character is defined on a sub-pixel by sub-pixel basis.

Step S3007: The points defined by the scaled coordinate data 2307 are approximated with a curve. The curve may be, for example, a spline curve. The sub-pixels arranged along the curve are defined as corresponding to the basic portion of the character. Thus, the basic portion of the character is defined on a sub-pixel by sub-pixel basis.

Step S3081: The color element level of each sub-pixel corresponding to the basic portion of the character is set to the maximum color element level. For example, where the color element level of a sub-pixel is represented through eight levels, i.e., level 7 to level 0, the color element level of each sub-pixel which corresponds to the basic portion of the character is set to level 7.

Step S3082: The same process as that in step S3081 is performed.

Step S3021: It is determined whether the stroke is a vertical line (i.e., a straight line substantially parallel to the Y direction (see FIG. 21)). Such a determination is done by referencing the coordinate data 2307 included in the stroke information 2303. For example, the stroke is determined to be a vertical line if the difference between the X coordinate of one end of the stroke and the X coordinate of the other end of the stroke is less than or equal to a predetermined value.

If the determination of step S3021 is "Yes", the process proceeds to step S3023. If the determination of step S3021 is "No", the process proceeds to step S3022.

Step S3022: It is determined whether the stroke is a horizontal line (i.e., a straight line substantially parallel to the X direction (see FIG. 21)). Such a determination is done by referencing the coordinate data 2307 included in the stroke information 2303. For example, the stroke is determined to be a horizontal line if the difference between the Y coordinate of one end of the stroke and the Y coordinate of the other end of the stroke is less than or equal to a predetermined value.

If the determination of step S3022 is "Yes", the process proceeds to step S3024. If the determination of step S3022 is "No", the process proceeds to step S3009.

Step S3023: The color element level of at least one sub-pixel adjacent to a sub-pixel corresponding to the basic portion of the character along the X direction (i.e., along the direction in which the sub-pixels 14R, 14G and 14B are arranged (see FIG. 21)) is set to one of level 6 to level 0. For a vertical stroke, the color element level of predetermined one or ones of adjacent sub-pixels is set to a particular color element level. For example, the color element level of two sub-pixels which are adjacent to the right side of the basic portion of the character at the upper end of the vertical stroke is set to level 6. This means that an auxiliary pattern (6, 6) is arranged in a predetermined position on the right side of the basic portion of the character. The auxiliary pattern represents a feature of a particular character typeface (e.g., "Mincho typeface").

Step S3024: The color element level of at least one sub-pixel adjacent to a sub-pixel corresponding to the basic portion of the character along the Y direction (i.e., perpendicular to the direction in which the sub-pixels 14R, 14G and 14B are arranged (see FIG. 21)) is set to one of level 6 to level 0. For a horizontal stroke, the color element level of predetermined one or ones of adjacent sub-pixels is set to a particular color element level. For example, the color element level of a sub-pixel which is adjacent to the upper side of the basic portion of the character at the second rightmost position along the horizontal stroke is set to level 6. This means that an auxiliary pattern (6) is arranged in a predetermined position on the upper side of the basic portion of the character. The auxiliary pattern represents a feature of a particular character typeface (e.g., "Mincho typeface").

Step S3009: The color element level of each sub-pixel arranged in the vicinity of a sub-pixel corresponding to the basic portion of the character is set to one of level 6 to level 0 according to a predetermined correction pattern selection rule. Where an auxiliary pattern is provided, the color element level of each sub-pixel arranged in the vicinity of a sub-pixel corresponding to the auxiliary pattern is set to one of level 6 to level 0 according to a predetermined correction pattern selection rule. Each level 0 in an auxiliary pattern can be overwritten with one of level 6 to level 1 of the predetermined correction pattern. The details of the predetermined correction pattern selection rule are as described above with reference to FIGS. 30A, 30B, 31A and 31B. Such setting of the color element level is done by using, for example, the correction table 42*e* stored in the auxiliary storage apparatus 40.

Step S3010: It is determined whether steps S3003–S3009 have been performed for all of the strokes included in the character. If "No", the process returns to step S3003. If "Yes", the process proceeds to step S3011.

Step S3011: The color element level of each sub-pixel is converted to a brightness level. Such a conversion is performed by using, for example, the brightness table 42*c* stored in the auxiliary storage apparatus 40.

Step S3012: Brightness data indicating the brightness level of each sub-pixel is transferred to the display device 10. Thus, the brightness level of the display device 10 is controlled on a sub-pixel by sub-pixel basis.

Thus, it is possible to render a feature of a particular character typeface by arranging an auxiliary pattern representing the feature of the character typeface to be adjacent to the basic portion of the character according to whether the stroke is a vertical line or a horizontal line and by arranging a correction pattern to be adjacent to the basic portion of the character or the auxiliary pattern.

FIGS. 50A to 50C illustrate an exemplary arrangement of an auxiliary pattern and a correction pattern for a vertical stroke. In FIGS. 50A to 50C, each number denotes the color element level of a sub-pixel. The vertical stroke defines the basic portion of a character. First, the color element level of each sub-pixel corresponding to the basic portion of the character is set to level 7 (FIG. 50A). Then, an auxiliary pattern (6, 6) is arranged in a predetermined position on the right side of the basic portion of the character at the upper end thereof (FIG. 50B). Then, a correction pattern (4, 2, 1) is arranged from the sub-pixel closest to the basic portion of the character or the auxiliary pattern to the farthest one therefrom (FIG. 50C).

FIGS. 51A to 51C illustrate an exemplary arrangement of an auxiliary pattern and a correction pattern for a horizontal stroke. In FIGS. 51A to 51C, each number denotes the color element level of a sub-pixel. The horizontal stroke defines the basic portion of a character. First, the color element level of each sub-pixel corresponding to the basic portion of the character is set to level 7 (FIG. 51A). Then, an auxiliary pattern (6) is arranged in a predetermined position on the upper side of the basic portion of the character at the right end thereof (FIG. 51B). Then, a correction pattern (4, 2, 1) is arranged from the sub-pixel closest to the basic portion of the character or the auxiliary pattern (6) to the farthest one therefrom (FIG. 51C).

FIG. 54A illustrates an exemplary arrangement of an auxiliary pattern and a correction pattern for the vertical stroke (stroke #2 shown in FIG. 24) and the horizontal stroke (stroke #1 shown in FIG. 24) of the Chinese character "木".

When arranging an auxiliary pattern in the vicinity of the basic portion of the character, the correction pattern arrangement rule described above with reference to FIGS. 30A, 30B, 31A and 31B may be applied, while substituting the phrase "the basic portion of the character" with "the basic portion of a character or a portion of an auxiliary pattern which is not level 0".

Figure 29C:
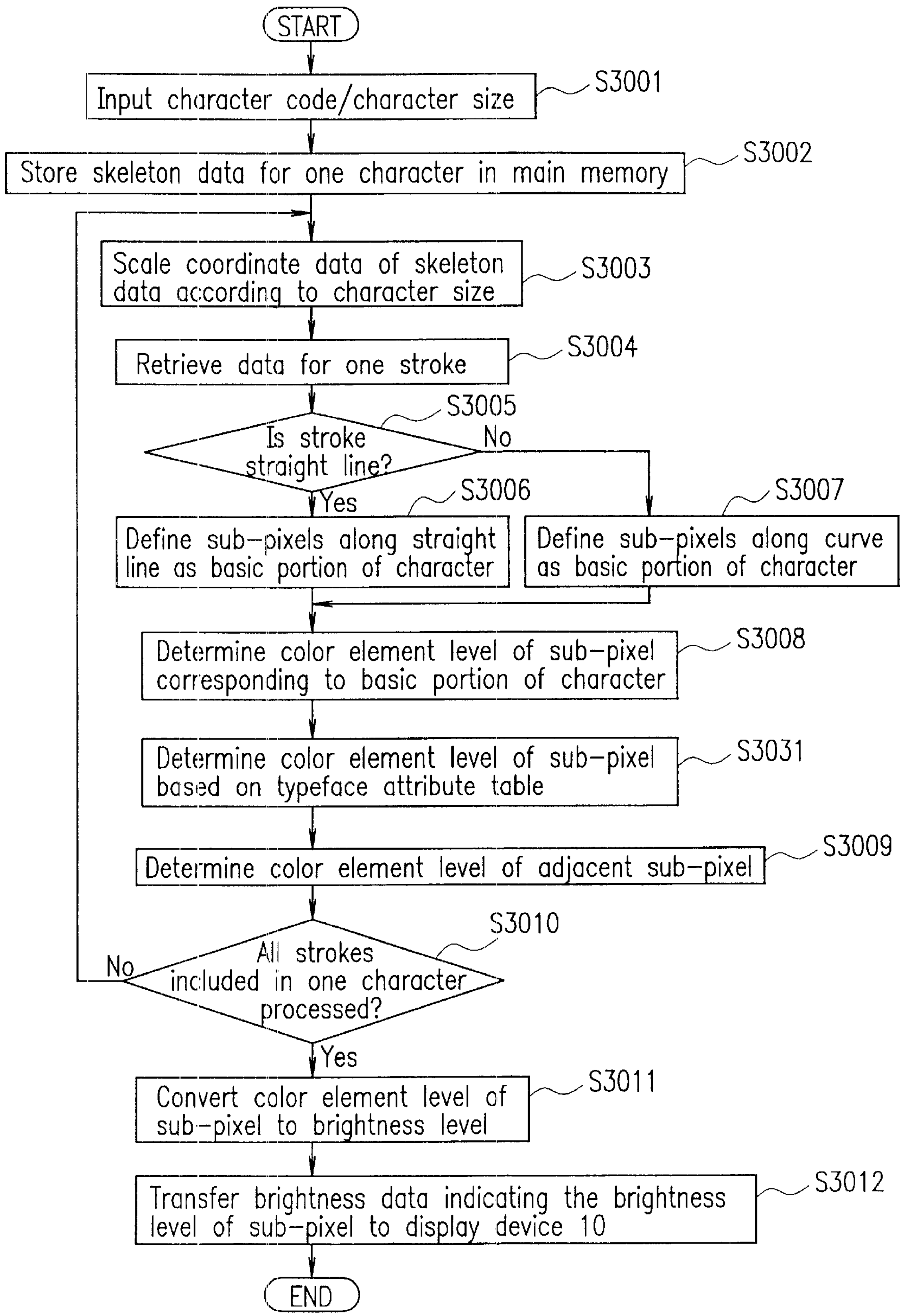
FIG. 29C is a flow chart illustrating a procedure for processing a character display program 41*d*.

FIG. 29C illustrates a procedure for processing a character display program 41*d* which is used where an auxiliary pattern is set which represents a feature of a character typeface based on a typeface attribute table 42*f*. The character display program 41*d* is executed by the CPU 21. Steps shown in FIG. 29C which are similar, and have like reference numerals, to those shown in FIG. 29B will not further be described.

Figure 15D:
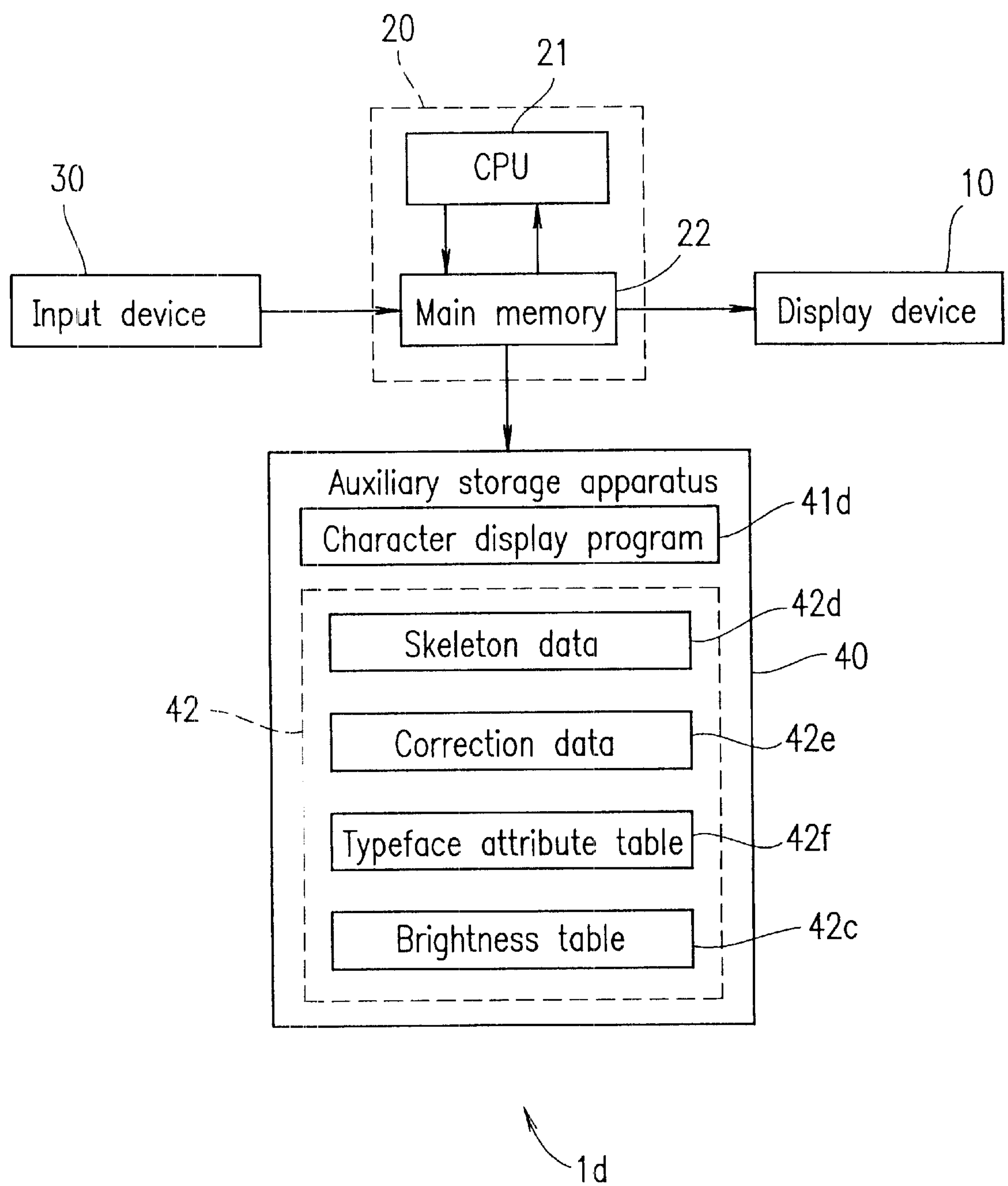
FIG. 15D illustrates a structure of a character display apparatus 1*d* according to Embodiment 3 of the present invention.
Figure 15E:
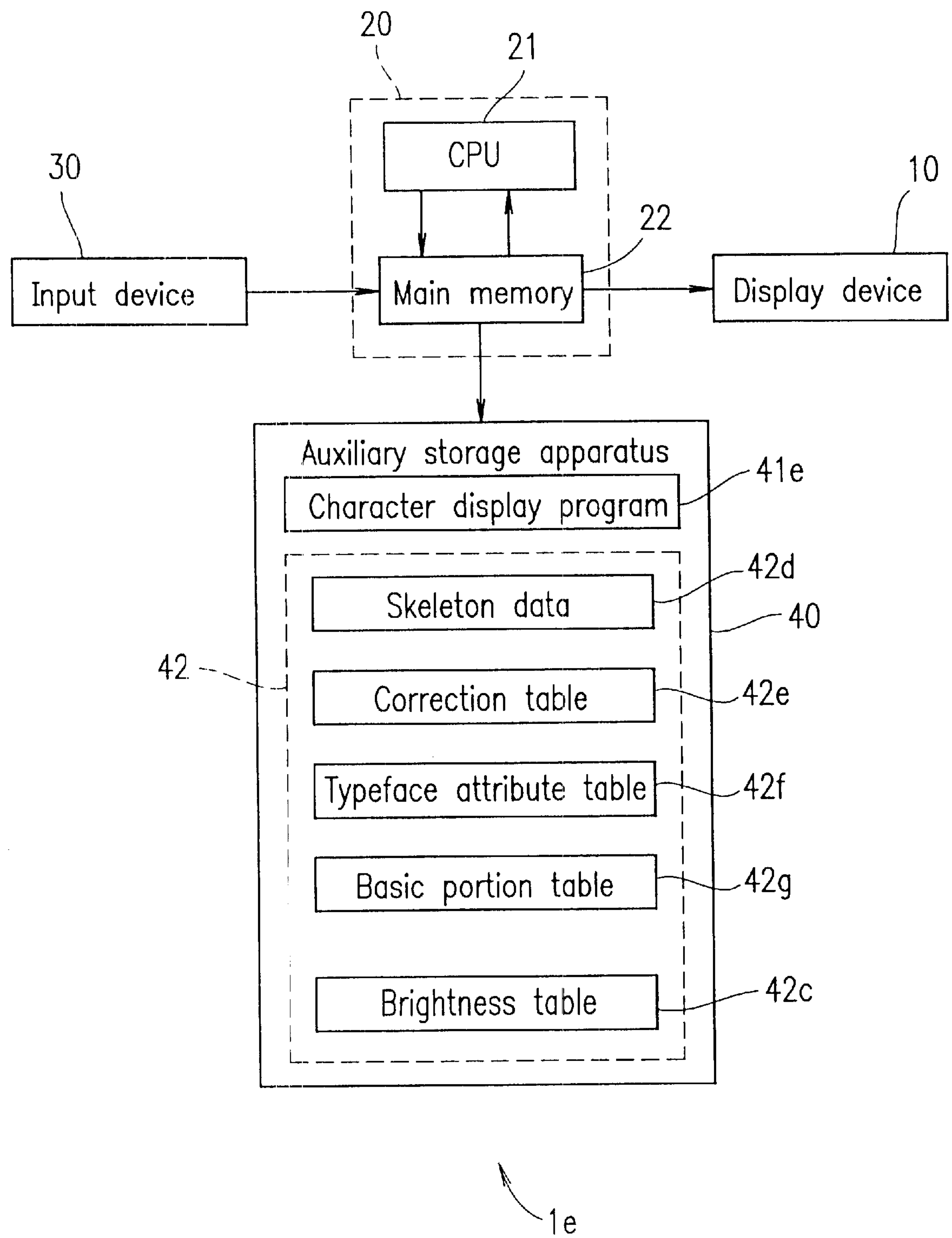
FIG. 15E illustrates a structure of a character display apparatus 1*e* according to Embodiment 3 of the present invention.

The typeface attribute table 42*f* is stored in the auxiliary storage apparatus 40 as a part of the data 42. Accordingly, a character display apparatus 1_d_ for executing the character display program 41_d_ of FIG. 29C has a structure as illustrated in FIG. 15D.

Figure 48:
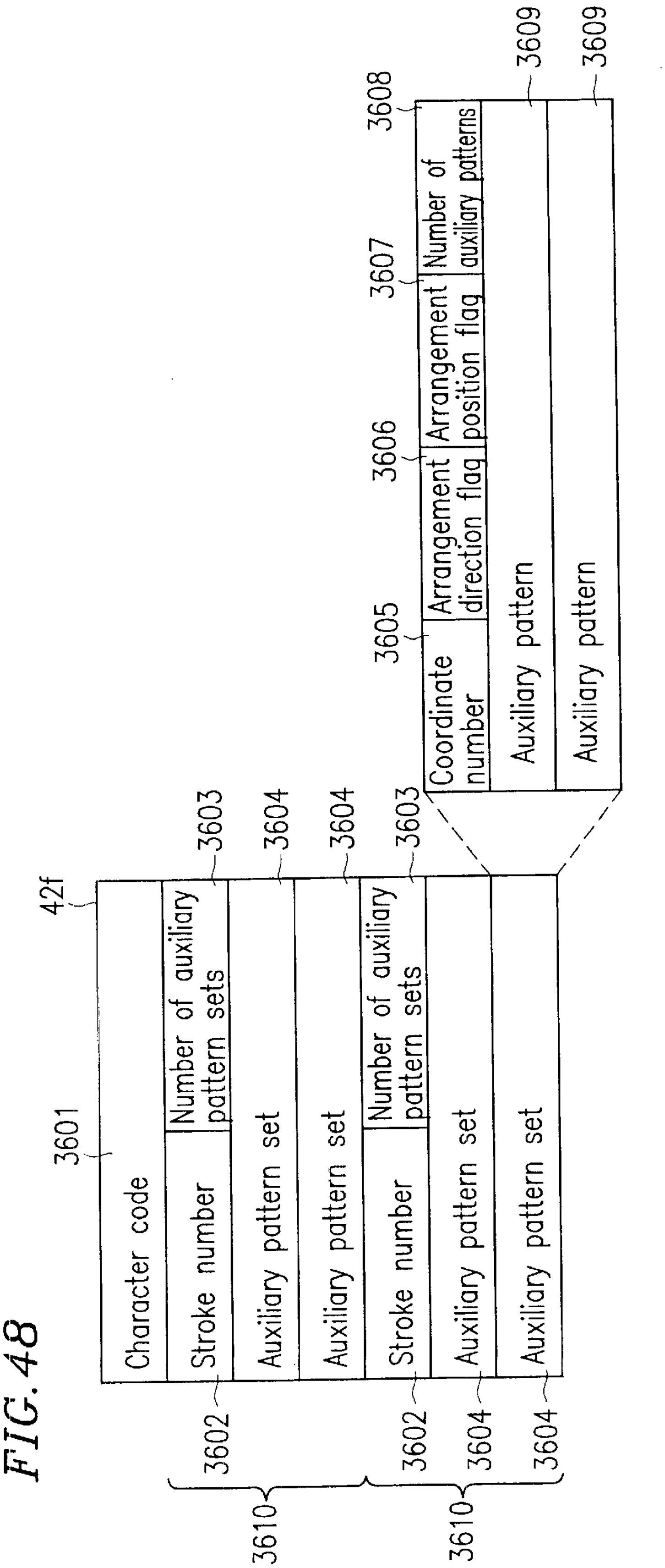
FIG. 48 illustrates a structure of a typeface attribute table 42*f*.

FIG. 48 illustrates a structure of the typeface attribute table 42_f_ stored in the auxiliary storage apparatus 40.

The typeface attribute table 42_f_ defines the position of an auxiliary pattern representing a feature of the character typeface with respect to each stroke of the character. The typeface attribute table 42_f_ includes a character code 3601 for identifying the character and stroke information 3610 for each stroke.

The stroke information 3610 for each stroke includes a stroke number 3602 for identifying the stroke, one or more auxiliary pattern set 3604, and data 3603 indicating the number of the auxiliary pattern sets 3604.

Each auxiliary pattern set 3604 includes a coordinate number 3605, an arrangement direction flag 3606, an arrangement position flag 3607, one or more auxiliary patterns 3609 each representing a feature of the character typeface, and data 3608 indicating the number of the auxiliary patterns 3609.

The coordinate number 3605 indicates a number (1, 2, 3, . . . ) which is assigned to the coordinate data 2307 included in the skeleton data 42_d_ which serves as the reference for the position where the auxiliary pattern is arranged.

The arrangement position flag 3607 indicates the positional relationship between the stroke and the auxiliary pattern 3609. The arrangement position flag 3607 indicates one of "Right", "Upper", "Left" and "Lower". The arrangement position flag 3607 indicating "Right" means that one or more auxiliary pattern 3609 is arranged on the right side of the stroke. The arrangement position flag 3607 indicating "Upper" means that one or more auxiliary pattern 3609 is arranged on the upper side of the stroke. The arrangement position flag 3607 indicating "Left" means that one or more auxiliary pattern 3609 is arranged on the left side of the stroke. The arrangement position flag 3607 indicating "Lower" means that one or more auxiliary pattern 3609 is arranged on the lower side of the stroke.

Where the arrangement position flag 3607 indicates "Left" or "Right", the arrangement direction flag 3606 indicates the direction in which one or more auxiliary pattern 3609 are arranged with respect to the direction of the stroke. In this case, values equal to or greater than 1 which are included in the auxiliary pattern 3609 are arranged from the sub-pixel closest to the stroke to the farthest one from the stroke. Where the arrangement position flag 3607 indicates "Upper" or "Lower", the arrangement direction flag 3606 indicates the direction in which values equal to or greater than 1 included in the auxiliary pattern 3609 are arranged with respect to the direction of the stroke. In this case, the one or more auxiliary patterns 3609 are arranged from the sub-pixel closest to the stroke to the farthest one from the stroke. The arrangement direction flag 3606 indicates either one of "Forward (direction)" or "Reverse (direction)".

Each auxiliary pattern 3609 may be, for example, expressed as (0,6), (6,6, 6), etc. The auxiliary pattern (0, 6) indicates that the color element levels of two sub-pixels adjacent to each other along the X direction are set to level 0 and level 6, respectively. The auxiliary pattern (6, 6, 6) indicates that the color element levels of three sub-pixels adjacent to one another along the X direction are all set to level 6.

FIG. 49 illustrates a typeface attribute table 3600 as an example of the typeface attribute table 42_f_ stored in the auxiliary storage apparatus 40. The typeface attribute table 3600 defines a feature of a particular typeface (e.g., "Mincho typeface") of the Chinese character "木".

Referring to FIG. 29C, instep S3008, the color element level of each sub-pixel corresponding to the basic portion of the character is set to the maximum color element level. Forexample, where the color element level of a sub-pixel is represented through eight levels, i.e., level 7 to level 0, the color element level of each sub-pixel which corresponds to the basic portion of the character is set to level 7.

In step S3031, the color element level of at least one sub-pixel adjacent to a sub-pixel corresponding to the basic portion of the character is set to one of level 6 to level 0 based on the typeface attribute table 42_f_. The position where the auxiliary pattern 3609 is arranged with respect to the basic portion of the character is pre-defined in the typeface attribute table 42_f_.

Thus, it is possible to render a feature of a particular character typeface by arranging an auxiliary pattern representing the feature of the character typeface to be adjacent to the basic portion of the character based on the typeface attribute table 42_f_ and by arranging a correction pattern to be adjacent to the basic portion of the character or the auxiliary pattern.

FIGS. 52A to 52C illustrate an exemplary arrangement of an auxiliary pattern and a correction pattern for stroke #1 of the Chinese character "木". In FIGS. 52A to 52C, each number denotes the color element level of a sub-pixel. The stroke #1 defines the basic portion of a character. First, the color element level of each sub-pixel corresponding to the basic portion of the character is set to level 7 (FIG. 52A). Then, based on the typeface attribute table 3600 (FIG. 49), an auxiliary pattern (0, 6) is arranged on the upper side of stroke #1 in the reverse direction starting from coordinate data 2 of stroke #1 (i.e., from the rightmost point to the leftmost point of stroke #1) (FIG. 52B). Then, a correction pattern (4, 2, 1) is arranged from the sub-pixel closest to the basic portion of the character or the auxiliary pattern (0, 6) to the farthest one. therefrom (FIG. 52C).

FIGS. 53A to 53C illustrate an exemplary arrangement of an auxiliary pattern and a correction pattern for stroke #4 of the Chinese character "木". In FIGS. 53A to 53C, each number denotes the color element level of a sub-pixel. The stroke #4 defines the basic portion of a character. First, the color element level of each sub-pixel corresponding to the basic portion of the character is set to level 7 (FIG. 53A). Then, based on the typeface attribute table 3600 (FIG. 49), auxiliary patterns (6, 6, 6) and (6, 6) are arranged on the left side of stroke #4 in the reverse direction starting from coordinate data 5 of stroke #4 (i.e., from the lower right point to the upper left point of stroke #4) (FIG. 53B). Then, a correction pattern (5, 2, 1) or (4, 2, 1) is arranged from the sub-pixel closest to the basic portion of the character or the auxiliary patterns (6, 6, 6) and (6, 6) to the farthest one therefrom (FIG. 53C).

FIG. 54B illustrates an example where auxiliary patterns and correction patterns are arranged for strokes #1–#4 of the Chinese character "木" based on the typeface attribute table 3600 (FIG. 49). In the Chinese character "木" as shown in FIG. 54B, auxiliary patterns can be arranged independently for strokes #1–#4. Therefore, in the Chinese character "木" shown in FIG. 54B, as compared to that shown in FIG. 54A, the feature of the typeface of the Chinese character "木" is more clearly rendered. The Chinese character "木" shown in FIG. 54B is more desirable than that shown in FIG. 54A because, for example, it better renders the "harai stroke" (in calligraphy, a way to end a stroke with a swish) at the end of stroke #4.

The color element level arrangements illustrated in FIGS. 54A and 54B are obtained by combining together the respective color element level arrangements for the various strokes included in the skeleton data 42*d*. When there are two or more different color element levels set for a sub-pixel, the highest one of those color element levels is selected for that sub-pixel.

Where the variable range of the character size (the number of dots) for display on the display device 10 is relative wide, it is preferred to have a plurality of typeface attribute tables so that one of the typeface attribute tables can be selectively used according to the selected character size.

FIG. 55 illustrates a structure of the typeface attribute table 42*f* which is used in the case where one of a plurality of typeface attribute tables is selectively used according to the selected character size. In the example illustrated in FIG. 55, the typeface attribute table #1 is selected for a character size of less than or equal to 20 dots, the typeface attribute table #2 is selected for a character size of equal to or greater than 21 dots and less than or equal to 32 dots, and the typeface attribute table #3 is selected for a character size of equal to or greater than 33 dots and less than or equal to 48 dots.

The structure of each of the typeface attribute tables #1–#3 is the same as that of the typeface attribute table 42*f* illustrated in FIG. 48.

FIG. 56 illustrates examples of the typeface attribute tables #1–#3 for the Chinese character "木".

FIG. 57A illustrates a color element level arrangement where the Chinese character "木" is displayed in a size of 32 dots×32 dots. FIG. 57B illustrates an example where the feature of the typeface of the Chinese character "木" is added to the 32×32-dot Chinese character "木" shown in FIG. 57A by using the typeface attribute table #2 shown in FIG. 56. FIG. 57C illustrates an example where the feature of the typeface of the Chinese character "木" is added to the 32×32-dot Chinese character "木" shown in FIG. 57A by using the typeface attribute table #1 shown in FIG. 56. Comparison between FIGS. 57B and 57C shows that the feature of the typeface of the Chinese character "木" is rendered with a better quality in FIG. 57B than in FIG. 57C. This is because the color element level arrangement of FIG. 57B is obtained by using a typeface attribute table which is more suitable for the selected character size (32 dots×32 dots).

FIG. 58A illustrates a color element level arrangement where the Chinese character "木" is displayed in a size of 40 dots×40 dots. FIG. 58B illustrates an example where the feature of the typeface of the Chinese character "木" is added to the 40×40-dot Chinese character shown in FIG. 58A by using the typeface attribute table #3 shown in FIG. 56. FIG. 58C illustrates an example where the feature of the typeface of the Chinese character "木" is added to the 40×40-dot Chinese character "木" shown in FIG. 58A by using the typeface attribute table #1 shown in FIG. 56. Comparison between FIGS. 58B and 58C shows that the feature of the typeface of the Chinese character "木" is rendered with a better quality in FIG. 58B than in FIG. 58C. This is because the color element level arrangement of FIG. 58B is obtained by using a typeface attribute table which is more suitable for the selected character size (40 dots×40 dots).

Alternatively, a plurality of typeface attribute tables according to the character size may be provided for each character. In such a case, it is possible to render the feature of the character typeface with an even better quality as compared to the case where a plurality of typeface attribute tables according to the character size are shared among all characters (or a particular set of characters).

An exemplary method for smoothly adjusting the width of a vertical line (basic portion) of a character by placing various correction patterns along the respective sides of the basic portion of the character will now be described with reference to FIGS. 59A to 59D.

FIG. 59A illustrates an example where the color element level of each sub-pixel corresponding to the vertical line or the basic portion of the character (e.g., stroke #2 of the Chinese character "木" is set to level 7, with a correction pattern (4, 2) being placed along each side of the basic portion from the sub-pixel closest to the basic portion of the character to the farthest sub-pixel therefrom.

Similarly, FIG. 59B illustrates an example where a correction pattern (5, 2, 1) is placed along each side of the basic portion of the character from the sub-pixel closest to the basic portion of the character to the farthest sub-pixel therefrom. FIG. 59C illustrates an example where a correction pattern (5, 3, 2) is placed along each side of the basic portion of the character from the sub-pixel closest to the basic portion of the character to the farthest sub-pixel therefrom. FIG. 59D illustrates an example where a correction pattern (5, 4, 2, 1) is placed along each side of the basic portion of the character from the sub-pixel closest to the basic portion of the character to the farthest sub-pixel therefrom.

When the various correction patterns are placed along each side of the basic portion of the character, as shown in FIGS. 59A to 59D, the vertical line of the character appears to become bolder in a smooth manner from FIG. 59A to FIG. 59D. In this way, it is possible to change the apparent width of a character stroke without changing the width of the basic portion of the character.

An exemplary method for smoothly adjusting the width of a horizontal line (basic portion) of a character by placing various correction patterns along the respective sides of the basic portion of the character will now be described with reference to FIGS. 60A to 60D.

FIG. 60A illustrates an example where the color element level of each sub-pixel corresponding to the horizontal line or the basic portion of the character (e.g., stroke #1 of the Chinese character "木" is set to level 7, with a correction pattern (4, 2, 1) being placed at the left and right ends of the basic portion from the sub-pixel closest to the basic portion of the character to the farthest sub-pixel therefrom. No correction pattern is placed on either the upper or lower side of the basic portion of the character.

FIG. 60B illustrates an example where the color element level of each sub-pixel along the upper side of the basic portion of the character is set to level 3, while setting the respective color element levels of three sub-pixels along the upper side of the correction pattern (4, 2, 1) to (2, 1, 0), respectively. The color element level of each of the sub-pixels along the upper side of the correction pattern (4, 2, 1) is set in such a manner that the ratio between the color element level of each of the sub-pixels along the upper side of the correction pattern (4, 2, 1) and that of the corresponding one of the sub-pixels in the correction pattern (4, 2, 1) is substantially equal to the ratio (7:3) between the color element level of the basic portion of the character and that of each sub-pixel along the upper side of the basic portion. When a non-integer color element level is obtained in the ratio-based calculation, an appropriate operation such as rounding-off may be performed so as to adjust the non-integer color element level to an integer value.

FIG. 60C illustrates an example where the color element level of each sub-pixel along the lower side of the basic portion of the character is set to level 3, while setting the respective color element levels of three sub-pixels along the lower side of the correction pattern (4, 2, 1) to (2, 1, 0), respectively.

FIG. 60D illustrates an example where the color element level of each sub-pixel along the upper and lower side of the basic portion of the character is set to level 3, while setting the respective color element levels of three sub-pixels along the upper and lower side of the correction pattern (4, 2, 1) to (2, 1, 0), respectively.

When the color element levels of the sub-pixels along the upper and/or lower side of the basic portion of the character and those of the sub-pixels along the upper and/or lower side of each of the correction patterns provided on the left and right of the basic portion of the character are set to predetermined levels, as shown in FIGS. 60A to 60D, the horizontal line of the character appears to become bolder in a smooth manner from FIG. 60A to FIG. 60B or 60C, and to FIG. 60D. In this way, it is possible to change the apparent width of a character stroke without changing the width of the basic portion of the character.

The apparent width of the character stroke is the same in FIG. 60B and in FIG. 60C. However, the horizontal line illustrated in FIG. 60B appears at a location slightly higher than that illustrated in FIG. 60C. One of the horizontal lines of FIG. 60B and that of FIG. 60C can be appropriately selected in view of the presence/absence of any adjacent stroke and/or the distance between strokes. For example, when the output character size is relatively small, the horizontal line of FIG. 60B may be used for the top horizontal stroke of a Chinese character "国" and that of FIG. 60C for the bottom horizontal stroke thereof, thereby suppressing black bleeding or a squashed character. The term "squashed character" as used herein refers to a character which has become difficult to recognize as a result of a reduction in the size of the character (i.e., the number of dots used to display the character), or as a result of two or more strokes in the character crossing with each other or coming too close to each other, thereby excessively reducing the open space(s) in that character.

The apparent central point of the horizontal line of FIG. 60B is shifted slightly upward from that of FIG. 60A. Therefore, when a character including such a horizontal line is underlined, the character is less subject to the influence of the change in the central point due to the underline.

An exemplary method for smoothly adjusting the width of a horizontal line (basic portion) of a character by adjusting the color element level of each sub-pixel along the upper side of the basic portion of the character will now be described with reference to FIGS. 61A to 61C.

FIG. 61A illustrates an example where the color element level of each sub-pixel along the upper side of the basic portion of the character is set to level 2, while setting the respective color element levels of three sub-pixels along the upper side of the correction pattern (4, 2, 1) to (1, 1, 0), respectively.

FIG. 61B illustrates an example where the color element level of each sub-pixel along the upper side of the basic portion of the character is set to level 5, while setting the respective color element levels of three sub-pixels along the upper side of the correction pattern (4, 2, 1) to (3, 1, 1), respectively.

FIG. 61C illustrates an example where the color element level of each sub-pixel along the upper side of the basic portion of the character is set to level 6, while setting the respective color element levels of three sub-pixels along the upper side of the correction pattern (4, 2, 1) to (3, 2, 1), respectively.

When the color element level of each sub-pixel along the upper side of the basic portion of the character, as shown in FIGS. 61A to 61C, the horizontal line of the character appears to become bolder in a smooth manner from FIG. 61A to FIG. 61C. In this way, it is possible to change the apparent width of a character stroke without changing the width of the basic portion of the character.

In the example illustrated in FIGS. 61A to 61C, the width of a character stroke is adjusted by adjusting only the color element level of each sub-pixel along the upper side of the basic portion of the character. Alternatively, the width of a character stroke can similarly be adjusted by adjusting the color element level of each sub-pixel along the lower side of the basic portion of the character. Alternatively, the width of a character stroke can similarly be adjusted by adjusting both the color element level of each sub-pixel along the upper side of the basic portion of the character and the color element level of each sub-pixel along the lower side of the basic portion of the character.

In Embodiment 3, the color element level of each sub-pixel corresponding to the basic portion of the character is set to the maximum color element level (e.g. level 7). However, there may be cases where it is preferable to set the color element level of a sub-pixel corresponding to the basic portion of the character to a color element level other than the maximum color element level. Such color element level setting may be done for suppressing black bleeding in a "dense" portion of the character. Such color element level setting may also be done for rendering a particular feature of a typeface such as the "streaking effect in a harai stroke".

A basic portion table **42*g* is stored in the auxiliary storage apparatus 40 as a part of the data 42. Accordingly, a character display apparatus 1*e* which references the basic portion table 42*g* has a structure as illustrated in FIG. 15**E.

Figures 62A, 62B:
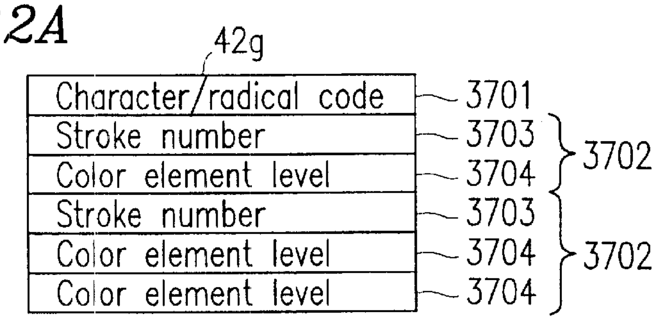
FIG. 62A illustrates a structure of a basic portion table 42$g$.
FIG. 62B illustrates a structure of a basic portion table 3700 corresponding to a Chinese character "魚" to be used as a "hen" radical.

FIG. 62A illustrates a structure of the basic portion table **42*g* stored in the auxiliary storage apparatus 40. The basic portion table 42*g* is used to determine the color element level of the basic portion of a character defined by each stroke included in the character/radical. The basic portion table 42*g* includes a character/radical code 3701 for identifying the character/radical and stroke information 3702** for each stroke.

The stroke information 3702 for each stroke includes a stroke number 3703 for identifying the stroke and a color element level 3704 indicating the color element level of the basic portion corresponding to the line along the points included in the stroke. The stroke number 3703 corresponds to the stroke number 2304 (FIG. 22) of the skeleton data **42*d***.

FIG. 62B illustrates a basic portion table 3700 corresponding to a "hen" radical of the Chinese character "魚" as an example of the basic portion table **42*g*. According to the basic portion table 42*g* illustrated in FIG. 62B, the color element level of the basic portion of the character corresponding to each of stroke #8 to stroke #13 of the "hen" radical of the Chinese character "魚" is set to a level other than the maximum level (i.e., level 6 or level 5**). In this way, it is possible to suppress black bleeding in a "dense" portion of the character, i.e., the inside of the "田" part or the "renga" portion (the four marks on the bottom).

FIG. 63 illustrates skeleton data 3800 representing the skeleton shape of the "hen" radical of the Chinese character "魚" as an example of the skeleton data 42*d*. The skeleton data 3800 includes 13 strokes, i.e., stroke #1 to stroke #13.

Figure 64:
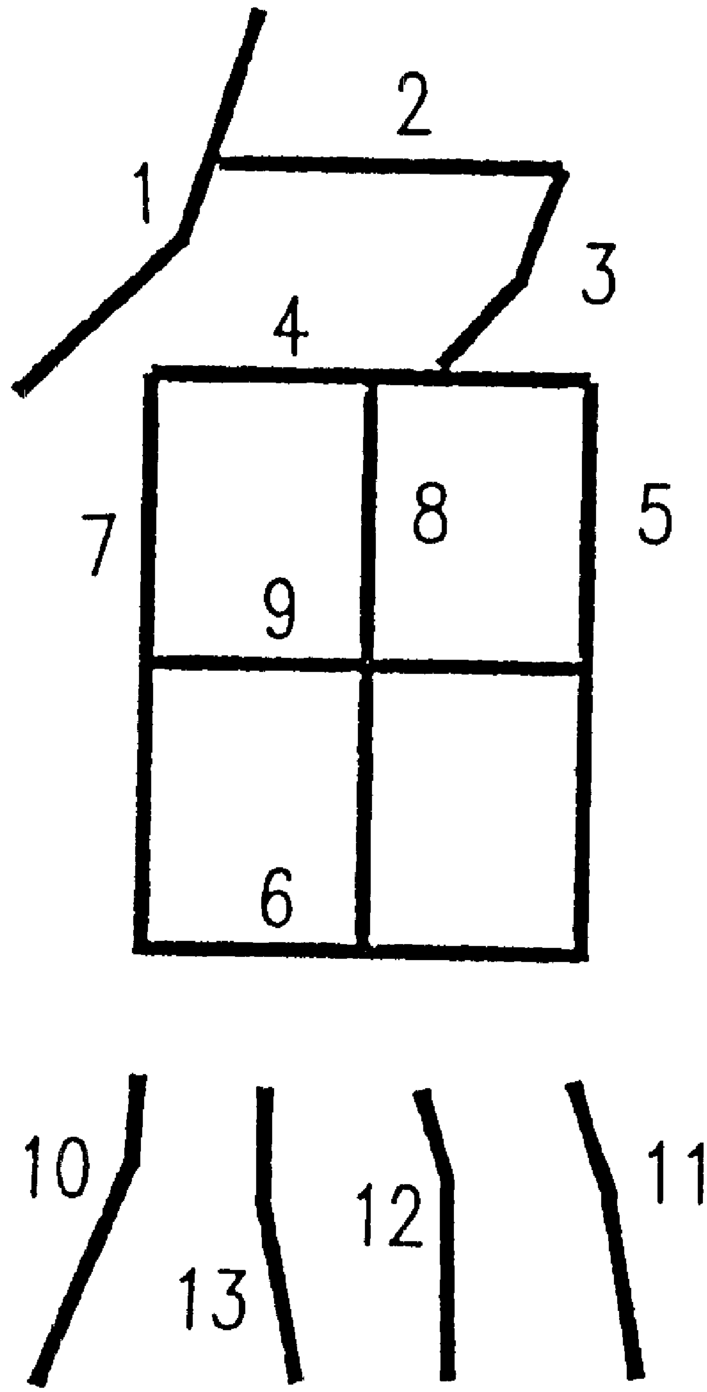
FIG. 64 illustrates the skeleton data 3800 representing the skeleton shape of the "hen" radical of the Chinese character "魚" as shown on a coordinate plane.

FIG. 64 illustrates the skeleton data 3800 representing the skeleton shape of the "hen" radical of the Chinese character "魚" as shown on a coordinate plane. In FIG. 64, each number denotes a stroke number.

FIG. 65A illustrates an example where the color element level of each sub-pixel of the basic portion corresponding to the "hen" radical of the Chinese character "魚" is set to the maximum color element level (e.g., level 7), with correction patterns being placed along the left side and the right side of the basic portion. FIG. 65B illustrates an example where the color element level of a part of the basic portion corresponding to the "hen" radical of the Chinese character "魚" is set to level 5 or level 6 based on the basic portion table 3700 (FIG. 62B). Thus, by setting the color element level of a part of the basic portion of the character to a lower level, it is possible to suppress black bleeding in a "dense" portion of the character. As a result, it is possible to improve the black balance for the character as a whole.

FIG. 66 illustrates a basic portion table 3900 corresponding to the Chinese character "木" as an example of the basic portion table 42*g*. According to the basic portion table 3900 illustrated in FIG. 66, the color element level of the basic portion of the character corresponding to stroke #3, i.e., the "left harai stroke", of the Chinese character "木" is set to a level other than the maximum level (i.e., level 6 or level 5). In this way, it is possible to render the unique feature of the typeface of the Chinese character "木", i.e., the "streaking effect" at the end of the "left harai stroke".

FIG. 67A illustrates an example where the color element level of a part of the basic portion corresponding to the Chinese character "木" is set to level 5 or level 6 based on the basic portion table 3900 (FIG. 66). FIG. 67B illustrates an example where a correction pattern (4, 2, 1) or (5, 2, 1) is placed on the left side and the right side of the basic portion of the character as illustrated in FIG. 67A. Thus, by setting the color element level of a part of the basic portion of the character to a lower level, it is possible to suppress black bleeding. As a result, it is possible to render a feature unique to a particular typeface, i.e., the "streaking effect" at the end of a "harai stroke".

Embodiment 3 has been described above with regard to characters used in the Japanese language. However, the present invention is not limited only to the characters used in the Japanese language. The present invention is also applicable to characters used in any other languages (e.g., Chinese characters, characters used in various European languages, Hangul alphabets, Arabic alphabets) for adjusting the width of a character stroke, rendering a feature of a particular character typeface, and/or suppressing black bleeding.

In the above-described embodiments, the brightness of a sub-pixel is controlled according to the color element level (e.g., level 5 to level 0) associated therewith. Instead of controlling the brightness of a sub-pixel, it is alternatively possible to control one of the chroma, lightness, purity, and the like, associated with the color element. In such a case, instead of using the brightness tables 92, 94 and 96 illustrated in FIGS. 9 to 11, respectively (or instead of using the brightness tables 2070, 2080 and 2090 illustrated in FIGS. 26 to 28, respectively), the corresponding one of a chroma table indicating the relationship between the color element level and the chroma level of a sub-pixel, a lightness table indicating the relationship between the color element level and the lightness level of a sub-pixel, and a purity table indicating the relationship between the color element level and the purity level of a sub-pixel. It is also within the scope of the present invention to control a combination of two or more parameters (e.g., the brightness, chroma, lightness, purity) associated with each color element according to the color element level (e.g., level 5 to level 0) of the sub-pixel.

According to the present invention, it is possible to provide a character display apparatus and a character display method capable of displaying a character with a high definition using a color display device, and a recording medium for use with such apparatus and method.

According to the present invention, a plurality of color elements respectively corresponding to a plurality of sub-pixels are independently controlled. Therefore, it is possible to perform a sub-pixel by sub-pixel control which is finer than the conventional pixel by pixel control. Moreover, by appropriately controlling the color element of a sub-pixel in the vicinity of a sub-pixel corresponding to the basic portion of the character, colors of the character other than black can be made less conspicuous to a human eye. As a result, not only the outline of the character but also the character itself can be displayed with a high definition on a display device.

Moreover, according to the present invention, the basic portion of a character is defined based on skeleton data which represents the skeleton shape of a character. The color element level of a sub-pixel corresponding to the basic portion of the character is set to a predetermined color element level. Based on at least one correction pattern, the color element level of a sub-pixel adjacent to the sub-pixel corresponding to the basic portion of the character is set to a color element level other than the predetermined color element level. By independently controlling the color element levels of sub-pixels in this manner, it is possible to perform a sub-pixel by sub-pixel control which is finer than the conventional pixel by pixel control. As a result, it is possible to virtually increase the resolution of a character. Moreover, by appropriately controlling the color element level of a sub-pixel adjacent to a sub-pixel corresponding to the basic portion of the character, colors of the character other than black can be made less conspicuous to a human eye. As a result, not only the outline of the character but also the character itself can be displayed with a high definition on a display device.

Furthermore, according to the present invention, the color element level of at least one particular sub-pixel corresponding to the basic portion of a character to be displayed on the display device is set to a predetermined color element level, while at least one of sub-pixels which is adjacent to the particular sub-pixel in a direction perpendicular to the sub-pixel arrangement direction is set to have a color element level other than the predetermined color element level. By independently controlling the color element levels of sub-pixels in this manner, it is possible to perform a sub-pixel by sub-pixel control which is finer than the conventional pixel by pixel control. As a result, it is possible to virtually increase the resolution of a character. Moreover, by appropriately controlling the color element level of a sub-pixel adjacent to a sub-pixel corresponding to the basic portion of the character, colors of the character other than black can be made less conspicuous to a human eye. As a result, not only the outline of the character but also the character itself can be displayed with a high definition on a display device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A character display apparatus, comprising:

a display device having a plurality of pixels; and a control section for controlling the display device, wherein:

each of the pixels includes a plurality of sub-pixels arranged along a predetermined direction;

a corresponding one of a plurality of color elements is pre-assigned to each of the sub-pixels; and the control section displays a character on the display device by independently controlling the color elements respectively corresponding to the sub-pixels, wherein:

an intensity of each of the color elements is represented stepwise through a plurality of color element levels;

each of the sub-pixels has one of the color element levels; and the control section sets a color element level of at least one particular sub-pixel corresponding to a basic portion of a character to be displayed on the display device to a predetermined color element level, and sets a color element level of at least one other sub-pixel adjacent to the at least one particular sub-pixel corresponding to the basic portion of the character to a color element level other than the predetermined color element level.

2. A character display apparatus according to claim 1, wherein the control section defines the basic portion of the character to be displayed on the display device based on an outline of a scaled character.

3. A character display apparatus according to claim 1, wherein the control section defines the basic portion of the character to be displayed on the display device based on skeleton data which represents a skeleton shape of the character.

4. A character display apparatus according to claim 3, wherein the control section scales the skeleton data according to a size of the character to be displayed on the display device, and adjusts a line width of the character after defining the basic portion of the character based on the scaled skeleton data.

5. A character display apparatus according to claim 3, wherein the control section sets the color element level of the at least one other sub-pixel adjacent to the at least one particular sub-pixel corresponding to the basic portion of the character to the color element level other than the predetermined color element level based on at least one correction pattern.

6. A character display apparatus according to claim 5, wherein the control section adjusts a line width of the character to be displayed on the display device by selectively using one of the at least one correction pattern.

7. A character display apparatus according to claim 5, wherein the at least one correction pattern is provided in advance according to a size of the character to be displayed on the display device.

8. A character display apparatus according to claim 5, wherein the at least one correction pattern is provided in advance so as to correspond to the skeleton data.

9. A character display apparatus according to claim 5, wherein the at least one correction pattern is provided for each Chinese character radical.

10. A character display apparatus according to claim 5, wherein the at least one correction pattern is provided in advance according to the number of strokes of the skeleton data.

11. A character display apparatus according to claim 5, wherein the at least one correction pattern is provided in advance according to an inclination angle of a stroke of the skeleton data.

12. A character display apparatus according to claim 5, wherein the at least one correction pattern is provided in advance according to a distance between two portions of the basic portion of the character.

13. A character display apparatus according to claim 5, wherein where an arrangement of the at least one particular sub-pixel corresponding to the basic portion of the character forms a particular pattern, the control section corrects the color element level of the at least one particular sub-pixel corresponding to the basic portion of the character so as to divide the basic portion of the character into at least two portions.

14. A character display apparatus according to claim 3, wherein:

the skeleton data includes stroke information associated with each stroke;

the control section sets the color element level of the at least one sub-pixel to the color element level other than the predetermined color element level according to a shape of the stroke.

15. A character display apparatus according to claim 3, wherein:

the skeleton data includes stroke information associated with each stroke;

the control section sets the color element level of the at least one sub-pixel to the color element level other than the predetermined color element level based on a typeface attribute table which defines a feature of the typeface of the character in association with the stroke information.

16. A character display apparatus according to claim 15, wherein:

a plurality of typeface attribute tables are provided which define the feature of the typeface of the character in association with the stroke information; and the control section sets the color element level of the at least one sub-pixel to the color element level other than the predetermined color element level based on one of the typeface attribute tables which is selectively used according to a size of the character.

17. A character display apparatus according to claim 1, wherein the control section sets a color element level of at least one sub-pixel adjacent in the predetermined direction to the at least one particular sub-pixel corresponding to the basic portion of the character to a color element level other than the predetermined color element level.

18. A character display apparatus according to claim 1, wherein the control section sets a color element level of at least one sub-pixel adjacent in a direction perpendicular to the predetermined direction to the at least one particular sub-pixel corresponding to the basic portion of the character to a color element level other than the predetermined color element level.

19. A character display apparatus according to claim 1, wherein the control section adjusts a line width of the character to be displayed an the display device by controlling the number of sub-pixels corresponding to the basic portion of the character.

20. A character display apparatus according to claim 1, wherein the control section adjusts a line width of the character to be displayed on the display device by controlling a color element level of a sub-pixel adjacent to the at least one particular sub-pixel corresponding to the basic portion of the character.

21. A character display apparatus according to claim 1, wherein the control section renders a feature of a typeface of the character to be displayed on the display device by controlling a color element level of a sub-pixel adjacent to the at least one particular sub-pixel corresponding to the basic portion of the character.

22. A character display apparatus according to claim 1, wherein the control section sets the color element level of one or more of the at least one particular sub-pixel corresponding to the basic portion of the character to be displayed on the display device to a color element level other than a maximum color element level that can be obtained.

23. A character display apparatus according to claim 22, wherein the control section sets the color element level of the at least one particular sub-pixel corresponding to the basic portion of the character based on a basic portion table.

24. A character display apparatus according to claim 1, wherein the control section sets the color element level of the at least one sub-pixel arranged in the vicinity of the at least one particular sub-pixel based on predetermined color element level information which is used to determine the color element level of the at least one sub-pixel arranged in the vicinity of the at least one particular sub-pixel corresponding to the basic portion of the character to be displayed on the display device.

25. A character display apparatus according to claim 1, wherein the character to be displayed on the display device has a color that is an achromatic color.

26. A character display apparatus according to claim 1, wherein the control section variably adjusts an interval between characters by performing a sub-pixel by sub-pixel control on a position of the character to be displayed on the display device.

27. A character display apparatus according to claim 1, wherein the control section converts the color element level of the sub-pixel to a brightness level based on a predetermined brightness table which defines a relationship between the color element level of the sub-pixel and the brightness level of the sub-pixel.

28. A character display apparatus according to claim 27, wherein the brightness table is prepared so as to be suitable for a display characteristic of the display device.

29. A character display apparatus according to claim 1, wherein the control section displays a character while rotating the sub-pixel arrangement by 90 degrees.

30. A character display apparatus according to claim 1, wherein the display device is a liquid crystal display device.

31. A character display apparatus according to claim 30, wherein the liquid crystal display device is a stripe-type liquid crystal display device.

32. A character display method for displaying a character on a display device having a plurality of pixels, wherein:

each of the pixels includes a plurality of sub-pixels arranged along a predetermined direction; and a corresponding one of a plurality of color elements is pre-assigned to each of the sub-pixels and each of the sub-pixels has one of the color element levels, the method comprising the step of:

displaying a character on the display device by independently controlling the color elements respectively corresponding to the sub-pixels;

representing an intensity of each of the color elements stepwise through a plurality of color element levels; and setting a color element level of at least one particular sub-pixel corresponding to a basic portion of a character to be displayed on the display device to a predetermined color element level, and setting a color element level of at least one other sub-pixel adjacent to the at least one particular sub-pixel corresponding to the basic portion of the character to a color element level other than the predetermined color element level.

33. A recording medium which can be read by an information display apparatus, the apparatus comprising a display device having a plurality of pixels and a controlling section for controlling the display device, wherein:

each of the pixels includes a plurality of sub-pixels arranged along a predetermined direction;

a corresponding one of a plurality of color elements is pre-assigned to each of the sub-pixels; and the recording medium has recorded thereon a program for instructing the control section to perform an operation of displaying a character on the display device by independently controlling the color elements respectively corresponding to the sub-pixels, wherein:

the program represents an intensity of each of the color elements stepwise through a plurality of color element levels;

wherein the programs associates each of the sub-pixels with one of the color element levels; and the program instructs the control section to set a color element level of at least one particular sub-pixel corresponding to a basic portion of a character to be displayed on the display device to a predetermined color element level, and to set a color element level of at least one other sub-pixel adjacent to the at least one particular sub-pixel corresponding to the basic portion of the character to a color element level other than the predetermined color element level.

* * * * *